US011592649B2

(12) United States Patent
Hirano

(10) Patent No.: US 11,592,649 B2
(45) Date of Patent: Feb. 28, 2023

(54) IMAGING LENS

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 142 days.

(21) Appl. No.: 17/218,218

(22) Filed: Mar. 31, 2021

(65) Prior Publication Data

US 2021/0223519 A1   Jul. 22, 2021

Related U.S. Application Data

(63) Continuation of application No. 16/722,032, filed on Dec. 20, 2019, now Pat. No. 11,016,272.

(30) Foreign Application Priority Data

Dec. 29, 2018 (JP) .............................. JP2018-248774

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .............. G02B 13/0045; G02B 13/002; G02B 13/0015; G02B 9/64; G02B 9/00
USPC ......................................................... 359/754
See application file for complete search history.

(56) References Cited

U.S. PATENT DOCUMENTS

| 4,717,245 | A | * | 1/1988 | Takahashi | ................ G02B 9/64 359/754 |
|---|---|---|---|---|---|
| 8,587,878 | B2 | | 11/2013 | Ohashi et al. | |
| 8,780,463 | B2 | | 7/2014 | Ohashi et al. | |
| 9,110,231 | B2 | | 8/2015 | Kazuhara et al. | |
| 9,213,219 | B2 | | 12/2015 | Kazuhara et al. | |
| 9,470,873 | B2 | | 10/2016 | Asami | |
| 9,851,529 | B2 | | 12/2017 | Asami | |
| 10,001,630 | B1 | * | 6/2018 | Ko | .......................... G02B 13/18 |
| 10,067,314 | B2 | | 9/2018 | Imaoka | |
| 2004/0105172 | A1 | * | 6/2004 | Reinecke | ................ G02B 13/22 359/754 |
| 2007/0121214 | A1 | * | 5/2007 | Kuo | ................ G02B 15/145531 359/680 |
| 2008/0013192 | A1 | * | 1/2008 | Bretthauer | ............... G02B 9/64 359/754 |

(Continued)

FOREIGN PATENT DOCUMENTS

| JP | S63-139314 A | 6/1988 |
|---|---|---|
| JP | 2002-287019 A | 10/2002 |

(Continued)

*Primary Examiner* — William R Alexander
(74) *Attorney, Agent, or Firm* — Hamre, Schumann, Mueller & Larson, P.C.

(57) ABSTRACT

An imaging lens includes a first lens; a second lens; a third lens; a fourth lens; a fifth lens; a sixth lens; a seventh lens; an eighth lens; and a ninth lens having negative refractive power, arranged in this order from an object side to an image plane side. The imaging lens has a total of nine lenses. The first lens is formed in a shape so that a surface thereof on the image plane side has an aspherical shape. The ninth lens is formed in a shape so that a surface thereof on the image plane side has an aspherical shape.

20 Claims, 33 Drawing Sheets

(56) References Cited

U.S. PATENT DOCUMENTS

| | | | |
|---|---|---|---|
| 2008/0013193 A1* | 1/2008 | Bretthauer | G02B 13/16 359/754 |
| 2009/0273851 A1 | 11/2009 | Take et al. | |
| 2013/0201564 A1 | 8/2013 | Take | |
| 2013/0242175 A1 | 9/2013 | Kazuhara et al. | |
| 2013/0335616 A1* | 12/2013 | Hosoi | G02B 27/646 359/557 |
| 2014/0092490 A1 | 4/2014 | Take | |
| 2014/0184882 A1* | 7/2014 | Kuzuhara | H04N 5/2254 359/739 |
| 2014/0184887 A1* | 7/2014 | Yonetani | G02B 13/0015 359/557 |
| 2014/0347743 A1 | 11/2014 | Wang et al. | |
| 2015/0002944 A1* | 1/2015 | Yang | G02B 13/0045 359/708 |
| 2015/0036230 A1* | 2/2015 | Bone | G02B 9/64 359/754 |
| 2015/0309293 A1 | 10/2015 | Yamada | |
| 2015/0309393 A1* | 10/2015 | Kuzuhara | G02B 13/0015 348/360 |
| 2015/0312454 A1 | 10/2015 | Iiyama et al. | |
| 2015/0355445 A1 | 12/2015 | Uchida et al. | |
| 2016/0077314 A1* | 3/2016 | Nishimura | G02B 13/06 359/708 |
| 2016/0363743 A1* | 12/2016 | Yoo | G02B 15/177 |
| 2016/0377844 A1* | 12/2016 | Cheng | G02B 13/143 359/355 |
| 2017/0010441 A1 | 1/2017 | Kondo et al. | |
| 2017/0293117 A1* | 10/2017 | Katou | G02B 9/14 |
| 2018/0113286 A1* | 4/2018 | Minefuji | G02B 7/10 |
| 2018/0188482 A1* | 7/2018 | Jhang | G02B 9/64 |
| 2018/0188486 A1* | 7/2018 | Gong | G02B 13/0045 |
| 2018/0275380 A1 | 9/2018 | Sudoh | |
| 2019/0285862 A1* | 9/2019 | Gong | G02B 13/18 |

FOREIGN PATENT DOCUMENTS

| | | |
|---|---|---|
| JP | 2015-210413 A | 11/2015 |
| JP | 2015-225246 A | 12/2015 |
| JP | 2017-21185 A | 1/2017 |
| JP | 2018-97289 A | 6/2018 |
| JP | 2018-156011 A | 10/2018 |

* cited by examiner

IMAGING LENS

CROSS-REFERENCE TO RELATED APPLICATIONS

This is a continuation application of a prior application Ser. No. 16/722,032, filed on Dec. 20, 2019, allowed.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a portable device, e.g., a cellular phone and a portable information terminal, a digital still camera, a security camera, an onboard camera, and a network camera.

Currently, so-called "smartphones", i.e., multifunctional cellular phones which can run various application software as well as a voice call function, have been more widely used. Through running application software installed in a smartphone, for example, it is possible to execute a function such as a digital still camera and car navigation. In these years, with advancement in augmented reality (AR) technology, it has been achievable to add various information to images taken through an imaging lens. For a purpose of achieving those various functions, many models of smartphones have a built-in camera.

In order to take a high-definition image of an object, an imaging element with a higher pixel count and an imaging lens with high resolution are required. As one of methods to achieve higher resolution of an imaging lens, the number of lenses that compose an imaging lens may be increased. In case of this method, however, the size of the imaging lens may be easily increased if the number of lenses is simply increased. In developing an imaging lens, it is necessary to improve the resolution, while restraining extension of a total track length (TTL).

In case of a lens configuration comprised of nine lenses, since the number of lenses that compose the imaging lens is large, it has higher flexibility in designing and can satisfactorily correct aberrations that are required for an imaging lens with high resolution. For example, as the conventional imaging lens having a nine-lens configuration, an imaging lens described in Patent Reference has been known.

PATENT REFERENCE

Patent Reference: Japanese Patent Application Publication No. 2018-156011

Patent Reference describes an imaging lens including a first lens group having positive refractive power and a second lens group having positive refractive power. The first lens group includes six lenses, i.e., a first lens that is positive; a second lens that is positive; a third lens that is negative; a fourth lens that is negative; a fifth lens that is positive; and a sixth lens that is positive. The second lens group includes three lenses, i.e., a seventh lens that is negative; an eighth lens that is negative; and a ninth lens that is positive. In the second lens group, the seventh lens L7 is formed in a shape such that a surface thereof on the image plane side has a concave shape, and the eighth lens is formed to have a shape of a meniscus lens directing a concave surface thereof to the object side. According to the conventional imaging lens described in Patent Reference, aberrations are satisfactorily corrected by restraining a ratio of a focal length of the seventh lens to a focal length of the eighth lens within a certain range.

According to the conventional imaging lens of Patent Reference, it is achievable to relatively satisfactorily correct aberrations. In case of the conventional imaging lens, however, a total track length is long relative to a focal length of the whole lens system, so that it is not suitable to mount in a smartphone, etc. According to the conventional imaging lens of Patent Reference, it is difficult to correct aberrations more satisfactorily, while downsizing the imaging lens.

Here, such a problem is not specific to an imaging lens to be mounted in smartphones and cellular phones. Rather, it is a common problem for an imaging lens to be mounted in a relatively small camera such as digital still cameras, portable information terminals, security cameras, onboard cameras and network cameras.

In view of the above-described problems in the conventional techniques, an object of the present invention is to provide an imaging lens that can attain both a small size and satisfactorily corrected aberrations in a balanced manner.

Further objects and advantages of the present invention will be apparent from the following description of the invention.

SUMMARY OF THE INVENTION

In order to attain the objects described above, an imaging lens of the invention is configured to form an image of an object on an imaging element. According to a first aspect of the invention, an imaging lens of the invention includes a first lens having positive refractive power, a second lens having negative refractive power, a third lens having positive refractive power, a fourth lens, a fifth lens, a sixth lens, a seventh lens, an eighth lens, and a ninth lens having negative refractive power, arranged in the order from an object side to an seventh lens. A surface of the ninth lens on the image plane side is formed in an aspheric shape having an inflection point.

According to the imaging lens of the invention, the arrangement of refractive power of the three lenses disposed on the object side is in the order of "positive-negative-positive", so that it is suitably achieved to downsize the imaging lens. In addition, the image plane-side surface of the ninth lens, which is the closest surface to the image plane side, is formed in an aspheric shape having an inflexion point. Therefore, it is achievable to satisfactorily correct paraxial aberrations and aberrations at the periphery thereof, while suitably restraining an incident angle of a light beam emitted from the imaging lens to the image plane of an imaging element within the range of chief ray angle (CRA).

Here, in the invention, "lens" refers to an optical element having refractive power. Accordingly, the "lens" of the invention does not include an optical element such as a prism and a flat plate filter to change a traveling direction of a light beam. Those optical elements may be disposed before or after the imaging lens or between lenses as necessary.

The imaging lens having the above-described configuration preferably satisfy the following conditional expression (1):

$$0.5 < f123/f < 2.5 \qquad (1)$$

According to the imaging lens of the invention, nine lenses are disposed in the order from the object side. Among them, when a composite refractive power of the three lenses close to the object side is restrained within the range of the conditional expression (1), it is achievable to satisfactorily correct aberrations including a spherical aberration.

The imaging lens having the above-described configuration preferably satisfy the following conditional expression (2):

$$f789<0 \quad (2)$$

When the imaging lens satisfies the conditional expression (2), it is more suitably achievable to downsize the imaging lens.

The imaging lens having the above-described configuration preferably satisfy the following conditional expression (3):

$$-6<f3/f2<-0.2 \quad (3)$$

When the imaging lens satisfies the conditional expression (3), it is achievable to satisfactorily correct a chromatic aberration, astigmatism and a distortion in a well-balanced manner, while securing the back focal length.

The imaging lens having the above-described configuration preferably satisfy the following conditional expression (4):

$$0.003<D34/f<0.04 \quad (4)$$

When the imaging lens satisfies the conditional expression (4), it is achievable to satisfactorily correct the astigmatism and the distortion, while securing a distance between the third lens and the fourth lens and the back focal length.

According to a second aspect of the invention, when the thickness of the seventh lens on the optical axis is T7 and the thickness of the eighth lens on the optical axis is T8, the imaging lens having the above-described configuration preferably satisfies the following conditional expression (5):

$$0.5<T8/T7<4 \quad (5)$$

When the total track length of the imaging lens is shortened relative to an image height of the imaging element, an effective diameter tends to be larger as the lens is close to the image plane. When the imaging lens satisfies the conditional expression (5), it is achievable to satisfactorily keep the thicknesses of the seventh lens and the eighth lens, effective diameters of which tend to be large. Therefore, it is achievable to satisfactorily correct aberrations, while downsizing the imaging lens. In addition, it is also achievable to secure the back focal length.

According to a third aspect of the invention, when the whole lens system has the focal length f and a distance on the optical axis between the eighth lens and the ninth lens is D89, the imaging lens having the above-described configuration preferably satisfies the following conditional expression (6):

$$0.05<D89/f<0.15 \quad (6)$$

When the imaging lens satisfies the conditional expression (6), it is achievable to satisfactorily correct a field curvature, the astigmatism and the distortion, while securing the back focal length.

According to a fourth aspect of the invention, when the whole lens system has the focal length f and a paraxial curvature radius of an image plane-side surface of the ninth lens is R9r, the imaging lens having the above-described configuration preferably satisfies the following conditional expression (7):

$$0.2<R9r/f<0.6 \quad (7)$$

The image plane-side surface of the ninth lens is a surface positioned closest to the image plane side in the imaging lens. Difficulty of correcting the astigmatism, the coma aberration and the distortion varies depending on the magnitude of the refractive power of the image plane-side surface of the ninth lens. When the imaging lens satisfies the conditional expression (7), it is achievable to satisfactorily correct the astigmatism, the coma aberration and the distortion, while downsizing the imaging lens. When the imaging lens satisfies the conditional expression (7), it is achievable to effectively secure the back focal length.

According to a fifth aspect of the invention, when the whole lens system has the focal length f and the ninth lens has a focal length f9, the imaging lens having the above-described configuration preferably satisfies the following conditional expression (8):

$$-2<f9/f<-0.2 \quad (8)$$

When the imaging lens satisfies the conditional expression (8), it is achievable to secure the back focal length and satisfactorily correct the field curvature, while restraining the incident angle of a light beam emitted from the imaging lens to the image plane within the range of CRA.

When the whole lens system has the focal length f and the fourth lens has a focal length f4, the imaging lens having the above-described configuration preferably satisfies the following conditional expression (9):

$$10<|f4/f|<60 \quad (9)$$

When the value satisfies the conditional expression (9), it is achievable to satisfactorily restrain the chromatic aberration, the astigmatism, the field curvature and the distortion within satisfactory ranges.

When the first lens has Abbe's number vd1, the second lens has Abbe's number vd2, and the third lens has Abbe's number vd3, the imaging lens having the above-described configuration preferably satisfies the following conditional expressions (10) through (12):

$$35<vd1<80 \quad (10)$$

$$10<vd2<30 \quad (11)$$

$$35<vd3<80 \quad (12)$$

When the imaging lens satisfies the conditional expressions (10) through (12), it is achievable to satisfactorily correct the chromatic aberration.

When the whole lens system has the focal length f and a distance on the optical axis from an object-side surface of the first lens to the image plane is TL, the imaging lens having the above-described configuration preferably satisfies the following conditional expression (13): When the imaging lens satisfies the conditional expression (13), it is achievable to suitably downsize the imaging lens.

$$1.0<TL/f<1.5 \quad (13)$$

Here, between the imaging lens and the image plane, typically, there is disposed an insert such as an infrared cut-off filter and cover glass. In this specification, for the distance on the optical axis of those inserts, a distance in the air is employed.

Moreover, in these years, there is a strong demand for being able to take a wider range of an image through an imaging lens. An imaging lens has been increasingly required to attain both a smaller size and wider angle of view in a balanced manner than before. Especially, in case of an imaging lens to be mounted in a thin portable device, e.g., smartphone, it is necessary to hold the imaging lens within a limited space. Therefore, there is a strict limitation in the total length of the imaging lens in the optical axis relative to a size of the imaging element. When the distance on the optical axis from the object-side surface of the first lens to the image plane is TL and the maximum image height is Hmax, the imaging lens of the present invention preferably satisfies the following conditional expression (14):

$$1.0 < TL/H\text{max} < 1.8 \quad (14)$$

When the sixth lens has positive refractive power and the seventh lens has positive refractive power, and the whole lens system has the focal length f and the sixth lens has a focal length f6, the imaging lens having the above-described configuration preferably satisfies the following conditional expression (15):

$$1.5 < f6/f < 6 \quad (15)$$

When the sixth lens has weak refractive power relative to the refractive power of the whole lens system, it is achievable to have the sixth lens function as a correction lens primarily intended to correct the aberrations. When the imaging lens satisfies the conditional expressions (15), it is achievable to satisfactorily correct the coma aberration and the astigmatism.

When the seventh lens has negative refractive power and the eighth lens has positive refractive power, and the whole lens system has the focal length f and the eighth lens has a focal length f8, the imaging lens having the above-described configuration preferably satisfies the following conditional expression (16):

$$1 < f8/f < 6 \quad (16)$$

When the imaging lens satisfies the conditional expression (16), it is achievable to satisfactorily correct the spherical aberration and the distortion, while downsizing the imaging lens.

According to the invention, the respective lenses from the first lens to the ninth lens are preferably arranged with certain air intervals. When the respective lenses are arranged at certain air intervals, the imaging lens of the invention can have a lens configuration that does not contain any cemented lens. In such lens configuration like this, since it is achievable to form all of the nine lenses that compose the imaging lens from plastic materials, it is achievable to suitably restrain the manufacturing cost of the imaging lens.

According to the imaging lens of the invention, it is preferred to form both surfaces each of the first through the ninth lenses in aspheric shapes. Forming the both surfaces of each lens in aspheric surfaces, it is achievable to more satisfactorily correct aberrations from proximity of the optical axis of the lens to the periphery thereof. Especially, it is achievable to satisfactorily correct aberrations at periphery of the lens(es).

According to the imaging lens having the above-described configuration, the first lens is preferably formed in a shape directing a convex surface thereof to the object side. When the first lens is formed in such a shape, it is achievable to suitably downsize the imaging lens.

According to the imaging lens having the above-described configuration, in the eighth lens and the ninth lens, at least two surfaces thereof are preferably formed in an aspheric shape having an inflection point. In addition to the image plane-side surface of the ninth lens, when one more surface is formed in an aspheric shape having an inflection point, it is achievable to more satisfactorily correct aberrations at periphery of an image, while suitably restraining an incident angle of a light beam emitted from the imaging lens to the image plane within the range of CRA.

According to the invention, when the imaging lens has an angle of view 2ω, the imaging lens preferably satisfies $65° \leq 2\omega$. When the imaging lens satisfies this conditional expression, it is possible to attain a wide angle of the imaging lens, and thereby to suitably attain both downsizing and wider angle of the imaging lens in a balanced manner.

In case of an imaging element with a high pixel count, a light-receiving area of each pixel decreases, so that an image tends to be dark. As a method of correcting such darkness of the image, there is a method of improving light-receiving sensitivity of the imaging element by using an electrical circuit. However, when the light-receiving sensitivity increases, a noise component, which does not directly contribute to formation of an image, is also amplified. Accordingly, in order to obtain fully bright image without such electrical circuit, when the whole lens system has the focal length f and the imaging lens has a diameter of entrance pupil Dep, the imaging lens having the above-described configuration preferably satisfies the following conditional expression (17):

$$f/\text{Dep} < 2.4 \quad (17)$$

Here, according to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object-side surface having a positive curvature radius" means the object-side surface has a convex shape. "An object-side surface having a negative curvature radius" means the object side surface has a concave shape. In addition, "an image plane-side surface having a positive curvature radius" means the image plane-side surface has a concave shape. "An image plane-side surface having a negative curvature radius" means the image plane-side surface has a convex shape. Here, a curvature radius used herein refers to a paraxial curvature radius, and may not fit to general shapes of the lenses in their sectional views all the time.

According to the imaging lens of the invention, it is achievable to provide an imaging lens having a small size, which is especially suitable for mounting in a small-sized camera, while having high resolution with satisfactory correction of aberrations.

DETAILED DESCRIPTION OF PREFERRED EMBODIMENTS

Hereunder, referring to the accompanying drawings, embodiments of the present invention will be fully described.

FIGS. 1, 4, 7, 10, 13, 16, 19, 22, 25, 28, and 31, are schematic sectional views of the imaging lenses in Numerical Data Examples 1 to 11 according to the embodiments, respectively. Since the imaging lenses in those Numerical Data Examples have the same basic configuration, the lens configuration of the embodiment will be described with reference to the sectional view of Numerical Data Example 1.

Figure 1:
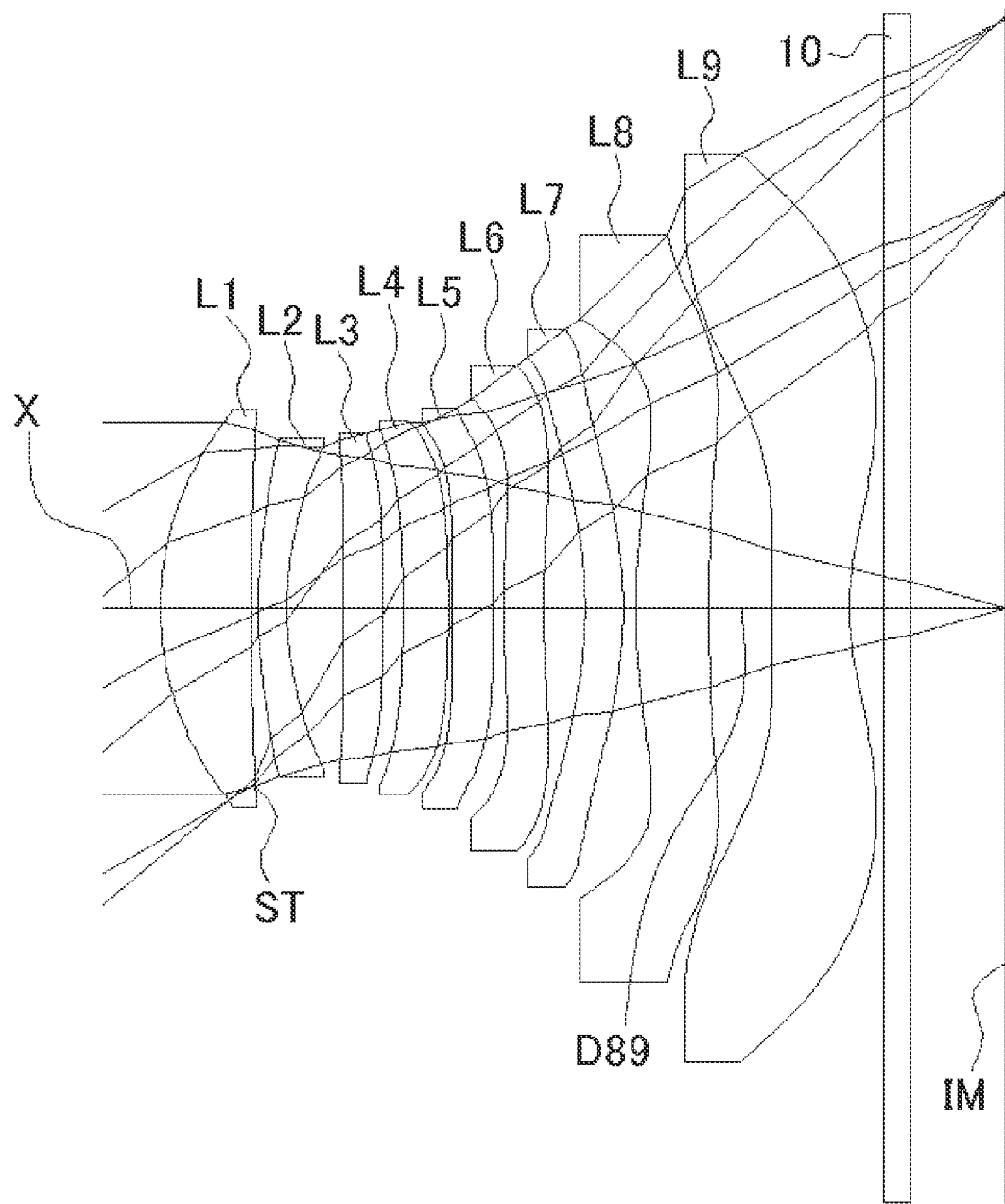
FIG. 1 shows a sectional view of a schematic configuration of an imaging lens in Numerical Data Example 1 of the present invention.

As shown in FIG. 1, the imaging lens of the embodiment includes a first lens L1 having positive refractive power; a second lens L2 having negative refractive power; a third lens L3 having positive refractive power; a fourth lens L4; a fifth lens L5; a sixth lens L6; a seventh lens L7; an eighth lens L8; and a ninth lens having negative refractive power, arranged in the order from an object side to an image plane side. In addition, between the ninth lens L9 and an image plane IM of an imaging element, there is provided a filter 10. Here, the filter 10 is omissible.

The first lens L1 is formed in a shape such that a curvature radius r1 of a surface thereof on the object-side and a curvature radius r2 of a surface thereof on the image plane side are both positive. The first lens L1 has a shape of a meniscus lens directing a convex surface thereof to the object side near the optical axis. The shape of the first lens L1 may not be limited to the one in Numerical Data Example 1. The first lens L1 can be formed in any shape as long as the refractive power thereof is positive. In addition to the shape in Numerical Data Example 1, the first lens L1 can be formed in a shape such that the curvature radius r1 and the curvature radius r2 are both negative, or such that the curvature radius r1 is positive and the curvature radius r2 is negative. The first of the above-described shapes is a shape directing a concave surface thereof to the object side near the optical axis, and the latter one is a shape of a biconvex lens near the optical axis. In view of downsizing the imaging lens, the first lens L1 may be preferably formed in a shape such that the curvature radius r1 is positive.

According to Numerical Data Example 1, there is provided an aperture stop ST on the object-side surface of the first lens L1. Here, the position of the aperture stop ST may not be limited to the one in Numerical Data Example 1. The aperture stop ST can be provided closer to the object-side than the first lens L1. Alternatively, the aperture stop ST can be provided between the first lens L1 and the second lens L2; between the second lens L2 and the third lens L3; between the third lens L3 and the fourth lens L4; or the like.

The second lens L2 is formed in a shape such that a curvature radius r3 of a surface thereof on the object-side and a curvature radius r4 of a surface thereof on the image plane side are both positive. The second lens L2 has a shape of a meniscus lens directing a convex surface thereof to the object side near the optical axis. The shape of the second lens L2 may not be limited to the one in Numerical Data Example 1. The second lens L2 can be formed in any shape as long as the refractive power thereof is negative. In addition to the shape in Numerical Data Example 1, the second lens L2 can be formed in a shape such that the curvature radius r3 and the curvature radius r4 are both negative, or such that the curvature radius r3 is negative and the curvature radius r4 is positive. The first of the above-described shapes is a shape directing a concave surface thereof to the object side near the optical axis, and the latter one is a shape of a biconcave lens near the optical axis. In view of downsizing the imaging lens, the first lens L1 may be preferably formed in a shape such that the curvature radius r3 is positive.

The third lens L3 is formed in a shape such that a curvature radius r5 of a surface thereof on the object-side is positive and a curvature radius r6 of a surface thereof on the image plane side is negative. The third lens L3 has a shape of a biconcave lens near the optical axis. The shape of the third lens L3 may not be limited to the one in Numerical Data Example 1. Numerical Data Examples 3, 7, and 11 are examples of a shape, in which the curvature radii r5 and r6 are both positive, i.e., a shape of a meniscus lens directing a convex surface thereof to the object side near the optical axis. Numerical Data Examples 5, and 10 are examples of a shape, in which the curvature radii r5 and r6 are both negative, i.e., a shape of a meniscus lens directing a concave surface thereof to the object side near the optical axis. The third lens L3 can be formed in any shape as long as the refractive power thereof is positive.

The fourth lens L4 has positive refractive power.

The fourth lens L4 is formed in a shape such that a curvature radius r7 of a surface thereof on the object-side and a curvature radius r8 of a surface thereof on the image plane side are both negative. The fourth lens L4 has a shape of a meniscus lens directing a concave surface thereof to the object side near the optical axis. The shape of the fourth lens L4 may not be limited to the one in Numerical Data Example 1. Numerical Data Examples 2, and 4 are examples of a shape, in which the curvature radii r7 and r8 are both positive, i.e., a shape of a meniscus lens directing a convex surface thereof to the object side near the optical axis. The Numerical Data Examples 3, 7, 10, and 11 are examples of a shape, in which the curvature radius r7 is positive and the curvature radius r8 is negative, so as to have a shape of a biconvex lens near the optical axis.

According to the embodiment, the imaging lens satisfies the following conditional expression:

$$0 < f34.$$

In the above formula, f34 is a composite focal length of the third lens L3 and the fourth lens L4.

The fifth lens L5 has positive refractive power. The refractive power of the fifth lens L5 is not limited to positive refractive power. Numerical Data Examples 5 through 11 are examples of lens configurations, in which the fifth lens L5 has negative refractive power.

The fifth lens L5 is formed in a shape such that a curvature radius r9 of a surface thereof on the object-side is positive and a curvature radius r10 of a surface thereof on the image plane side is negative. The fifth lens L5 has a shape of a biconvex lens near the optical axis. The shape of the fifth lens L5 may not be limited to the one in Numerical Data Example 1. Numerical Data Examples 3, 6 through 11 are examples of a shape, in which the curvature radii r9 and r10 are both negative, i.e., a shape of a meniscus lens directing a concave surface thereof to the object side near the optical axis. The Numerical Data Examples 5 is an example of a shape, in which the curvature radius r9 is negative and the curvature radius r10 is positive, so as to have a shape of a biconcave lens near the optical axis.

The sixth lens L6 has negative refractive power. The refractive power of the sixth lens L6 is not limited to negative refractive power. Numerical Data Examples 5 through 8 are examples of lens configurations, in which the sixth lens L6 has positive refractive power.

The sixth lens L6 is formed in a shape such that a curvature radius r11 of a surface thereof on the object-side and a curvature radius r12 of a surface thereof on the image plane side are both positive. The sixth lens L6 has a shape of a meniscus lens directing a convex surface thereof to the object side near the optical axis. The shape of the sixth lens L6 may not be limited to the one in Numerical Data Example 1. Numerical Data Examples 2 through 4, and 6 through 11 are examples of a shape, in which the curvature radii r11 and r12 are both negative, i.e., a shape of a meniscus lens directing a concave surface thereof to the object side near the optical axis. The Numerical Data Examples 5 is an example of a shape, in which the curvature radius r11 is positive and the curvature radius r12 is negative, so as to have a shape of a biconvex lens near the optical axis.

The seventh lens L7 has positive refractive power. The refractive power of the seventh lens L7 is not limited to positive refractive power. Numerical Data Examples 3, 4, 7, 8 and 11 are examples of lens configurations, in which the seventh lens L7 has negative refractive power.

The seventh lens L7 is formed in a shape, such that a curvature radius r13 of a surface thereof on the object-side and a curvature radius r14 of a surface thereof on the image plane side are both negative. The seventh lens L7 has a shape of a meniscus lens directing a concave surface thereof to the object side near the optical axis. The shape of the seventh lens L7 may not be limited to the one in Numerical Data Example 1. In addition to the shapes described above, the seventh lens L7 can be formed in a shape such that the curvature radius r13 is positive and the curvature radius r14 is negative, or such that the curvature radius r13 is negative and the curvature radius r14 is positive.

The eighth lens L8 has positive refractive power. The refractive power of the eighth lens L8 is not limited to positive refractive power. Numerical Data Examples 2, 4, 6, 8 and 10 are examples of lens configurations, in which the eighth lens L8 has negative refractive power.

The eighth lens L8 is formed in a shape such that a curvature radius r15 of a surface thereof on the object-side and a curvature radius r16 of a surface thereof on the image plane side are both positive. The eighth lens L8 has a shape of a meniscus lens directing a convex surface thereof to the object side near the optical axis. The shape of the eighth lens L8 may not be limited to the one in Numerical Data Example 1. Numerical Data Examples 6 and 8 are examples of a shape, in which the curvature radii r15 and r16 are both negative, i.e., a shape of a meniscus lens directing a concave surface thereof to the object side near the optical axis. In addition to the shapes described above, the eighth lens L8 can be formed in a shape such that the curvature radius r15 is negative and the curvature radius r16 is positive.

The ninth lens L9 is formed in a shape such that a curvature radius r17 of a surface thereof on the object-side and a curvature radius r18 (=R9r) of a surface thereof on the image plane side are both positive. The ninth lens L9 has a shape of a meniscus lens directing a convex surface thereof to the object side near the optical axis. The shape of the ninth lens L9 may not be limited to the one in Numerical Data Example 1. The Numerical Data Examples 5 and 10 are examples of a shape, in which the curvature radius r17 is negative and the curvature radius r18 is positive, so as to have a shape of a biconcave lens near the optical axis. In addition to the shapes described above, the ninth lens L9 can be formed in a shape such that the curvature radius r17 and the curvature radius r18 are both negative. The ninth lens L9 can be formed in any shape as long as the refractive power thereof is negative.

The ninth lens L9 is formed in a shape such that a surface thereof on the image plane side has an aspheric shape having an inflection point. Here, the "inflection point" means a point where the positive/negative sign of a curvature radius changes on the curve, i.e., a point where a direction of curving of the curve on the lens surface changes. According to the imaging lens of the embodiment, the image plane-side surface of the ninth lens L9 is formed as an aspheric shape having an extreme point. With such shape of the ninth lens L9, it is achievable to satisfactorily correct off-axis chromatic aberration of magnification as well as axial chromatic aberration, and to suitably restrain the incident angle of a light beam emitted from the imaging lens to the image plane within the range of the chief ray angle (CRA). According to the imaging lens of Numerical Data Example 1, both surfaces of the eighth lens L8 and the ninth lens L9 are formed as aspheric shapes having an inflection point. For this reason, it is achievable to more satisfactorily correct aberrations at periphery of the image, while restraining the incident angle of a light beam emitted from the imaging lens within the range of CRA. Here, depending on the required optical performance and downsizing of the imaging lens, among lens surfaces of the eighth lens L8 and the ninth lens L9, lens surfaces other than the image plane-side surface of the ninth lens L9 can be formed as an aspheric shape without an inflection point.

According to the embodiment, the imaging lens satisfied the following conditional expressions (1) through (14):

$0.5 < f123/f < 2.5$ (1)

$f789 < 0$ (2)

$-6 < f3/f2 < -0.2$ (3)

$0.003 < D34/f < 0.04$ (4)

$0.5 < T8/T7 < 4$ (5)

$0.05 < D89/f < 0.15$ (6)

$0.2 < R9r/f < 0.6$ (7)

$-2 < f9/f < -0.2$ (8)

$10 < |f4/f| < 60$ (9)

$35 < vd1 < 80$ (10)

$10 < vd2 < 30$ (11)

$35 < vd3 < 80$ (12)

$1.0 < TL/f < 1.5$ (13)

$1.0 < TL/Hmax < 1.8$ (14)

In the above conditional expressions,
f: Focal length of the whole lens system
f2: Focal length of the second lens L2
f3: Focal length of the third lens L3
f4: Focal length of the fourth lens L4
f9: Focal length of the ninth lens L9
f123: Composite focal length of the first lens L1, the second lens L2 and the third lens L3
f789: Composite focal length of the seventh lens L7, the eighth lens L8 and the ninth lens L9
T7: Thickness of the seventh lens L7 on an optical axis
T8: Thickness of the eighth lens L8 on an optical axis
vd1: Abbe's number of the first lens L1
vd2: Abbe's number of the second lens L2
vd3: Abbe's number of the third lens L3
R9r: Paraxial curvature radius of an image plane-side surface of the ninth lens L9
D34: Distance on the optical axis X between the third lens L3 and the fourth lens L4
D89: Distance on the optical axis X between the eighth lens L8 and the ninth lens L9
Hmax: Maximum image height
TL: Distance on an optical axis X from the object-side surface of the first lens L1 to the image plane IM (the filter 10 is a distance in the air)

When the sixth lens L6 has positive refractive power and the seventh lens L7 has positive refractive power as in the lens configurations in Numerical Data Examples 5 and 6, the imaging lens further satisfies the following conditional expression (15):

$1.5 < f6/f < 6$ (15)

In the above conditional expressions, f6 is a focal length of the sixth lens L6.

When the seventh lens L7 has negative refractive power and the eighth lens L8 has positive refractive power as in the lens configurations in Numerical Data Examples 3, 7 and 11, the imaging lens further satisfies the following conditional expression (16):

$1 < f8/f < 6$ (16)

In the above conditional expression, f8 is a focal length of the eighth lens L8.

According to the embodiment, the imaging lens satisfies the following conditional expression (17):

$f/\text{Dep} < 2.4$ (17)

In the above conditional expression, Dep is a diameter of entrance pupil of the imaging lens.

Here, it is not necessary to satisfy all of the conditional expressions, and it is achievable to obtain an effect corresponding to the respective conditional expression when any single one of the conditional expressions is individually satisfied.

According to the embodiment, lens surfaces of the respective lenses are formed as aspheric surfaces. An equation that expresses those aspheric surfaces is shown below:

$$Z = \frac{C \cdot H^2}{1 + \sqrt{1 - (1+k) \cdot C^2 \cdot H^2}} + \sum (An \cdot H^n)$$ [Equation 1]

In the above conditional expression,
Z: Distance in a direction of the optical axis
H: Distance from the optical axis in a direction perpendicular to the optical axis
C: Paraxial curvature (=1/r, r: paraxial curvature radius)
k: Conic constant
An: The nth aspheric coefficient Next, Numerical Data Examples of the imaging lens of the embodiment will be described. In each Numerical Data Example, f represents a focal length of the whole lens system, Fno represents a F-number, and ω represents a half angle of view, respectively. In addition, i represents a surface number counted from the object side, r represents a curvature radius, d represents a distance on the optical axis between lens surfaces (surface spacing), nd represents a refractive index at a reference wavelength of 588 nm, and vd represents an Abbe's number at the reference wavelength, respectively. Here, surfaces indicated with surface numbers i affixed with * (asterisk) are aspheric surfaces.

Numerical Data Example 1

Basic Lens Data

TABLE 1 f = 5.68 mm Fno = 1.9 ω = 39.6°

| | i | r | d | n d | ν d | [mm] |
|---|---|---|---|---|---|---|
| | | ∞ | ∞ | | | |
| L1 | 1* | 2.449 | 0.735 | 1.5443 | 55.9 | f1 = 4.927 |
| | 2*(ST) | 25.250 | 0.053 | | | |
| L2 | 3* | 3.873 | 0.232 | 1.6707 | 19.2 | f2 = −11.959 |
| | 4* | 2.549 | 0.451 | | | |
| L3 | 5* | 29.386 | 0.322 | 1.5443 | 55.9 | f3 = 39.344 |
| | 6* | −78.645 | 0.164 | | | |
| L4 | 7* | −15.450 | 0.368 | 1.5443 | 55.9 | f4 = 254.929 |
| | 8* | −14.019 | 0.031 | | | |
| L5 | 9* | 73.756 | 0.335 | 1.5443 | 55.9 | f5 = 31.319 |
| | 10* | −22.136 | 0.084 | | | |
| L6 | 11* | 10.710 | 0.320 | 1.5443 | 55.9 | f6 = −76.822 |
| | 12* | 8.436 | 0.337 | | | |
| L7 | 13* | −3.849 | 0.307 | 1.6707 | 19.2 | f7 = 73.662 |
| | 14* | −3.685 | 0.103 | | | |

TABLE 1-continued f = 5.68 mm Fno = 1.9 ω = 39.6°

| | i | r | d | n d | ν d | [mm] |
|---|---|---|---|---|---|---|
| L8 | 15* | 5.770 | 0.593 | 1.5443 | 55.9 | f8 = 12.656 |
| | 16* | 34.237 | 0.505 | | | |
| L9 | 17* | 12.431 | 0.627 | 1.5443 | 55.9 | f9 = −5.133 |
| | 18* | 2.241 | 0.280 | | | |
| | 19 | ∞ | 0.210 | 1.5168 | 64.2 | |
| | 20 | ∞ | 0.774 | | | |
| (IM) | | ∞ | | | | |

$f123 = 6.413$ mm
$f789 = -12.710$ mm
$f34 = 34.396$ mm
$f89 = -10.730$ mm
$T7 = 0.307$ mm
$T8 = 0.593$ mm
$D34 = 0.164$ mm
$D89 = 0.505$ mm
$TL = 6.759$ mm
$Hmax = 4.70$ mm
$Dep = 3.004$ mm

TABLE 2

Aspherical surface data

| i | k | A4 | A6 | A8 | A10 | A12 | A14 | A16 |
|---|---|---|---|---|---|---|---|---|
| 1 | 1.596E−01 | −2.809E−05 | −1.763E−03 | 1.538E−03 | −1.234E−03 | 3.575E−04 | 2.314E−05 | −2.293E−05 |
| 2 | 0.000E+00 | −2.103E−02 | 2.809E−02 | −1.854E−02 | 6.964E−03 | −1.155E−03 | −4.096E−05 | 1.997E−05 |
| 3 | −1.592E+01 | −3.180E−02 | 3.591E−02 | −2.036E−02 | 7.277E−03 | −7.931E−04 | −2.521E−04 | 3.892E−05 |
| 4 | −1.055E+01 | 2.966E−02 | −2.000E−02 | 1.781E−02 | −7.661E−03 | 2.505E−03 | −7.223E−04 | 2.167E−04 |
| 5 | −3.340E+03 | −5.173E−03 | −5.960E−02 | −4.977E−04 | −9.541E−04 | 5.056E−04 | 3.619E−04 | 1.287E−05 |
| 6 | 0.000E+00 | −2.367E−02 | −4.644E−02 | −2.003E−02 | −1.931E−04 | 3.362E−04 | 1.312E−04 | 5.003E−05 |
| 7 | 0.000E+00 | −1.139E−02 | −1.414E−02 | 2.120E−03 | 2.433E−04 | −4.450E−05 | 6.296E−05 | 1.362E−05 |
| 8 | 0.000E+00 | −9.928E−03 | −1.849E−02 | −3.913E−05 | 1.469E−03 | 2.732E−05 | −2.115E−04 | −5.735E−07 |
| 9 | 0.000E+00 | −2.701E−02 | −1.053E−02 | 6.084E−05 | −5.033E−04 | 5.285E−05 | 1.589E−04 | −5.141E−05 |
| 10 | 0.000E+00 | −1.728E−02 | −1.322E−02 | −3.890E−04 | 1.106E−03 | 6.911E−03 | −1.770E−05 | 5.570E−05 |
| 11 | 0.000E+00 | −6.285E−03 | −1.675E−02 | 1.414E−03 | −6.246E−04 | −1.600E−05 | 1.467E−04 | −3.402E−05 |
| 12 | 0.000E+00 | −2.921E−02 | 1.024E−02 | −5.023E−03 | −1.718E−03 | 1.892E−03 | −4.964E−04 | 4.178E−05 |
| 13 | 1.722E+00 | −1.581E−03 | 2.259E−02 | −1.508E−02 | 5.786E−03 | −1.060E−03 | 6.904E−05 | −4.463E−07 |
| 14 | −5.681E+00 | −1.732E−02 | 2.294E−02 | −1.170E−02 | 3.418E−03 | −5.125E−04 | 3.017E−05 | −2.400E−07 |
| 15 | −1.545E+01 | −8.400E−03 | 1.712E−03 | −2.780E−03 | 5.804E−04 | −9.580E−05 | 1.110E−05 | −4.282E−07 |
| 16 | 0.000E+00 | 1.692E−02 | −4.024E−03 | −6.828E−04 | 1.790E−04 | −1.078E−05 | 1.733E−07 | −2.112E−09 |
| 17 | 6.588E+00 | −8.207E−02 | 1.852E−02 | −2.344E−03 | 2.140E−04 | −1.420E−05 | 5.771E−07 | −1.023E−08 |
| 18 | −5.072E+00 | −5.346E−02 | 1.438E−02 | −2.864E−03 | 3.587E−04 | −2.641E−05 | 1.028E−06 | −1.607E−08 |

The values of the respective conditional expressions are as follows:

$f123/f = 1.129$ $f3/f2 = -3.290$ $D34/f = 0.029$ $T8/T7 = 1.932$ $D89/f = 0.089$ $R9r/f = 0.395$ $f9/f = -0.904$ $|f4/f| = 44.882$ $TL/f = 1.190$ $TL/Hmax = 1.438$ $f/Dep = 1.89$ Accordingly, the imaging lens of Numerical Data Example 1 satisfies the above-described conditional expressions.

Figure 2:
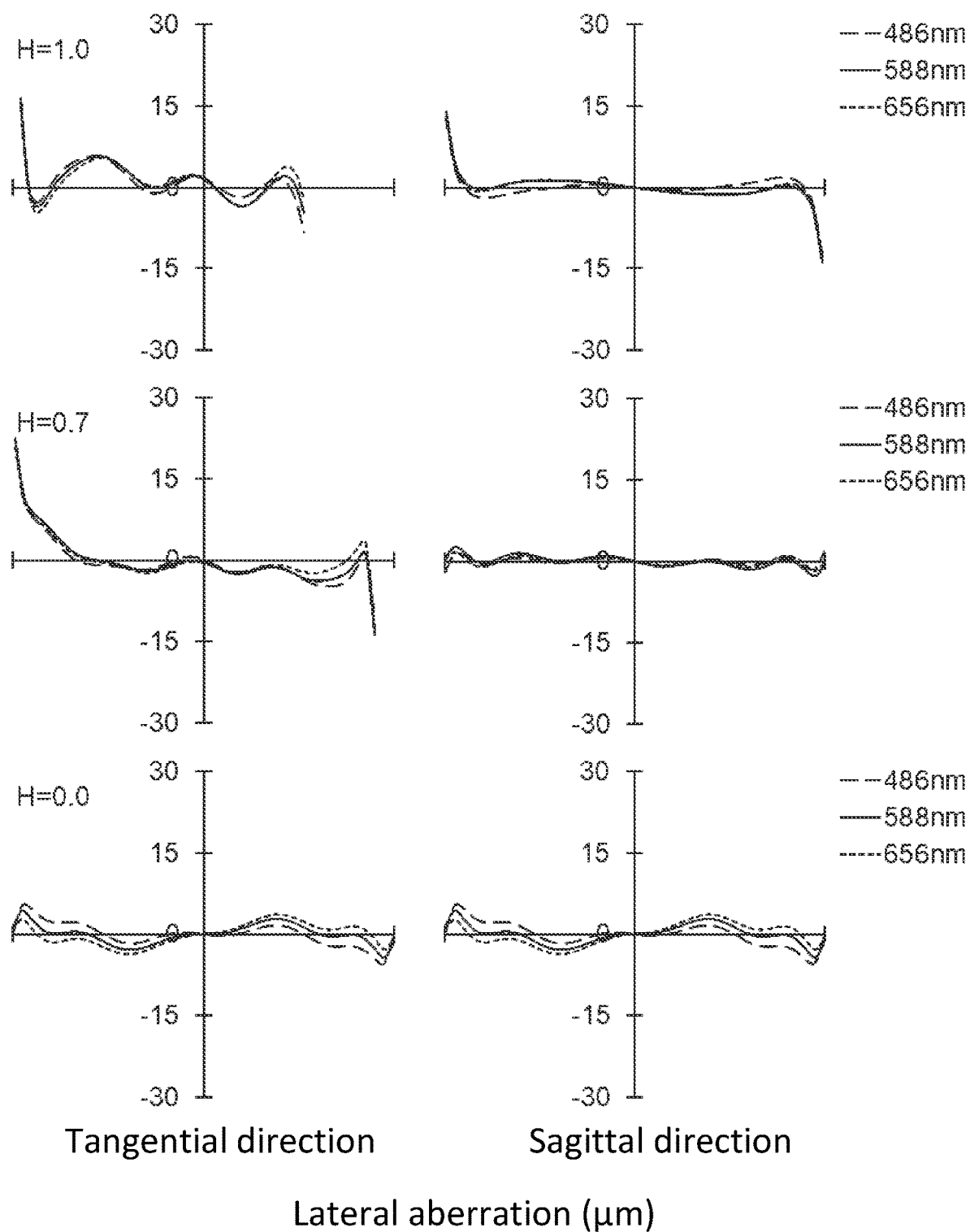
FIG. 2 is an aberration diagram showing a lateral aberration of the imaging lens of FIG. 1.
Figure 3:
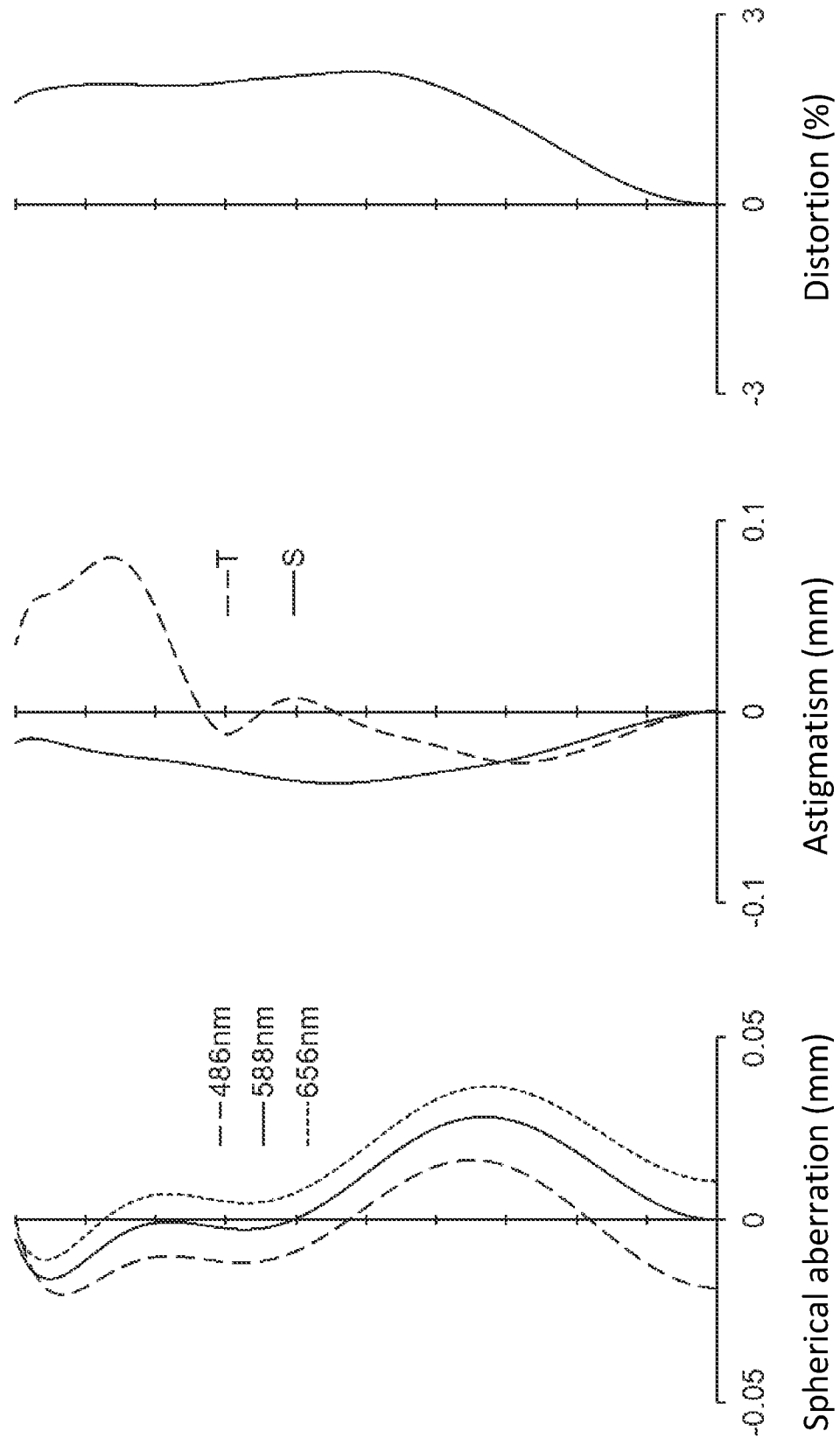
FIG. 3 is an aberration diagram showing a spherical aberration, astigmatism, and a distortion of the imaging lens of FIG. 1.
Figure 4:
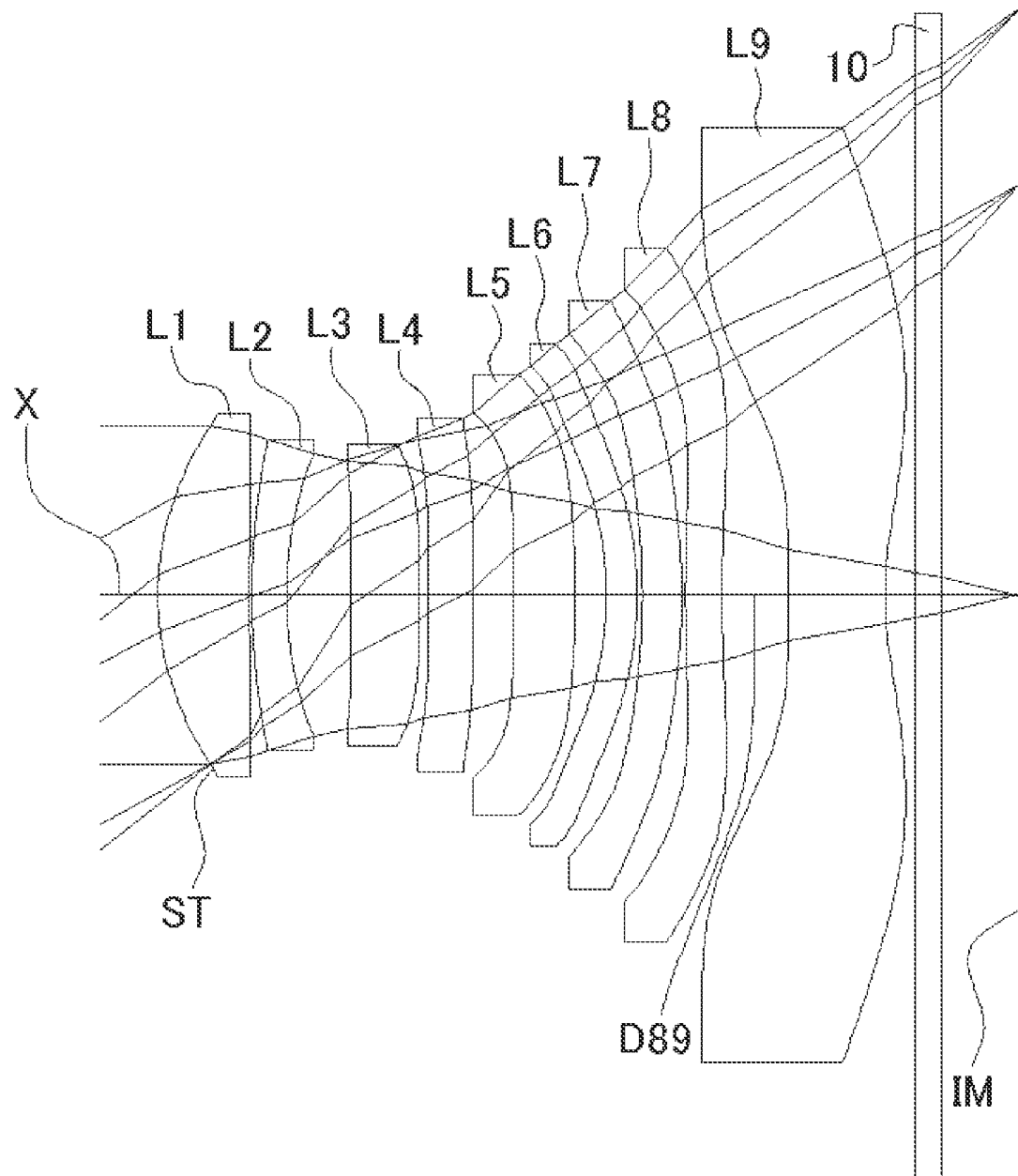
FIG. 4 shows a sectional view of a schematic configuration of an imaging lens in Numerical Data Example 2 of the present invention.

FIG. 2 shows a lateral aberration that corresponds to a half angle of view co, which is divided into a tangential direction and a sagittal direction (The same is true for FIGS. 5, 8, 11, 14, 17, 20, 23, 26, 29 and 32). FIG. 3 shows a spherical aberration (mm), astigmatism (mm), and a distortion (%), respectively. The aberration diagrams of the astigmatism and the distortion show aberrations at a reference wavelength (588 nm). Furthermore, in the aberration diagrams of the astigmatism shows sagittal image planes (S) and tangential image planes (T), respectively (The same is true for FIGS. 6, 9, 12, 15, 18, 21, 24, 27, 30 and 33). As shown in FIGS. 2 and 3, according to the imaging lens of Numerical Data Example 1, the aberrations can be satisfactorily corrected.

Numerical Data Example 2

Basic Lens Data

TABLE 3

| | i | r | d | n d | ν d | [mm] |
|---|---|---|---|---|---|---|
| | | f = 6.08 mm Fno = 2.2 ω = 37.7° | | | | |
| L1 | 1* | ∞ | ∞ | | | |
| | | 2.334 | 0.745 | 1.5443 | 55.9 | f1 = 4.893 |
| | 2*(ST) | 16.738 | 0.021 | | | |
| L2 | 3* | 5.043 | 0.285 | 1.6707 | 19.2 | f2 = −13.267 |
| | 4* | 3.146 | 0.524 | | | |
| L3 | 5* | 80.262 | 0.560 | 1.5443 | 55.9 | f3 = 50.126 |
| | 6* | −41.233 | 0.067 | | | |
| L4 | 7* | 27.557 | 0.369 | 1.5443 | 55.9 | f4 = 86.620 |
| | 8* | 66.007 | 0.323 | | | |
| L5 | 9* | 19.502 | 0.511 | 1.5443 | 55.9 | f5 = 13.343 |
| | 10* | −11.465 | 0.254 | | | |
| L6 | 11* | −2.954 | 0.252 | 1.6707 | 19.2 | f6 = −87383 |
| | 12* | −3.217 | 0.042 | | | |
| L7 | 13* | −5.926 | 0.322 | 1.5443 | 55.9 | f7 = 100.754 |
| | 14* | −5.451 | 0.031 | | | |
| L8 | 15* | 16.055 | 0.299 | 1.5443 | 55.9 | f8 = −81.403 |
| | 16* | 11.707 | 0.540 | | | |
| L9 | 17* | 83.889 | 0.790 | 1.5443 | 55.9 | f9 = −5.485 |
| | 18* | 2.873 | 0.250 | | | |
| | 19 | ∞ | 0.210 | 1.5168 | 64.2 | |
| | 20 | ∞ | 0.635 | | | |
| (IM) | | ∞ | | | | | f123=6.268 mm
f789=−5.342 mm
f34=31.756 mm
f89=−5.107 mm
T7=0.322 mm
T8=0.299 mm
D34=0.067 mm
D89=0.540 mm
TL=6.956 mm
Hmax=4.70 mm
Dep=2.763 mm

TABLE 4

| | Aspherical surface data | | | | | | | |
|---|---|---|---|---|---|---|---|---|
| i | k | A4 | A6 | A8 | A10 | A12 | A14 | A16 |
| 1 | 4.880E−01 | −5.227E−03 | −3.718E−03 | 4.169E−04 | 7.015E−05 | −8.771E−04 | 4.755E−04 | −1.018E−04 |
| 2 | 0.000E+00 | −4.515E−02 | 5.024E−02 | −3.097E−02 | 8.543E−03 | 1.986E−04 | −7.102E−04 | 1.067E−04 |
| 3 | −2.868E+01 | −2.082E−02 | 3.165E−02 | −1.242E−02 | 1.722E−03 | −4.847E−04 | 7.671E−04 | −2.241E−04 |
| 4 | −5.582E+00 | 1.580E−02 | −1.515E−02 | 4.259E−02 | −4.677E−02 | 3.176E−02 | −1.260E−02 | 2.516E−03 |
| 5 | 0.000E+00 | −1.786E−02 | −6.527E−03 | −2.481E−03 | 7.567E−03 | −8.257E−03 | 3.355E−03 | 1.454E−05 |
| 6 | 0.000E+00 | −5.176E−02 | −2.188E−02 | −5.025E−03 | 1.134E−02 | −2.738E−04 | −2.384E−03 | 7.130E−04 |
| 7 | 0.000E+00 | −3.577E−02 | −2.207E−02 | 7.948E−03 | 1.122E−03 | 1.330E−03 | 7.454E−05 | −2.252E−04 |
| 8 | 0.000E+00 | −3.611E−02 | 9.891E−03 | −4.100E−03 | 6.217E−04 | 6.418E−04 | −4.383E−04 | 1.514E−04 |
| 9 | 0.000E+00 | −5.604E−02 | 5.027E−03 | −1.294E−02 | 6.302E−03 | −2.229E−03 | 2.535E−04 | 2.055E−05 |
| 10 | 0.000E+00 | −2.273E−02 | 3.461E−03 | −1.281E−03 | −2.300E−03 | 1.270E−03 | −1.944E−04 | 1.625E−06 |
| 11 | −4.159E−02 | −2.244E−02 | 1.538E−02 | −1.151E−04 | −7.550E−04 | 1.965E−04 | −5.221E−05 | 2.364E−06 |
| 12 | −5.116E+00 | −4.191E−02 | 1.753E−02 | −5.069E−03 | 2.133E−03 | −4.527E−04 | 6.806E−06 | 4.074E−06 |
| 13 | 0.000E+00 | 3.671E−03 | 3.116E−03 | −3.195E−03 | 3.982E−04 | −2.701E−05 | 1.442E−05 | −1.709E−06 |
| 14 | 0.000E+00 | 1.202E−02 | −5.005E−03 | −4.778E−05 | 1.706E−04 | −6.530E−06 | −7.463E−07 | −8.462E−08 |
| 15 | 0.000E+00 | −7.208E−03 | −5.817E−03 | 2.652E−04 | 3.604E−04 | −1.080E−04 | 1.575E−05 | −9.747E−07 |
| 16 | 0.000E+00 | −1.428E−02 | 1.413E−03 | −6.500E−04 | 1.034E−04 | −7.395E−06 | 6.189E−07 | −4.144E−08 |
| 17 | 0.000E+00 | −8.241E−02 | 1.935E−02 | −1.764E−03 | 3.096E−05 | 5.837E−06 | −3.662E−07 | 4.905E−09 |
| 18 | −7.681E+00 | −4.147E−02 | 1.063E−02 | −1.960E−03 | 2.327E−04 | −1.632E−05 | 6.130E−07 | −9.504E−09 |

The values of the respective conditional expressions are as follows:

$f123/f=1.031$ $f3/f2=-3.778$ $D34/f=0.011$ $T8/T7=0.929$ $D89/f=0.089$ $R9r/f=0.473$ $f9/f=-0.902$ $|f4/f|=14.247$ $TL/f=1.144$ $TL/Hmax=1.480$ $f/Dep=2.20$ Accordingly, the imaging lens of Numerical Data Example 2 satisfies the above-described conditional expressions.

Figure 5:
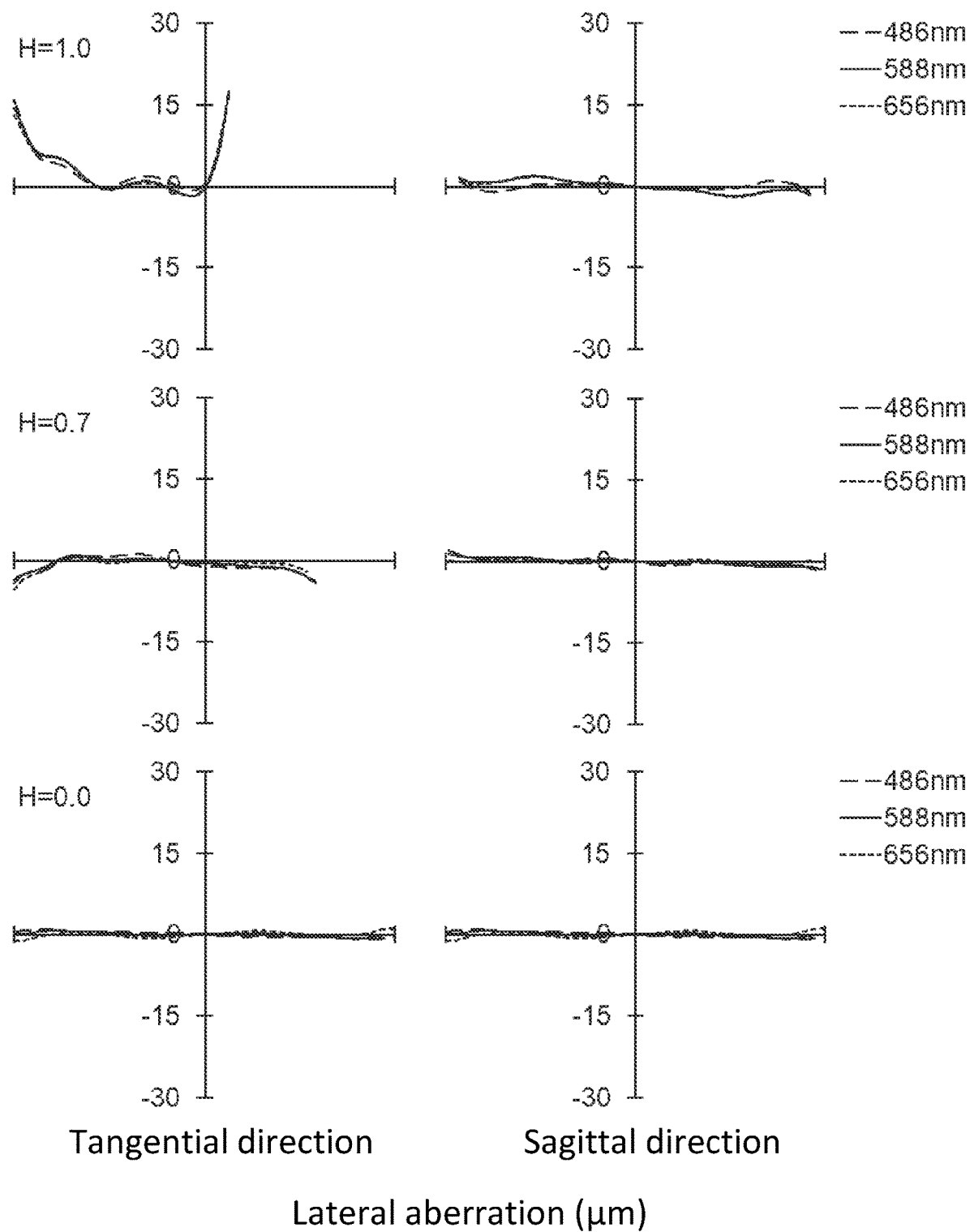
FIG. 5 is an aberration diagram showing a lateral aberration of the imaging lens of FIG. 4.
Figure 6:
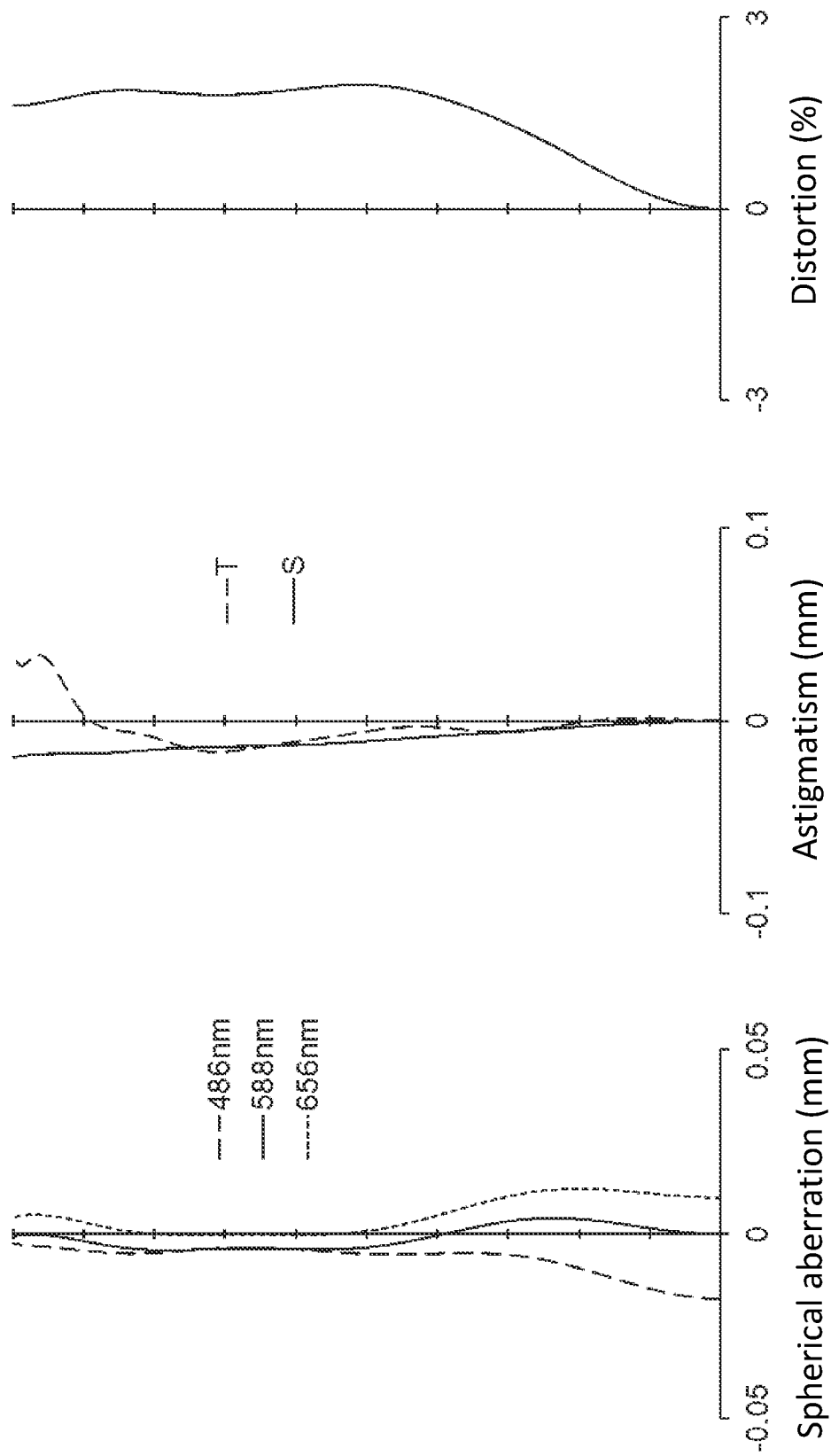
FIG. 6 is an aberration diagram showing a spherical aberration, astigmatism, and a distortion of the imaging lens of FIG. 4.
Figure 7:
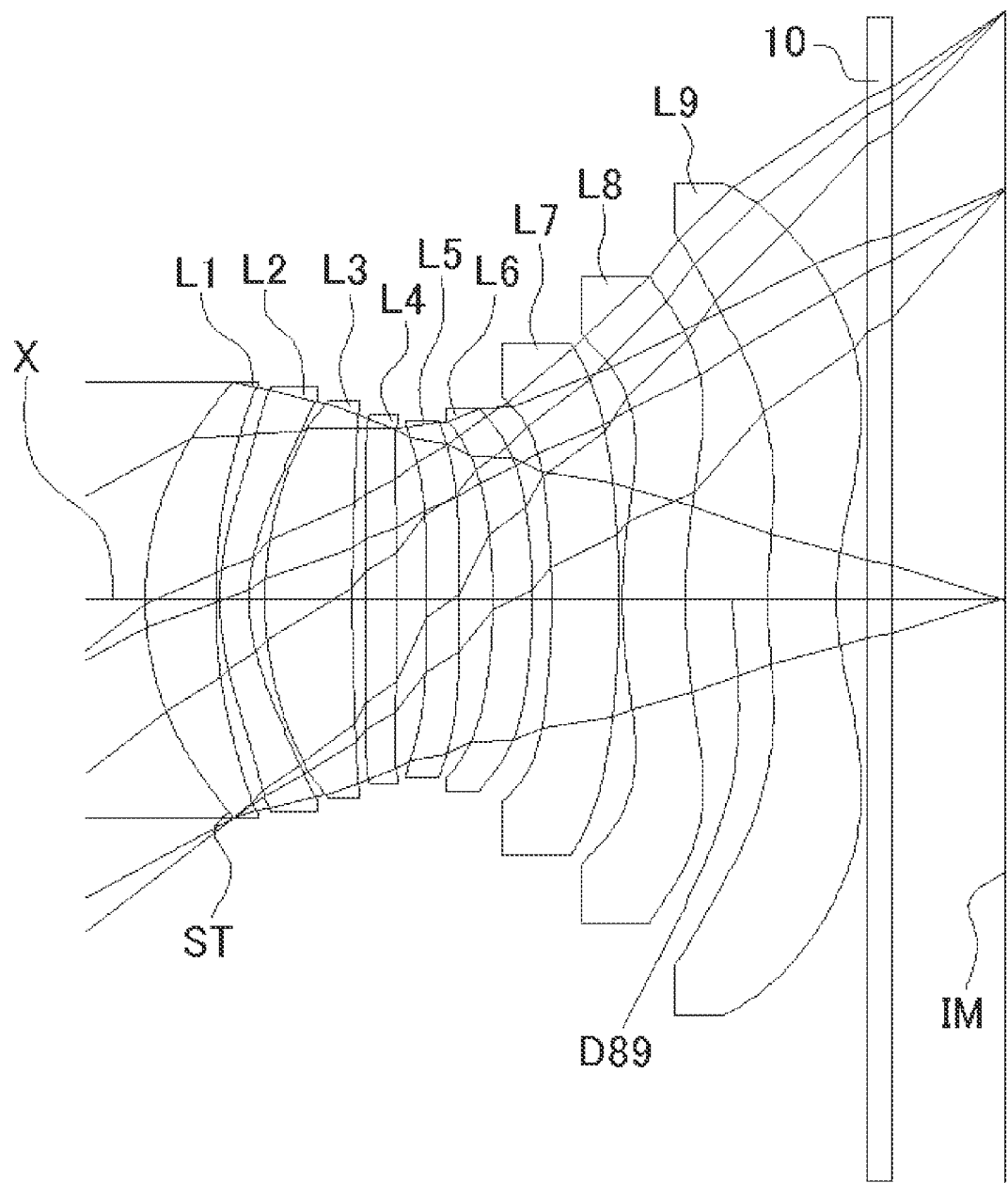
FIG. 7 shows a sectional view of a schematic configuration of an imaging lens in Numerical Data Example 3 of the present invention.

FIG. 5 shows a lateral aberration that corresponds to an image height H and FIG. 6 shows a spherical aberration (mm), astigmatism (mm), and a distortion (%), respectively. As shown in FIGS. 5 and 6, according to the imaging lens of Numerical Data Example 2, the aberrations can be also satisfactorily corrected.

Numerical Data Example 3

Basic Lens Data

TABLE 5

| | | f = 6.10 mm Fno = 1.7 ω = 37.6° | | | | |
|---|---|---|---|---|---|---|
| | i | r | d | n d | ν d | [mm] |
| | | ∞ | ∞ | | | |
| L1 | 1*(ST) | 2.534 | 0.577 | 1.5443 | 55.9 | f1 = 8.018 |
| | 2* | 5.559 | 0.033 | | | |
| L2 | 3* | 2.199 | 0.240 | 1.6707 | 19.2 | f2 = −10.066 |
| | 4* | 1.586 | 0.128 | | | |
| L3 | 5* | 2.805 | 0.712 | 1.5348 | 55.7 | f3 = 6.429 |
| | 6* | 13.883 | 0.112 | | | |
| L4 | 7* | 75.096 | 0.251 | 1.5348 | 55.7 | f4 = 85.345 |
| | 8* | −116.235 | 0.245 | | | |
| L5 | 9* | −41.080 | 0.268 | 1.5348 | 55.7 | f5 = 111.459 |
| | 10* | −24.375 | 0.272 | | | |
| L6 | 11* | −4.590 | 0.321 | 1.6707 | 19.2 | f6 = −94.517 |
| | 12* | −5.087 | 0.159 | | | |
| L7 | 13* | −6.282 | 0.549 | 1.6707 | 19.2 | f7 = −31.919 |
| | 14* | −9.204 | 0.027 | | | |
| L8 | 15* | 4.172 | 0.518 | 1.5443 | 55.9 | f8 = 26.274 |
| | 16* | 5.634 | 0.671 | | | |
| L9 | 17* | 3.773 | 0.556 | 1.5348 | 55.7 | f9 = −8.687 |
| | 18* | 1.975 | 0.250 | | | |
| | 19 | ∞ | 0.210 | 1.5168 | 64.2 | |
| | 20 | ∞ | 0.923 | | | |
| (IM) | | ∞ | | | | | f123=5.726 mm
f789=−9.353 mm
f34=6.028 mm
f89=−15.304 mm
T7=0.549 mm
T8=0.518 mm
D34=0.112 mm
D89=0.671 mm
TL=6.950 mm
Hmax=4.70 mm
Dep=3.560 mm

TABLE 6

| Aspherical surface data | | | | | |
|---|---|---|---|---|---|
| i | k | A4 | A6 | A8 | A10 |
| 1 | −6.443E−01 | 8.068E−03 | 2.143E−03 | −1.571E−03 | 2.699E−04 |
| 2 | 0.000E+00 | 4.423E−02 | −6.432E−02 | 9.069E−02 | −1.009E−01 |
| 3 | −8.075E+00 | 5.014E−02 | −7.690E−02 | 9.613E−02 | −1.052E−01 |
| 4 | −1.943E+00 | −5.854E−02 | 7.888E−02 | −1.103E−01 | 1.085E−01 |
| 5 | −5.180E+00 | 3.599E−03 | 6.361E−02 | −1.547E−01 | 2.239E−01 |
| 6 | 0.000E+00 | −1.817E−02 | −4.684E−03 | 4.819E−02 | −9.273E−02 |
| 7 | 0.000E+00 | −1.870E−02 | 1.174E−02 | 2.065E−03 | −3.820E−03 |
| 8 | 0.000E+00 | −1.249E−02 | 6.136E−03 | 9.286E−04 | −2.934E−03 |
| 9 | 0.000E+00 | −3.254E−02 | −1.131E−02 | 5.001E−03 | −6.521E−03 |
| 10 | 0.000E+00 | −4.119E−03 | −2.761E−02 | 5.526E−03 | 2.886E−03 |
| 11 | 0.000E+00 | 4.230E−02 | −7.700E−02 | 4.535E−02 | −1.066E−02 |
| 12 | 0.000E+00 | 3.608E−02 | −3.446E−02 | −2.046E−02 | 3.227E−02 |
| 13 | 0.000E+00 | 1.616E−02 | 2.363E−02 | −4.859E−02 | 2.608E−02 |
| 14 | 0.000E+00 | −5.545E−03 | 5.230E−03 | −1.835E−03 | −4.943E−04 |
| 15 | −8.101E−01 | −1.282E−03 | −3.680E−02 | 1.619E−02 | −4.815E−03 |
| 16 | 0.000E+00 | 2.125E−02 | −2.755E−02 | 7.708E−03 | −9.439E−04 |
| 17 | −2.388E−01 | −1.212E−01 | 3.978E−02 | −8.483E−03 | 9.174E−04 |
| 18 | −7.024E+00 | −5.145E−02 | 1.345E−02 | −2.621E−03 | 3.137E−04 |

| i | A12 | A14 | A16 | A18 | A20 |
|---|---|---|---|---|---|
| 1 | 5.319E−05 | −8.179E−06 | −5.405E−06 | −4.391E−07 | 3.391E−07 |
| 2 | 7.464E−02 | −3.519E−02 | 1.017E−02 | −1.646E−03 | 1.145E−04 |
| 3 | 7.850E−02 | −3.720E−02 | 1.077E−02 | −1.739E−03 | 1.201E−04 |
| 4 | −7.483E−02 | 3.385E−02 | −9.262E−03 | 1.397E−03 | −9.146E−05 |
| 5 | −2.006E−01 | 1.105E−01 | −3.620E−02 | 6.494E−03 | −4.923E−04 |
| 6 | 9.979E−02 | −6.273E−02 | 2.276E−02 | −4.492E−03 | 3.863E−04 |

TABLE 6-continued

| | | Aspherical surface data | | | |
|---|---|---|---|---|---|
| 7 | 6.043E−04 | 7.213E−04 | −9.371E−05 | −2.118E−04 | 6.925E−05 |
| 8 | 3.337E−06 | 1.017E−03 | 2.281E−04 | −2.943E−04 | 5.074E−05 |
| 9 | 6.027E−03 | −4.502E−04 | −1.337E−03 | 7.273E−04 | −1.460E−04 |
| 10 | −1.187E−03 | −3.307E−04 | 3.226E−04 | 1.941E−04 | −1.145E−04 |
| 11 | −1.862E−02 | 2.208E−02 | −1.184E−02 | 3.740E−03 | −5.594E−04 |
| 12 | −2.077E−02 | 4.902E−03 | 1.598E−03 | −1.058E−03 | 1.505E−04 |
| 13 | −5.289E−03 | −3.067E−03 | 2.823E−03 | −8.450E−04 | 8.756E−05 |
| 14 | 2.061E−04 | 3.624E−05 | −2.053E−05 | 1.805E−06 | 4.467E−08 |
| 15 | 1.194E−03 | −2.158E−04 | 1.281E−05 | 2.180E−06 | −2.531E−07 |
| 16 | −1.460E−05 | 1.486E−05 | −7.389E−07 | −8.256E−08 | 6.679E−09 |
| 17 | −2.334E−05 | −2.352E−06 | −1.087E−07 | 3.206E−08 | −1.128E−09 |
| 18 | −2.267E−05 | 9.665E−07 | −1.989E−08 | −2.224E−11 | −5.300E−13 |

The values of the respective conditional expressions are as follows:

$f123/f=0.939$ $f3/f2=-0.639$ $D34/f=0.018$ $T8/T7=0.944$ $D89/f=0.110$ $R9r/f=0.324$ $f9/f=-1.424$ $|f4/f|=13.991$ $TL/f=1.139$ $TL/H\mathrm{max}=1.479$ $f/\mathrm{Dep}=1.71$ $f8/f=4.307$ Accordingly, the imaging lens of Numerical Data Example 3 satisfies the above-described conditional expressions.

Figure 8:
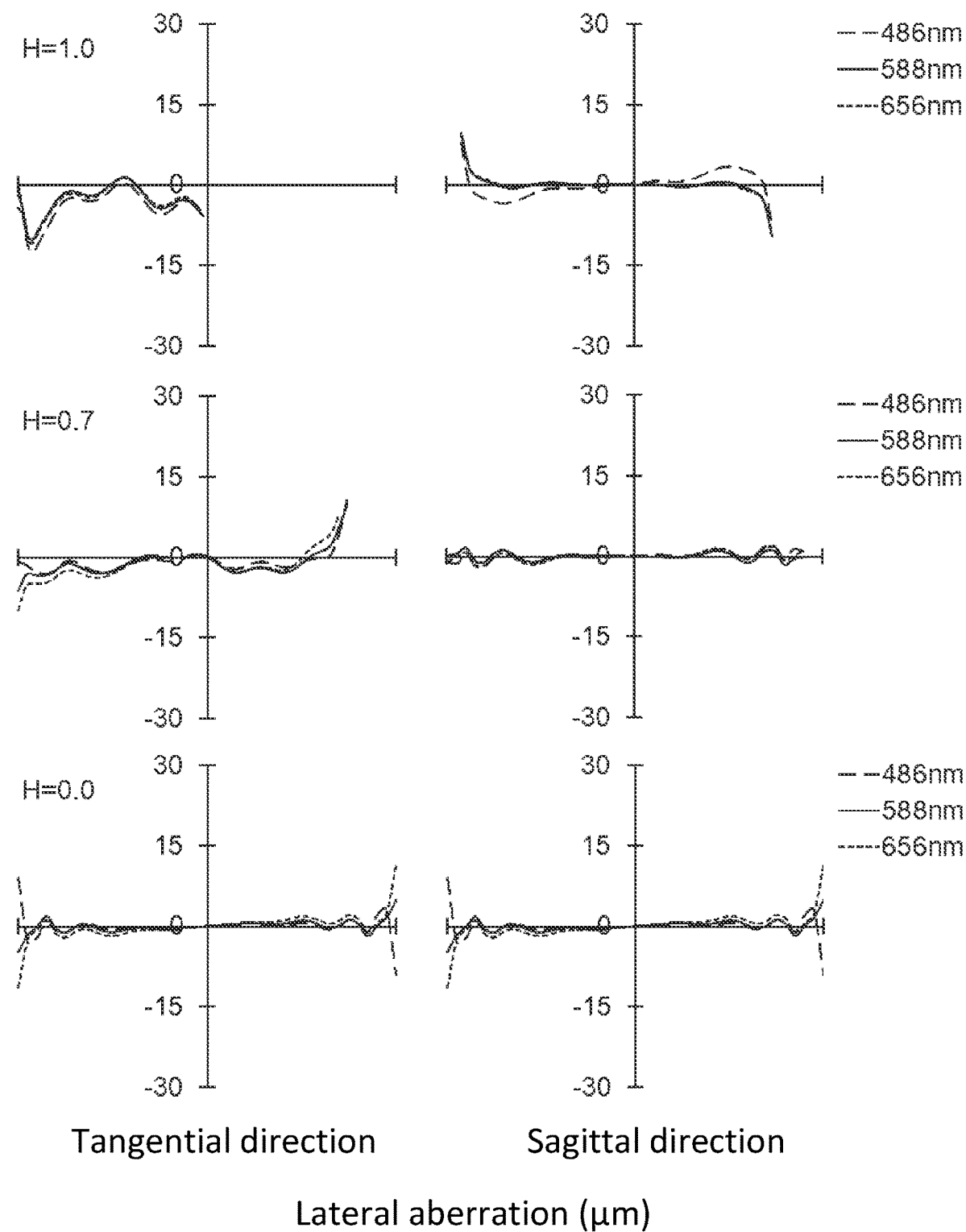
FIG. 8 is an aberration diagram showing a lateral aberration of the imaging lens of FIG. 7.
Figure 9:
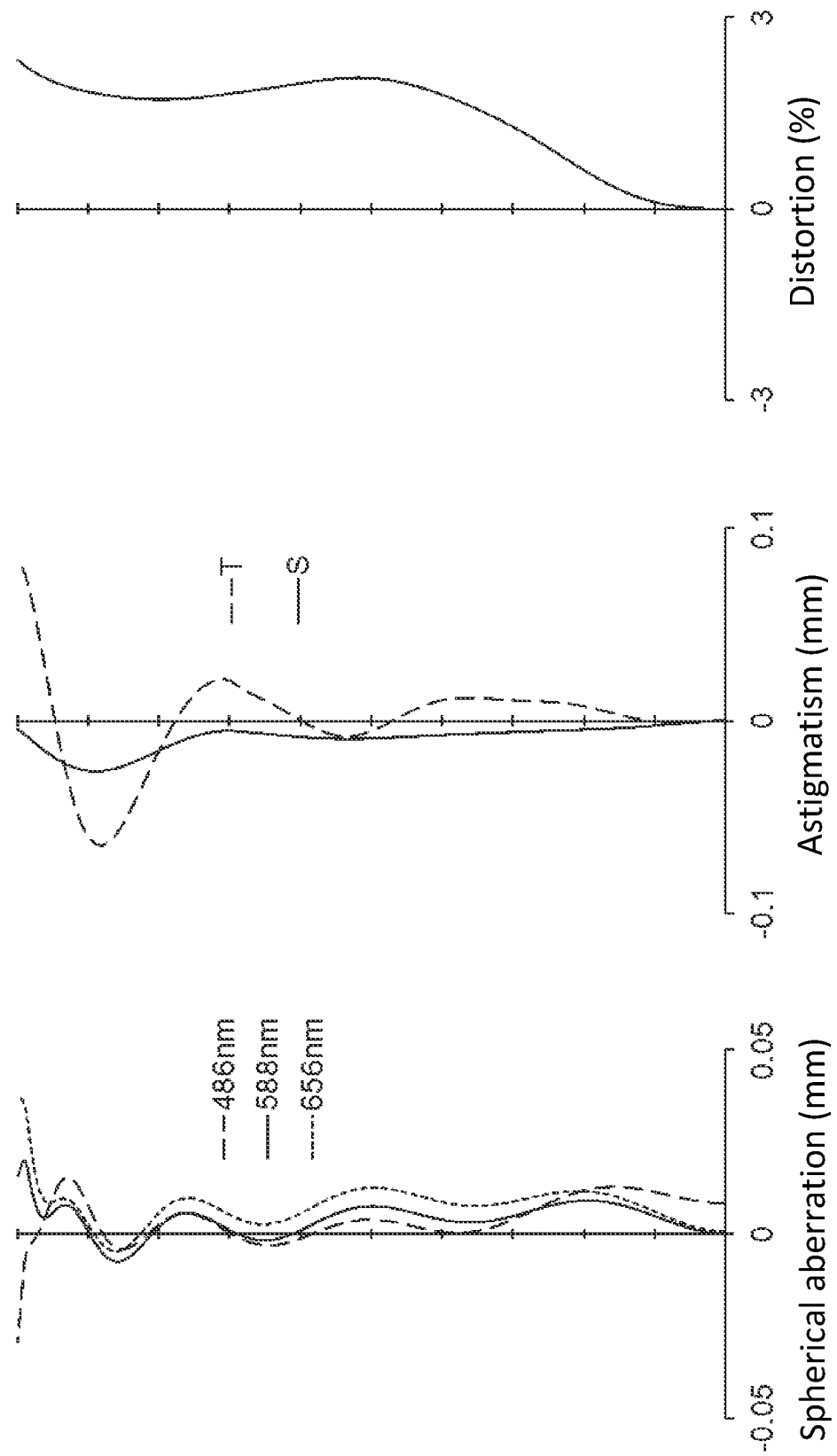
FIG. 9 is an aberration diagram showing a spherical aberration, astigmatism, and a distortion of the imaging lens of FIG. 7.
Figure 10:
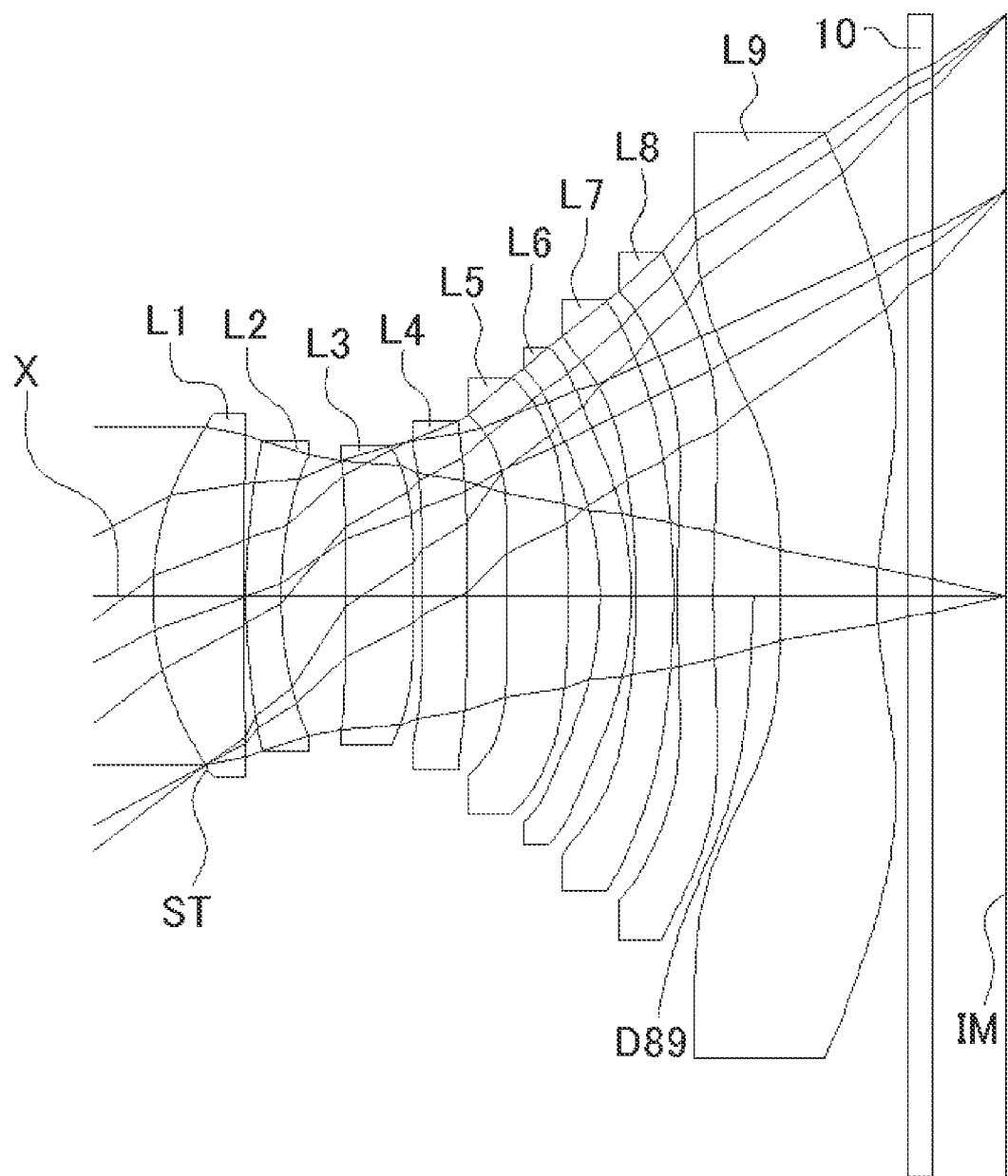
FIG. 10 shows a sectional view of a schematic configuration of an imaging lens in Numerical Data Example 4 of the present invention.

FIG. 8 shows a lateral aberration that corresponds to an image height H and FIG. 9 shows a spherical aberration (mm), astigmatism (mm), and a distortion (%), respectively. As shown in FIGS. 8 and 9, according to the imaging lens of Numerical Data Example 3, the aberrations can be also satisfactorily corrected.

Numerical Data Example 4

Basic Lens Data

TABLE 7

| f = 6.15 mm Fno = 2.2 ω = 37.4° | | | | | | |
|---|---|---|---|---|---|---|
| | i | r | d | nd | νd | [mm] |
| | | ∞ | ∞ | | | |
| L1 | 1* | 2.328 | 0.747 | 1.5443 | 55.9 | f1 = 4.884 |
| | 2*(ST) | 16.630 | 0.021 | | | |
| L2 | 3* | 5.045 | 0.291 | 1.6707 | 19.2 | f2 = −13.349 |
| | 4* | 3.152 | 0.527 | | | |
| L3 | 5* | 78.026 | 0.564 | 1.5443 | 55.9 | f3 = 49.231 |
| | 6* | −40.709 | 0.068 | | | |
| L4 | 7* | 26.693 | 0.370 | 1.5443 | 55.9 | f4 = 82.983 |
| | 8* | 64.944 | 0.330 | | | |
| L5 | 9* | 18.893 | 0.512 | 1.5443 | 55.9 | f5 = 12.970 |
| | 10* | −11.164 | 0.260 | | | |
| L6 | 11* | −2.964 | 0.258 | 1.6707 | 19.2 | f6 = −101.038 |
| | 12* | −3.208 | 0.042 | | | |
| L7 | 13* | −5.877 | 0.309 | 1.5443 | 55.9 | f7 = −101.235 |
| | 14* | −6.700 | 0.031 | | | |
| L8 | 15* | 15.450 | 0.297 | 1.5443 | 55.9 | f8 = −105.279 |
| | 16* | 12.087 | 0.548 | | | |
| L9 | 17* | 68.554 | 0.800 | 1.5443 | 55.9 | f9 = −5.686 |
| | 18* | 2.949 | 0.250 | | | |
| | 19 | ∞ | 0.210 | 1.5168 | 64.2 | |
| | 20 | ∞ | 0.609 | | | |
| (IM) | | ∞ | | | | | f123=6.222 mm
f789=−4.958 mm
f34=30.906 mm
f89=−5.376 mm
T7=0.309 mm
T8=0.297 mm
D34=0.068 mm
D89=0.548 mm
TL=6.971 mm
Hmax=4.70 mm
Dep=2.795 mm

TABLE 8

| | | | | Aspherical surface data | | | | |
|---|---|---|---|---|---|---|---|---|
| i | k | A4 | A6 | A8 | A10 | A12 | A14 | A16 |
| 1 | 4.905E−01 | −5.253E−03 | −3.630E−03 | 4.287E−04 | 5.915E−05 | −8.812E−04 | 4.766E−04 | −9.963E−05 |
| 2 | 0.000E+00 | −4.533E−02 | 5.034E−02 | −3.097E−02 | 8.548E−03 | 2.118E−04 | −7.034E−04 | 1.042E−04 |
| 3 | −2.841E+01 | −2.107E−02 | 3.156E−02 | −1.235E−02 | 1.760E−03 | −4.894E−04 | 7.575E−04 | −2.218E−04 |
| 4 | −5.526E+00 | 1.590E−02 | −1.504E−02 | 4.273E−02 | −4.672E−02 | 3.175E−02 | −1.261E−02 | 2.503E−03 |
| 5 | 0.000E+00 | −1.782E−02 | −6.261E−03 | −2.392E−03 | 7.476E−03 | −8.379E−03 | 3.302E−03 | 4.602E−05 |
| 6 | 0.000E+00 | −5.258E−02 | −2.200E−02 | −5.070E−03 | 1.130E−02 | −2.974E−04 | −2.390E−03 | 7.175E−04 |
| 7 | 0.000E+00 | −3.545E−02 | −2.222E−02 | 7.892E−03 | 1.149E−03 | 1.383E−03 | 1.068E−04 | −2.386E−04 |
| 8 | 0.000E+00 | −3.541E−02 | 1.040E−02 | −3.968E−03 | 6.473E−04 | 6.503E−04 | −4.314E−04 | 1.537E−04 |

TABLE 8-continued

Aspherical surface data

| i | k | A4 | A6 | A8 | A10 | A12 | A14 | A16 |
|---|---|---|---|---|---|---|---|---|
| 9 | 0.000E+00 | −5.646E−02 | 5.381E−03 | −1.285E−02 | 6.342E−03 | −2.197E−03 | 2.621E−04 | 1.114E−05 |
| 10 | 0.000E+00 | −2.251E−02 | 3.392E−03 | −1.290E−03 | −2.286E−03 | 1.271E−03 | −1.958E−04 | 1.420E−06 |
| 11 | 3.865E−02 | −2.312E−02 | 1.522E−02 | −1.157E−04 | −7.537E−04 | 1.988E−04 | −5.157E−05 | 2.139E−06 |
| 12 | −4.861E+00 | −4.235E−02 | 1.738E−02 | −5.080E−03 | 2.137E−03 | −4.522E−04 | 6.774E−06 | 4.109E−06 |
| 13 | 0.000E+00 | 3.675E−03 | 2.988E−03 | −3.217E−03 | 3.889E−04 | −2.773E−05 | 1.468E−05 | −1.593E−06 |
| 14 | 0.000E+00 | 1.141E−02 | −5.033E−03 | −5.806E−05 | 1.693E−04 | −6.763E−06 | −7.718E−07 | −8.299E−08 |
| 15 | 0.000E+00 | −6.789E−03 | −5.857E−03 | 2.697E−04 | 3.606E−04 | −1.079E−04 | 1.576E−05 | −9.752E−07 |
| 16 | 0.000E+00 | −1.465E−02 | 1.471E−03 | −6.524E−04 | 1.032E−04 | −7.362E−06 | 6.296E−07 | −3.978E−08 |
| 17 | 0.000E+00 | −8.270E−02 | 1.936E−02 | −1.763E−03 | 3.099E−05 | 5.837E−06 | −3.664E−07 | 4.882E−09 |
| 18 | −8.125E+00 | −4.158E−02 | 1.061E−02 | −1.960E−03 | 2.328E−04 | −1.632E−05 | 6.127E−07 | −9.507E−09 |

The values of the respective conditional expressions are as follows:

$f123/f = 1.012$ $f3/f2 = -3.688$ $D34/f = 0.011$ $T8/T7 = 0.961$ $D89/f = 0.089$ $R9r/f = 0.480$ $f9/f = -0.925$ $|f4/f| = 13.493$ $TL/f = 1.133$ $TL/H\text{max} = 1.483$ $f/\text{Dep} = 2.20$ Accordingly, the imaging lens of Numerical Data Example 4 satisfies the above-described conditional expressions.

Figure 11:
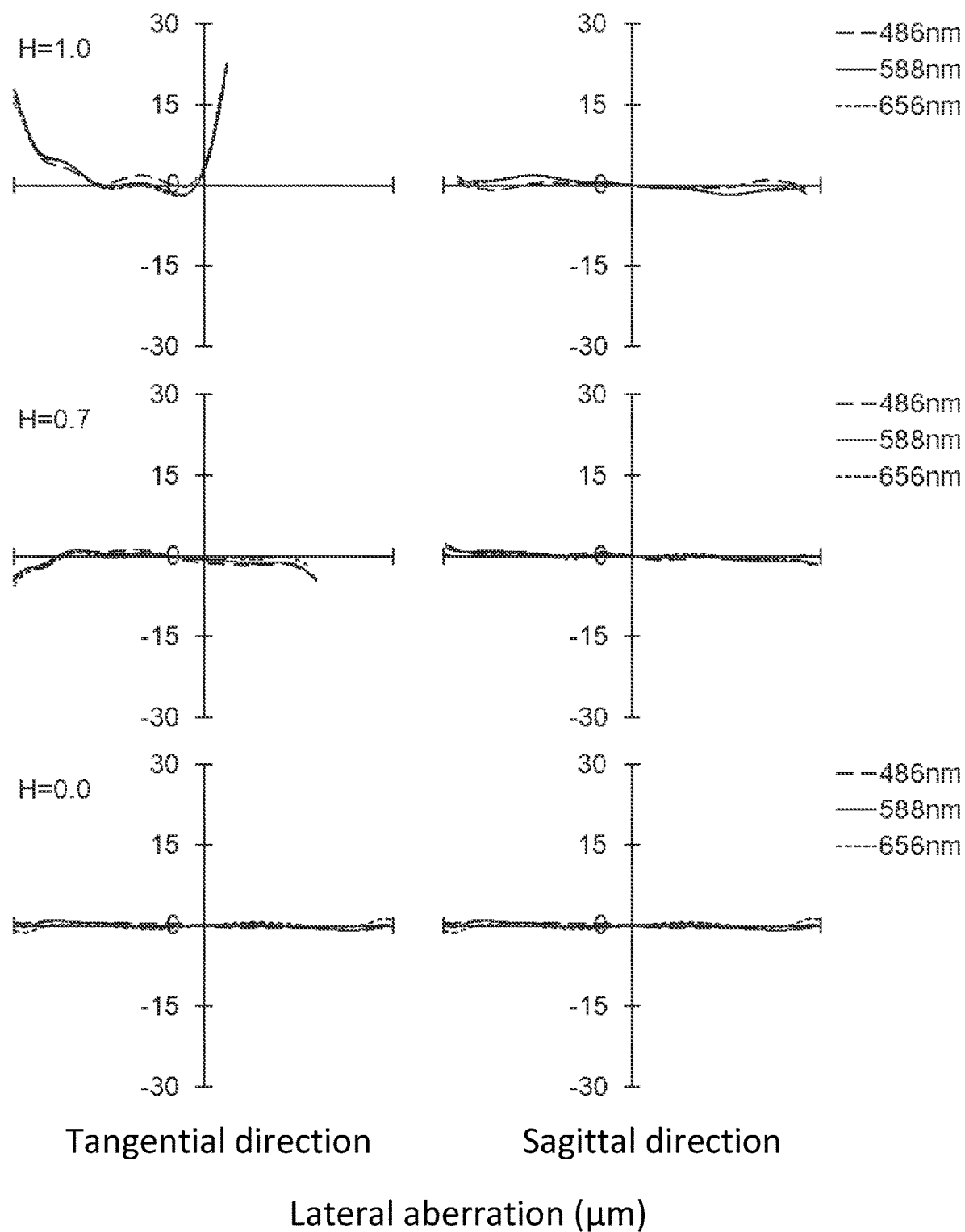
FIG. 11 is an aberration diagram showing a lateral aberration of the imaging lens of FIG. 10.
Figure 12:
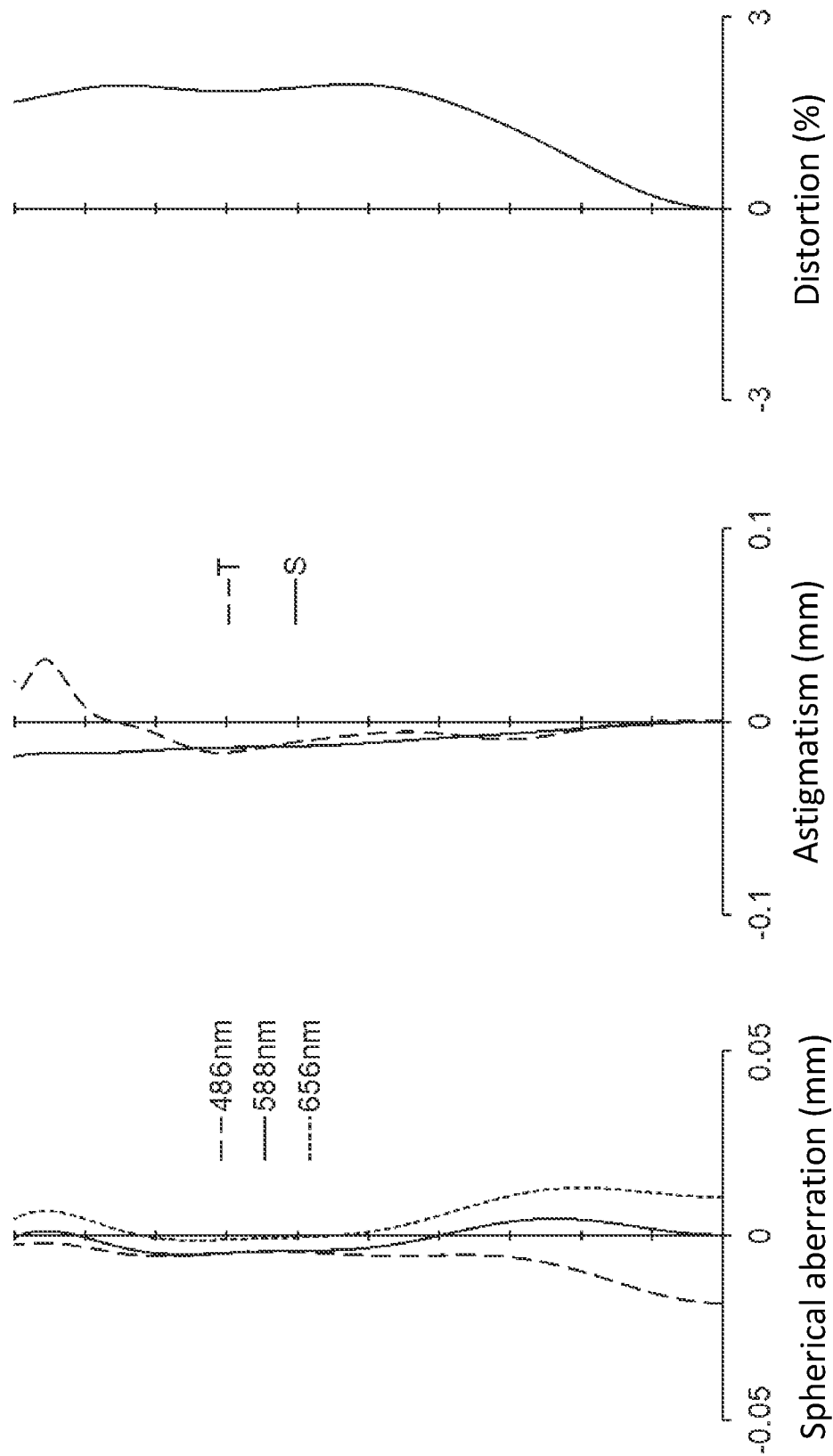
FIG. 12 is an aberration diagram showing a spherical aberration, astigmatism, and a distortion of the imaging lens of FIG. 10.
Figure 13:
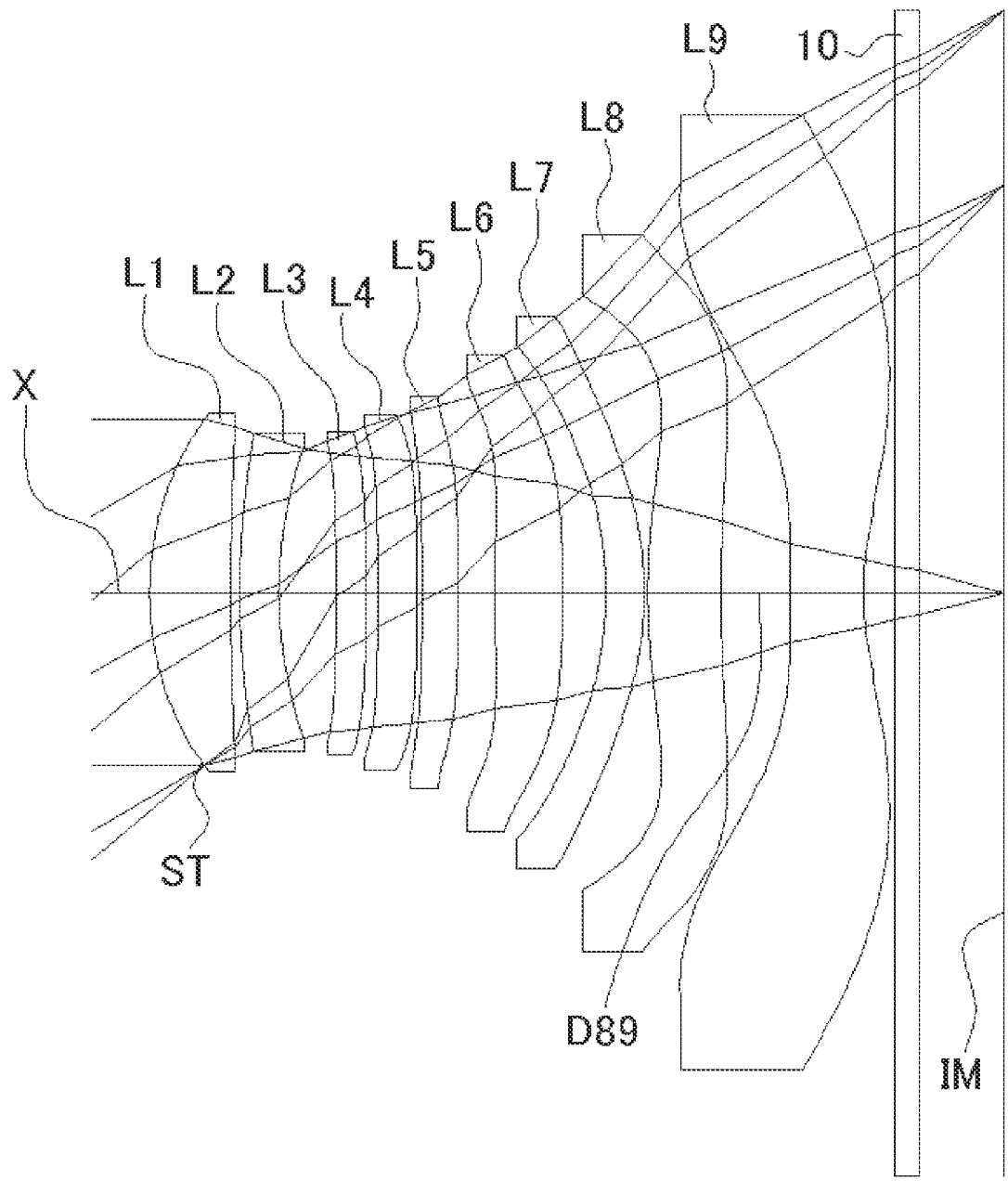
FIG. 13 shows a sectional view of a schematic configuration of an imaging lens in Numerical Data Example 5 of the present invention.

FIG. 11 shows a lateral aberration that corresponds to an image height H and FIG. 12 shows a spherical aberration (mm), astigmatism (mm), and a distortion (%), respectively. As shown in FIGS. 11 and 12, according to the imaging lens of Numerical Data Example 4, the aberrations can be also satisfactorily corrected.

Numerical Data Example 5

Basic Lens Data

TABLE 9 f = 5.62 mm Fno = 2.0 ω = 39.9°

| | i | r | d | n d | ν d | [mm] |
|---|---|---|---|---|---|---|
| | | ∞ | ∞ | | | |
| L1 | 1*(ST) | 2.528 | 0.665 | 1.5443 | 55.9 | f1 = 5.246 |
| | 2* | 19.980 | 0.072 | | | |
| L2 | 3* | 53.71 | 0.323 | 1.6707 | 19.2 | f2 = −13.117 |
| | 4* | 3.254 | 0.469 | | | |
| L3 | 5* | −77.332 | 0.246 | 1.5443 | 55.9 | f3 = 67.060 |
| | 6* | −24.824 | 0.095 | | | |
| L4 | 7* | −97.181 | 0.321 | 1.5443 | 55.9 | f4 = 98.720 |
| | 8* | −34.642 | 0.045 | | | |
| L5 | 9* | −63.761 | 0.292 | 1.5443 | 55.9 | f5 = −53.017 |
| | 10* | 52.800 | 0.306 | | | |
| L6 | 11* | 13.401 | 0.554 | 1.5443 | 55.9 | f6 = 14.163 |
| | 12* | −17.886 | 0.354 | | | |
| L7 | 13* | −3.237 | 0.316 | 1.6707 | 19.2 | f7 = 29.675 |
| | 14* | −2.893 | 0.030 | | | |
| L8 | 15* | 5.363 | 0.601 | 1.5443 | 55.9 | f8 = 16.653 |
| | 16* | 12.613 | 0.570 | | | |
| L9 | 17* | −83.897 | 0.600 | 1.5443 | 55.9 | f9 = −4.505 |
| | 18* | 2.532 | 0.250 | | | |
| | 19 | ∞ | 0.210 | 1.5168 | 64.2 | |
| | 20 | ∞ | 0.695 | | | |
| (IM) | | ∞ | | | | | f123 = 7.083 mm
f789 = −9.850 mm
f34 = 40.016 mm
f89 = −7.116 mm
T7 = 0.316 mm
T8 = 0.601 mm
D34 = 0.095 mm
D89 = 0.570 mm
TL = 6.941 mm
Hmax = 4.70 mm
Dep = 2.836 mm

TABLE 10

Aspherical surface data

| i | k | A4 | A6 | A8 | A10 | A12 | A14 | A16 |
|---|---|---|---|---|---|---|---|---|
| 1 | 2.824E−01 | 8.742E−05 | −2.220E−04 | 7.294E−04 | −6.360E−04 | 2.431E−04 | −4.372E−06 | −1.690E−05 |
| 2 | 0.000E+00 | −1.786E−02 | 2.214E−02 | −1.385E−02 | 4.869E−03 | −7.111E−04 | −4.637E−05 | 1.137E−05 |
| 3 | −1.992E+01 | −2.365E−02 | 2.415E−02 | −1.356E−02 | 4.928E−03 | −7.753E−04 | 1.287E−04 | −3.491E−05 |
| 4 | −1.242E+01 | 2.203E−02 | −1.379E−02 | 1.245E−02 | −5.473E−03 | 1.695E−03 | −2.851E−04 | 2.011E−04 |
| 5 | 0.000E+00 | −1.218E−02 | −9.821E−03 | −4.108E−04 | −3.369E−04 | 2.288E−04 | 2.228E−04 | 1.291E−05 |
| 6 | 0.000E+00 | −6.273E−03 | −1.042E−02 | −9.206E−04 | 3.279E−04 | 1.692E−04 | 6.659E−05 | −2.902E−05 |
| 7 | 0.000E+00 | −1.244E−02 | −9.295E−03 | −2.477E−04 | −4.349E−04 | 9.790E−05 | 1.540E−04 | 1.116E−05 |
| 8 | 0.000E+00 | −6.064E−03 | −1.130E−02 | −1.141E−03 | 3.635E−04 | 2.092E−04 | 6.357E−05 | −5.938E−05 |

TABLE 10-continued

Aspherical surface data

| i | k | A4 | A6 | A8 | A10 | A12 | A14 | A16 |
|---|---|---|---|---|---|---|---|---|
| 9 | 0.000E+00 | −1.824E−02 | −3.106E−03 | 1.546E−03 | 1.031E−04 | 1.632E−04 | 1.474E−05 | −4.076E−05 |
| 10 | 0.000E+00 | −4.479E−02 | 4.468E−04 | 1.074E−03 | 4.161E−04 | 6.566E−05 | −2.909E−05 | 8.274E−06 |
| 11 | 0.000E+00 | −3.644E−02 | 7.678E−05 | −2.609E−03 | −5.616E−05 | 2.973E−04 | 5.830E−05 | −1.870E−05 |
| 12 | 0.000E+00 | −5.140E−02 | 1.069E−02 | −2.252E−03 | −1.306E−03 | 1.134E−03 | −2.692E−04 | 2.192E−05 |
| 13 | 7.454E−01 | −1.881E−02 | 2.193E−02 | −1.220E−02 | 4.184E−03 | −6.775E−04 | 2.736E−05 | 2.134E−06 |
| 14 | −5.470E+00 | −2.135E−02 | 1.639E−02 | −8.535E−03 | 2.327E−03 | −3.048E−04 | 1.725E−05 | −4.044E−07 |
| 15 | 0.000E+00 | −1.501E−02 | −8.166E−04 | −1.211E−03 | 3.374E−04 | −5.781E−05 | 5.423E−06 | −1.809E−07 |
| 16 | 0.000E+00 | −3.621E−03 | −5.245E−04 | −6.036E−04 | 1.163E−04 | −7.958E−06 | −2.238E−08 | 2.470E−08 |
| 17 | 0.000E+00 | −6.988E−02 | 1.536E−02 | −1.778E−03 | 1.444E−04 | −8.506E−06 | 3.130E−07 | −5.120E−09 |
| 18 | −5.780E+00 | −4.497E−02 | 1.162E−02 | −2.096E−03 | 2.376E−04 | −1.595E−05 | 5.772E−07 | −8.663E−09 |

The values of the respective conditional expressions are as follows:

$f123/f=1.260$ $f3/f2=-5.112$ $D34/f=0.017$ $T8/T7=1.902$ $D89/f=0.101$ $R9r/f=0.451$ $f9/f=-0.802$ $|f4/f|=17.566$ $TL/f=1.235$ $TL/H\mathrm{max}=1.477$ $f/\mathrm{Dep}=1.98$ $f6/f=2.520$ Accordingly, the imaging lens of Numerical Data Example 5 satisfies the above-described conditional expressions.

Figure 14:
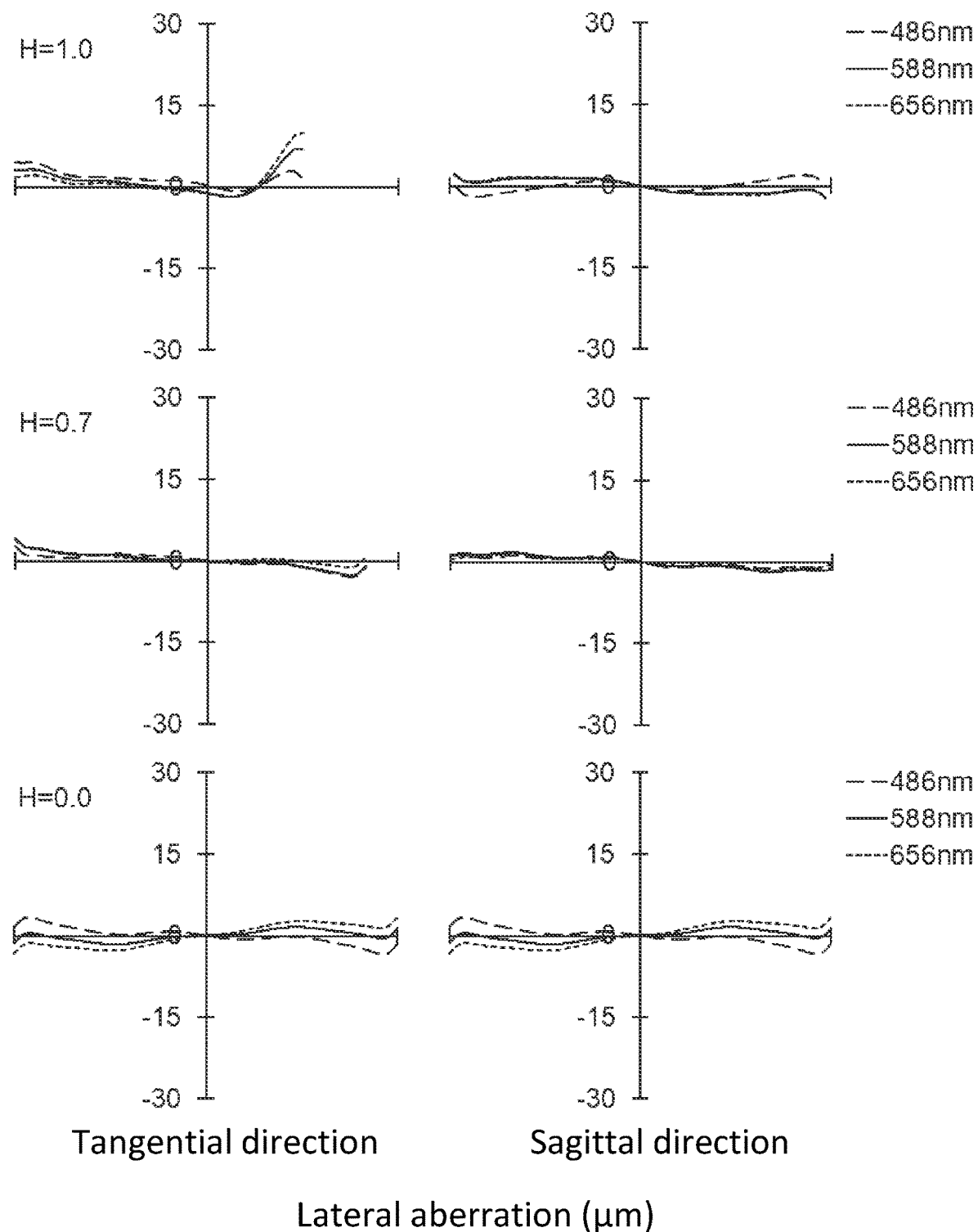
FIG. 14 is an aberration diagram showing a lateral aberration of the imaging lens of FIG. 13.
Figure 15:
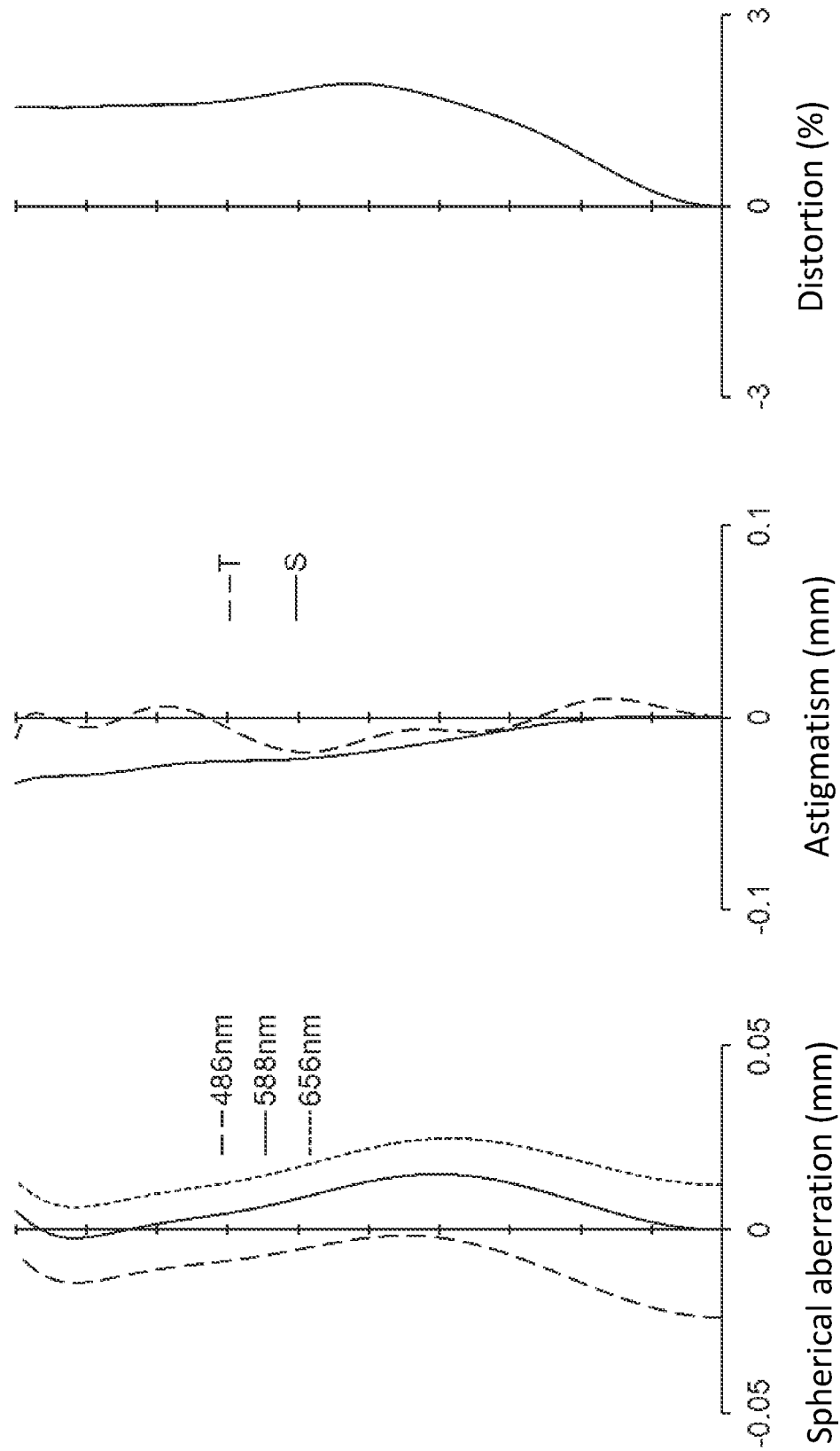
FIG. 15 is an aberration diagram showing a spherical aberration, astigmatism, and a distortion of the imaging lens of FIG. 13.
Figure 16:
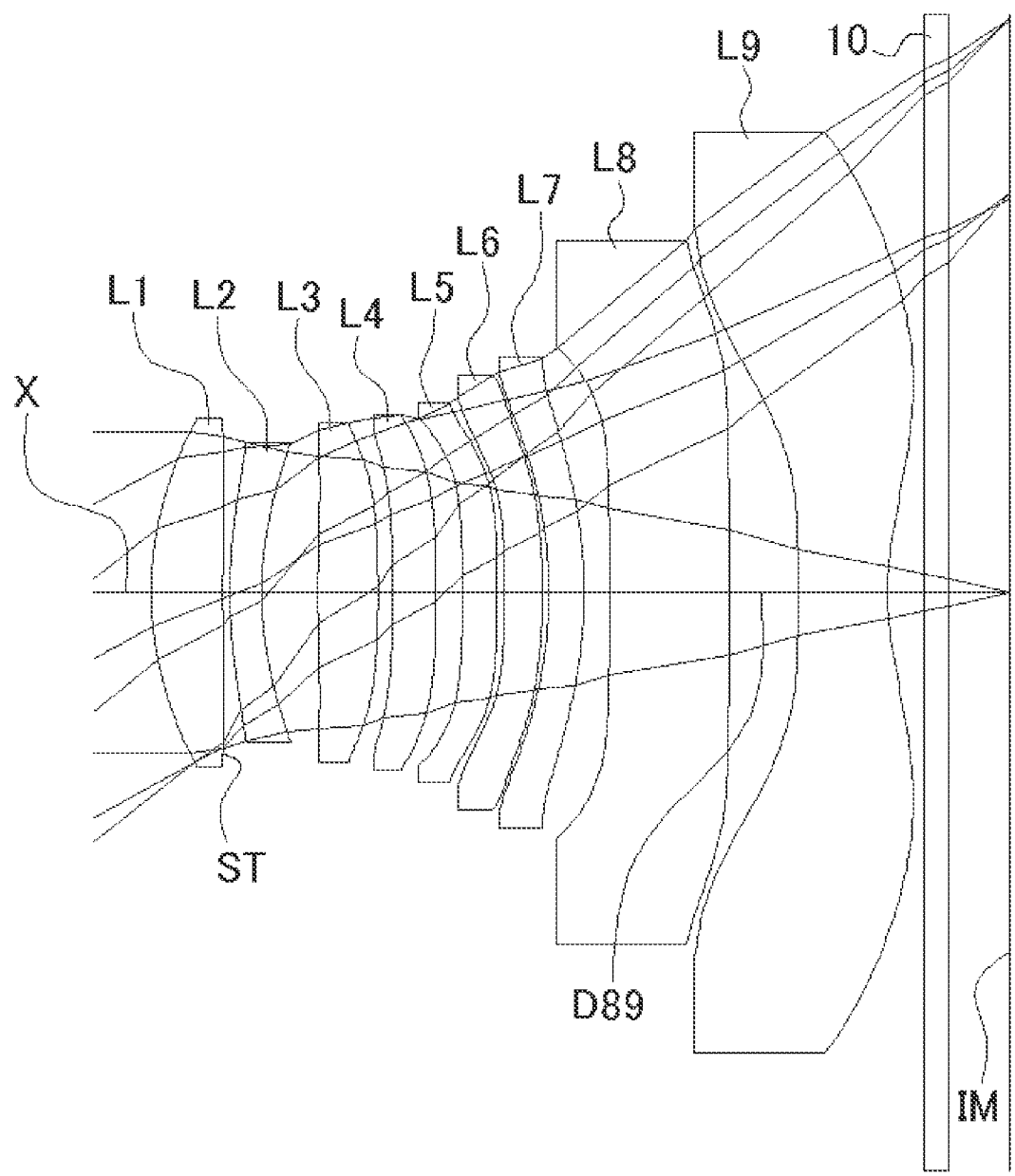
FIG. 16 shows a sectional view of a schematic configuration of an imaging lens in Numerical Data Example 6 of the present invention.

FIG. 14 shows a lateral aberration that corresponds to an image height H and FIG. 15 shows a spherical aberration (mm), astigmatism (mm), and a distortion (%), respectively. As shown in FIGS. 14 and 15, according to the imaging lens of Numerical Data Example 5, the aberrations can be also satisfactorily corrected.

Numerical Data Example 6

Basic Lens Data

TABLE 11 f = 5.92 mm Fno = 2.2 ω = 38.4°

| | i | r | d | nd | νd | [mm] |
|---|---|---|---|---|---|---|
| | | ∞ | ∞ | | | |
| L1 | 1* | 2.815 | 0.598 | 1.5443 | 55.9 | f1 = 5.382 |
| | 2*(ST) | 67.083 | 0.058 | | | |
| L2 | 3* | 4.022 | 0.263 | 1.6707 | 19.2 | f2 = −12.884 |
| | 4* | 2.673 | 0.471 | | | |
| L3 | 5* | 14.261 | 0.501 | 1.5443 | 55.9 | f3 = 12.951 |
| | 6* | −13.767 | 0.122 | | | |
| L4 | 7* | −22.961 | 0.362 | 1.5443 | 55.9 | f4 = 148.629 |
| | 8* | −17.985 | 0.223 | | | |
| L5 | 9* | −13.752 | 0.288 | 1.5443 | 55.9 | f5 = −106.392 |
| | 10* | −18.168 | 0.061 | | | |
| L6 | 11* | −19.022 | 0.317 | 1.5443 | 55.9 | f6 = 18.645 |
| | 12* | −6.657 | 0.053 | | | |
| L7 | 13* | −4.210 | 0.295 | 1.6707 | 19.2 | f7 = 65.956 |
| | 14* | −3.953 | 0.218 | | | |
| L8 | 15* | −15.182 | 1.000 | 1.5443 | 55.9 | f8 = −95.383 |
| | 16* | −21.954 | 0.564 | | | |
| L9 | 17* | 97.563 | 0.749 | 1.5443 | 55.9 | f9 = −4.705 |
| | 18* | 2.489 | 0.300 | | | |
| | 19 | ∞ | 0.210 | 1.5168 | 64.2 | |
| | 20 | ∞ | 0.512 | | | |
| (IM) | | ∞ | | | | | f123=5.474 mm
f789=−4.636 mm
f34=12.013 mm
f89=−4.341 mm
T7=0.295 mm
T8=1.000 mm
D34=0.122 mm
D89=0.564 mm
TL=7.095 mm
Hmax=4.70 mm
Dep=2.691 mm

TABLE 12

Aspherical surface data

| i | k | A4 | A6 | A8 | A10 | A12 | A14 | A16 |
|---|---|---|---|---|---|---|---|---|
| 1 | 2.946E−02 | −2.714E−03 | −1.663E−03 | 1.164E−03 | −1.063E−03 | 3.450E−04 | 4.733E−05 | −4.035E−05 |
| 2 | 0.000E+00 | −1.957E−02 | 2.723E−02 | −1.951E−02 | 6.623E−03 | −6.604E−04 | 2.511E−05 | −7.123E−05 |
| 3 | −5.839E+00 | −3.870E−02 | 3.291E−02 | −2.135E−02 | 5.769E−03 | 2.302E−03 | −1.690E−03 | 2.073E−04 |
| 4 | −9.739E+00 | 2.270E−02 | −2.310E−02 | 1.561E−02 | −7.769E−03 | 3.249E−03 | 4.927E−04 | −4.662E−04 |
| 5 | 0.000E+00 | −1.393E−02 | −9.645E−03 | 4.740E−03 | −9.169E−03 | 6.106E−03 | 7.070E−04 | −7.182E−04 |
| 6 | 0.000E+00 | −3.558E−02 | −1.704E−02 | 5.769E−04 | 2.046E−03 | 4.568E−04 | 5.238E−04 | −2.333E−04 |
| 7 | 0.000E+00 | −3.276E−02 | −1.534E−02 | 5.282E−03 | 5.902E−04 | 4.955E−04 | 1.797E−04 | −7.400E−05 |
| 8 | 0.000E+00 | −3.589E−02 | −1.470E−02 | 1.726E−03 | 2.110E−03 | 6.595E−05 | −3.257E−04 | 4.101E−05 |

TABLE 12-continued

Aspherical surface data

| i | k | A4 | A6 | A8 | A10 | A12 | A14 | A16 |
|---|---|---|---|---|---|---|---|---|
| 9 | 0.000E+00 | −1.900E−02 | −2.978E−02 | −2.230E−05 | 7.977E−04 | 1.059E−03 | 4.053E−04 | −3.408E−04 |
| 10 | 0.000E+00 | −5.611E−02 | −1.782E−02 | 9.837E−04 | 2.856E−03 | 2.208E−04 | −1.599E−04 | 2.123E−05 |
| 11 | 0.000E+00 | −8.870E−02 | −6.648E−03 | 7.392E−03 | 1.008E−03 | 1.828E−04 | 5.633E−05 | −7.355E−05 |
| 12 | 0.000E+00 | −4.340E−02 | 8.197E−03 | 1.530E−06 | 4.304E−04 | 5.629E−05 | −1.277E−05 | −1.226E−05 |
| 13 | 1.521E+00 | −3.148E−02 | 3.184E−02 | −1.607E−02 | 5.257E−03 | −1.002E−03 | 9.886E−05 | −2.277E−06 |
| 14 | −1.006E+01 | −2.125E−02 | 1.839E−02 | −1.124E−02 | 3.647E−03 | −5.119E−04 | 2.410E−05 | 3.378E−07 |
| 15 | 5.888E−01 | 2.643E−02 | −1.390E−02 | −1.547E−04 | 4.010E−04 | −1.090E−04 | 2.996E−05 | −3.164E−06 |
| 16 | 0.000E+00 | 1.322E−02 | −2.609E−03 | −6.865E−04 | 1.924E−04 | −1.341E−05 | 6.665E−10 | 2.146E−08 |
| 17 | 9.633E+00 | −7.878E−02 | 1.805E−02 | −2.255E−03 | 2.128E−04 | −1.505E−05 | 6.425E−07 | −1.204E−08 |
| 18 | −4.676E+00 | −5.183E−02 | 1.450E−02 | −2.883E−03 | 3.595E−04 | −2.626E−05 | 1.026E−06 | −1.656E−08 |

The values of the respective conditional expressions are as follows:

$f123/f=0.925$ $f3/f2=-1.005$ $D34/f=0.021$ $T8/T7=3.390$ $D89/f=0.095$ $R9r/f=0.420$ $f9/f=-0.795$ $|f4/f|=25.106$ $TL/f=1.198$ $TL/H\text{max}=1.510$ $f/\text{Dep}=2.20$ $f6/f=3.149$ Accordingly, the imaging lens of Numerical Data Example 6 satisfies the above-described conditional expressions.

Figure 17:
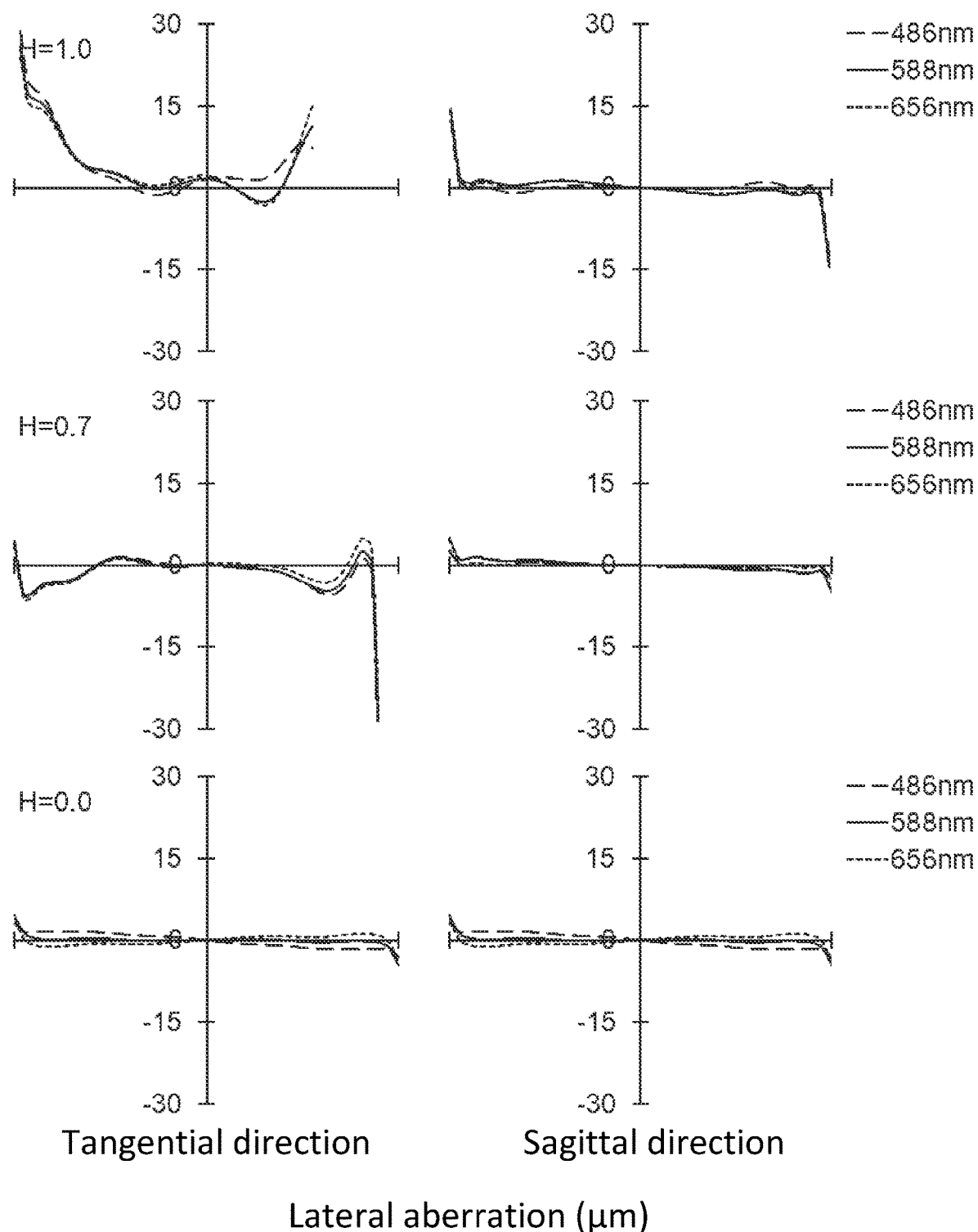
FIG. 17 is an aberration diagram showing a lateral aberration of the imaging lens of FIG. 16.
Figure 18:
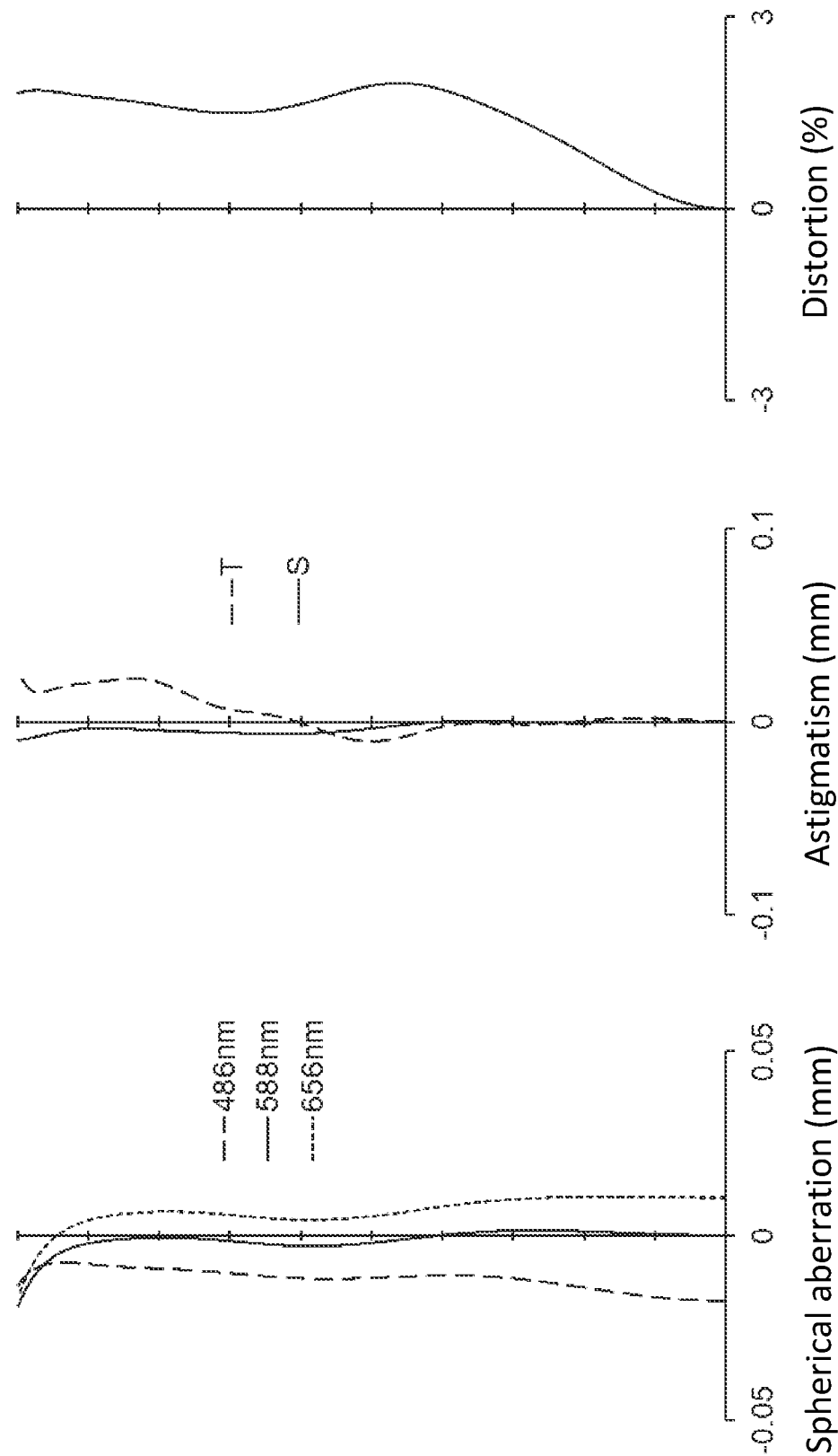
FIG. 18 is an aberration diagram showing a spherical aberration, astigmatism, and a distortion of the imaging lens of FIG. 16.
Figure 19:
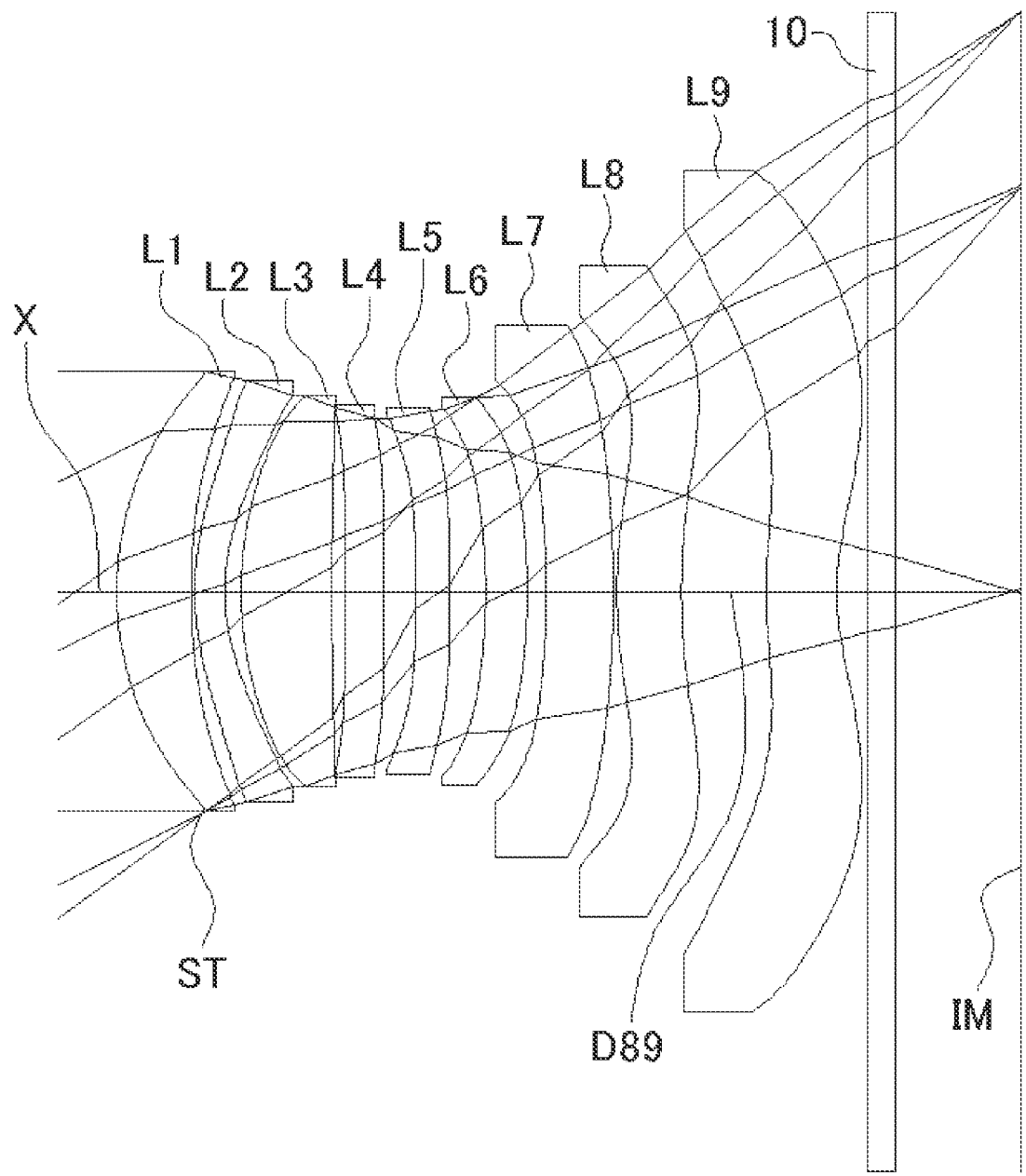
FIG. 19 shows a sectional view of a schematic configuration of an imaging lens in Numerical Data Example 7 of the present invention.

FIG. 17 shows a lateral aberration that corresponds to an image height H and FIG. 18 shows a spherical aberration (mm), astigmatism (mm), and a distortion (%), respectively. As shown in FIGS. 17 and 18, according to the imaging lens of Numerical Data Example 6, the aberrations can be also satisfactorily corrected.

Numerical Data Example 7

Basic Lens Data

TABLE 13 f = 6.29 mm Fno = 1.8 ω = 35.7°

| | i | r | d | n d | ν d | [mm] |
|---|---|---|---|---|---|---|
| | | ∞ | ∞ | | | |
| L1 | 1*(ST) | 2.557 | 0.589 | 1.5443 | 55.9 | f1 = 8.116 |
| | 2* | 5.578 | 0.029 | | | |
| L2 | 3* | 2.204 | 0.240 | 1.6707 | 19.2 | f2 = −10.017 |
| | 4* | 1.587 | 0.127 | | | |
| L3 | 5* | 2.816 | 0.719 | 1.5348 | 55.7 | f3 = 6.372 |
| | 6* | 14.774 | 0.109 | | | |
| L4 | 7* | 77.735 | 0.309 | 1.5348 | 55.7 | f4 = 88.615 |
| | 8* | −121.242 | 0.253 | | | |
| L5 | 9* | −17.339 | 0.269 | 1.5348 | 55.7 | f5 = −113.722 |
| | 10* | −24.385 | 0.283 | | | |
| L6 | 11* | −4.878 | 0.332 | 1.6707 | 19.2 | f6 = 95.606 |
| | 12* | −4.657 | 0.152 | | | |
| L7 | 13* | −5.946 | 0.530 | 1.6707 | 19.2 | f7 = −27.537 |
| | 14* | −9.084 | 0.028 | | | |
| L8 | 15* | 4.252 | 0.513 | 1.5443 | 55.9 | f8 = 26.601 |
| | 16* | 5.765 | 0.674 | | | |
| L9 | 17* | 3.815 | 0.560 | 1.5348 | 55.7 | f9 = −8.670 |
| | 18* | 1.986 | 0.250 | | | |
| | 19 | ∞ | 0.210 | 1.5168 | 64.2 | |
| | 20 | ∞ | 1.006 | | | |
| (IM) | | ∞ | | | | | f123=5.754 mm
f789=−8.764 mm
f34=5.992 mm
f89=−15.099 mm
T7=0.530 mm
T8=0.513 mm
D34=0.109 mm
D89=0.674 mm
TL=7.112 mm
Hmax=4.52 mm
Dep=3.500 mm

TABLE 14

Aspherical surface data

| i | k | A4 | A6 | A8 | A10 |
|---|---|---|---|---|---|
| 1 | −5.244E−01 | 9.466E−03 | 1.227E−03 | −1.104E−03 | 2.574E−04 |
| 2 | 0.000E+00 | 4.755E−02 | −6.466E−02 | 9.079E−02 | −1.008E−01 |
| 3 | −8.611E+00 | 4.915E−02 | −7.643E−02 | 9.652E−02 | −1.052E−01 |
| 4 | −2.198E+00 | −5.844E−02 | 8.105E−02 | −1.096E−01 | 1.085E−01 |
| 5 | −5.321E+00 | 4.650E−03 | 6.470E−02 | −1.541E−01 | 2.241E−01 |
| 6 | 0.000E+00 | −2.384E−02 | −3.105E−03 | 4.734E−02 | −9.335E−02 |
| 7 | 0.000E+00 | −3.190E−02 | 8.567E−03 | 1.997E−03 | −3.927E−03 |
| 8 | 0.000E+00 | −1.865E−02 | 3.579E−04 | 1.417E−03 | −2.441E−03 |
| 9 | 0.000E+00 | −4.421E−02 | −1.153E−02 | 6.774E−03 | −6.488E−03 |

TABLE 14-continued

| | Aspherical surface data | | | | |
|---|---|---|---|---|---|
| 10 | 0.000E+00 | −2.313E−02 | −1.891E−02 | 5.601E−03 | 3.530E−03 |
| 11 | 0.000E+00 | 3.512E−02 | −7.096E−02 | 4.637E−02 | −9.606E−03 |
| 12 | 0.000E+00 | 3.168E−02 | −3.088E−02 | −1.752E−02 | 3.186E−02 |
| 13 | 0.000E+00 | 1.090E−02 | 2.830E−02 | −4.919E−02 | 2.598E−02 |
| 14 | 0.000E+00 | −8.373E−04 | 3.882E−03 | −1.863E−03 | −4.251E−04 |
| 15 | 3.943E−01 | 3.787E−03 | −3.884E−02 | 1.660E−02 | −4.833E−03 |
| 16 | 0.000E+00 | 2.095E−02 | −2.722E−02 | 7.606E−03 | −9.417E−03 |
| 17 | −1.621E−01 | −1.233E−01 | 4.013E−02 | −8.446E−03 | 9.161E−04 |
| 18 | −7.422E+00 | −5.250E−02 | 1.360E−02 | −2.593E−03 | 3.123E−04 |

| i | A12 | A14 | A16 | A18 | A20 |
|---|---|---|---|---|---|
| 1 | 2.533E−05 | −7.997E−06 | −1.764E−06 | 4.415E−07 | −2.733E−07 |
| 2 | 7.465E−02 | −3.519E−02 | 1.017E−02 | −1.647E−03 | 1.147E−04 |
| 3 | 7.849E−02 | −3.721E−02 | 1.077E−02 | −1.738E−03 | 1.208E−04 |
| 4 | −7.485E−02 | 3.385E−02 | −9.267E−03 | 1.395E−03 | −8.907E−05 |
| 5 | −2.006E−01 | 1.105E−01 | −3.621E−02 | 6.500E−03 | −4.902E−04 |
| 6 | 9.985E−02 | −6.256E−02 | 2.284E−02 | −4.492E−03 | 3.707E−04 |
| 7 | 4.699E−04 | 6.901E−04 | −2.373E−05 | −1.681E−04 | 4.234E−05 |
| 8 | −1.569E−04 | 7.916E−04 | 1.617E−04 | −2.770E−04 | 6.381E−05 |
| 9 | 6.002E−03 | −4.621E−04 | −1.428E−03 | 6.665E−04 | −1.027E−04 |
| 10 | −7.544E−04 | −4.275E−04 | 1.165E−04 | 1.144E−04 | −5.283E−05 |
| 11 | −1.841E−02 | 2.181E−02 | −1.205E−02 | 3.689E−03 | −5.023E−04 |
| 12 | −2.123E−02 | 4.814E−03 | 1.641E−03 | −1.037E−03 | 1.452E−04 |
| 13 | −5.280E−03 | −3.073E−03 | 2.829E−03 | −8.435E−04 | 8.794E−05 |
| 14 | 2.133E−04 | 3.526E−05 | −2.093E−05 | 1.743E−06 | 5.867E−08 |
| 15 | 1.182E−03 | −2.158E−04 | 1.313E−05 | 2.262E−06 | −2.687E−07 |
| 16 | −1.395E−05 | 1.489E−05 | −7.460E−07 | −8.368E−08 | 7.047E−09 |
| 17 | −2.374E−05 | −2.385E−06 | −1.088E−07 | 3.230E−08 | −1.112E−09 |
| 18 | −2.271E−05 | 9.662E−07 | −2.042E−08 | −2.592E−11 | 3.951E−12 |

The values of the respective conditional expressions are as follows:

$f123/f$=0.915

$f3/f2$=−0.636

$D34/f$=0.017

$T8/T7$=0.968

$D89/f$=0.107

$R9r/f$=0.316

$f9/f$=−1.378

$|f4/f|$=14.088

$TL/f$=1.131

$TL/H$max=1.573

$f/D$ep=1.80

$f8/f$=4.229

Accordingly, the imaging lens of Numerical Data Example 7 satisfies the above-described conditional expressions.

Figure 20:
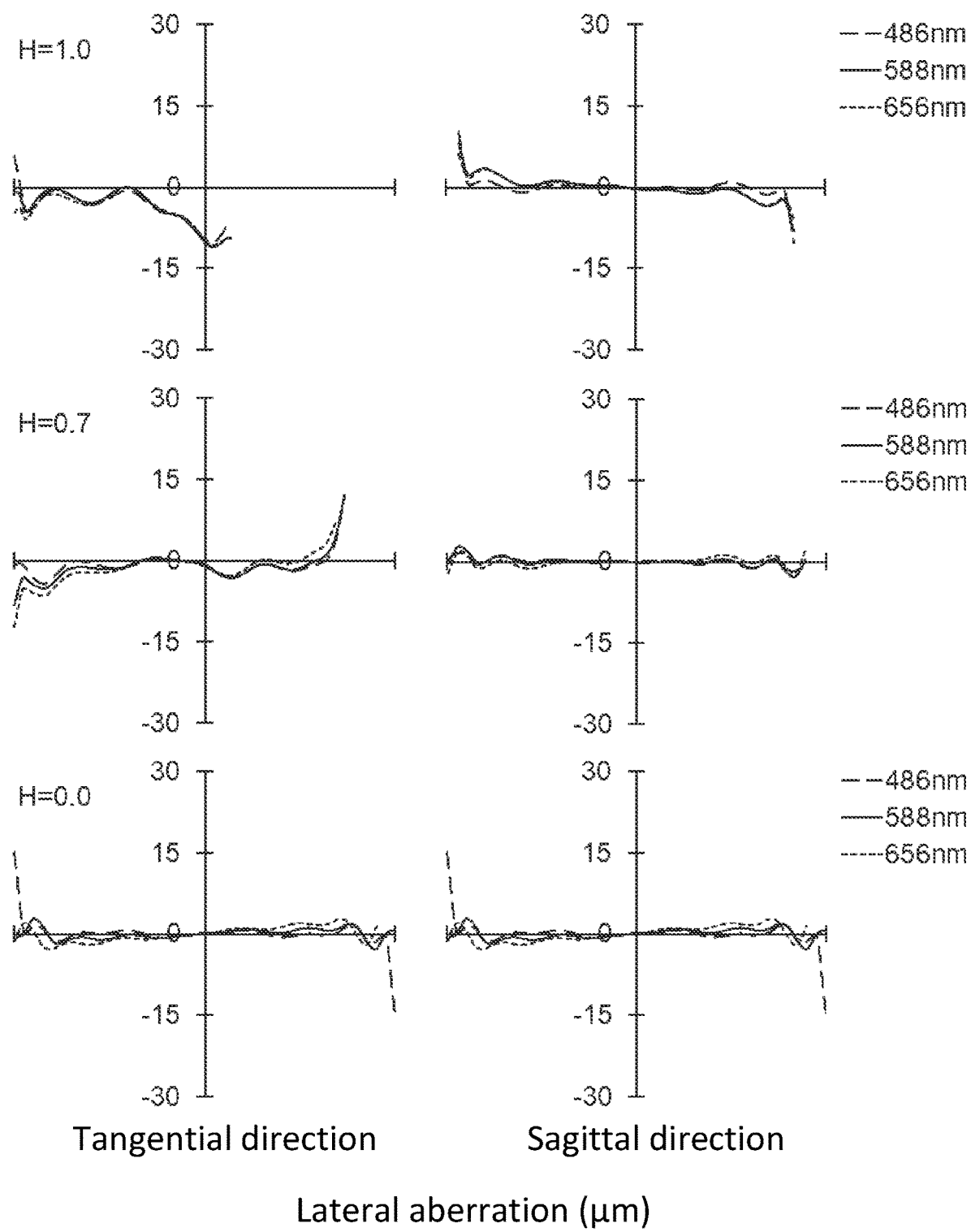
FIG. 20 is an aberration diagram showing a lateral aberration of the imaging lens of FIG. 19.
Figure 21:
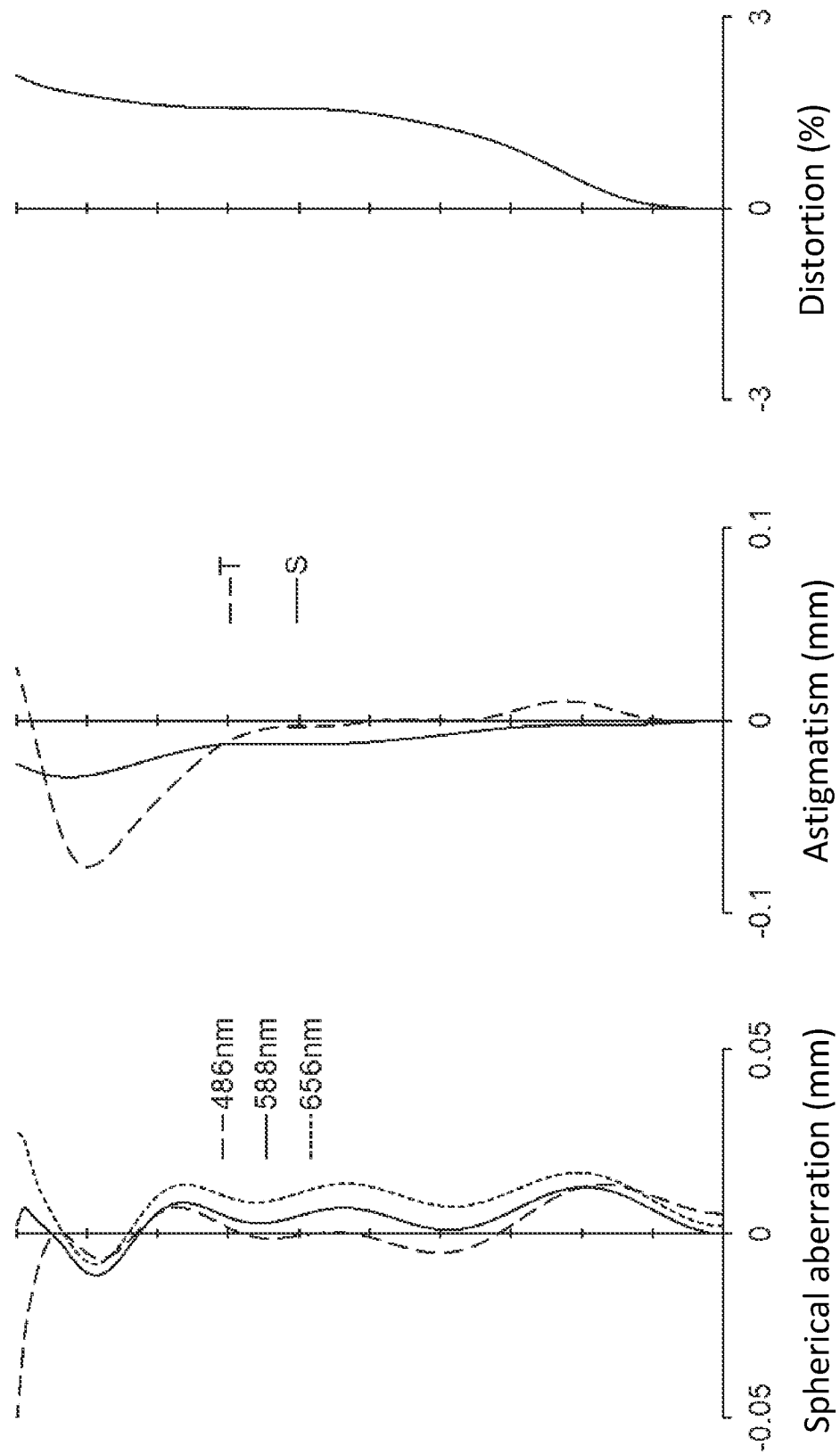
FIG. 21 is an aberration diagram showing a spherical aberration, astigmatism, and a distortion of the imaging lens of FIG. 19.
Figure 22:
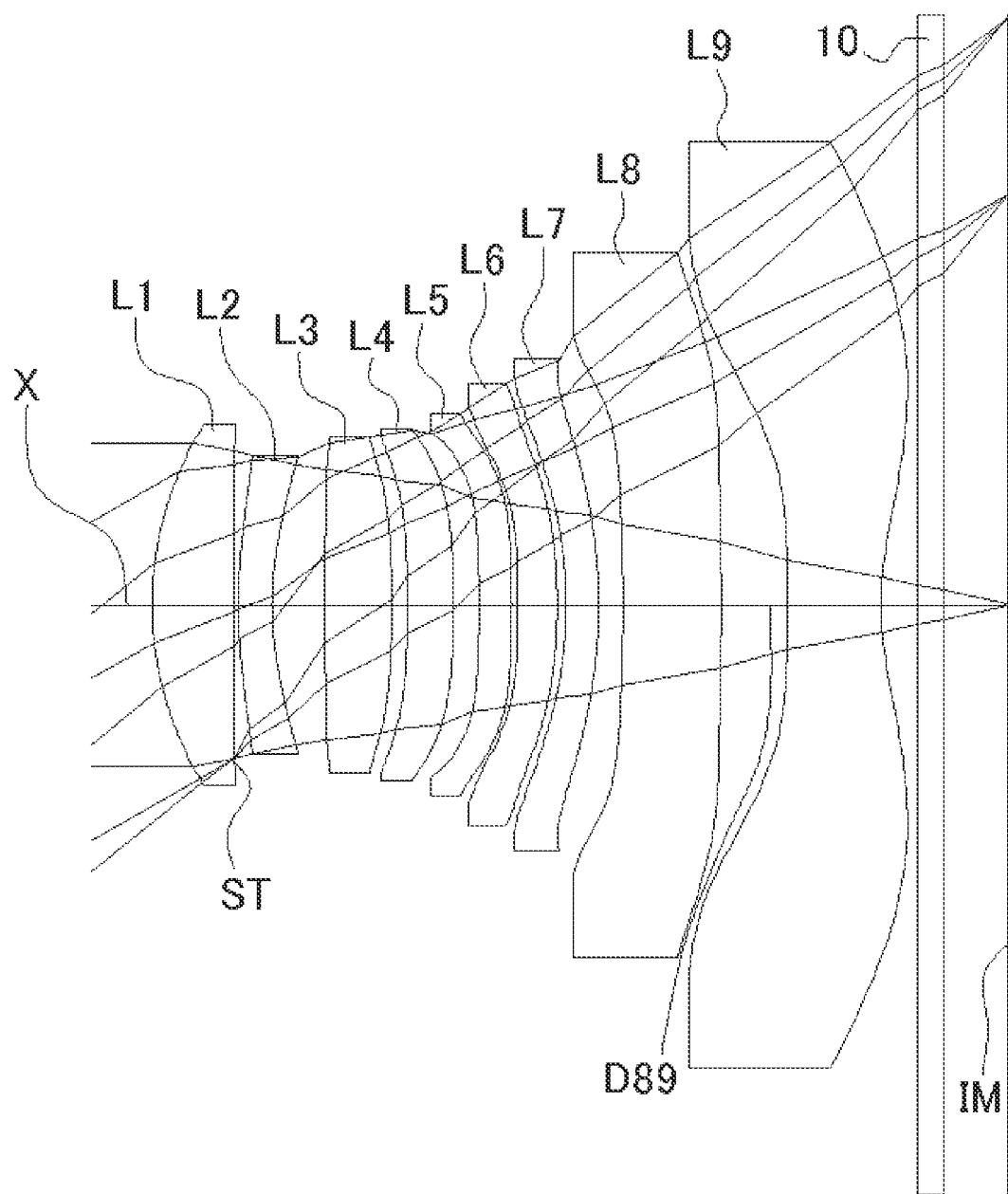
FIG. 22 shows a sectional view of a schematic configuration of an imaging lens in Numerical Data Example 8 of the present invention.

FIG. 20 shows a lateral aberration that corresponds to an image height H and FIG. 21 shows a spherical aberration (mm), astigmatism (mm), and a distortion (%), respectively. As shown in FIGS. 20 and 21, according to the imaging lens of Numerical Data Example 7, the aberrations can be also satisfactorily corrected.

Numerical Data Example 8

Basic Lens Data

TABLE 15

| f = 5.80 mm Fno = 2.2 ω = 39.0° | | | | | | |
|---|---|---|---|---|---|---|
| | i | r | d | nd | vd | [mm] |
| | | ∞ | ∞ | | | |
| L1 | 1* | 2.653 | 0.662 | 1.5443 | 55.9 | f1 = 5.163 |
| | 2*(ST) | 43.434 | 0.040 | | | |
| L2 | 3* | 4.181 | 0.276 | 1.6707 | 19.2 | f2 = −12.667 |
| | 4* | 2.728 | 0.423 | | | |
| L3 | 5* | 14.680 | 0.547 | 1.5443 | 55.9 | f3 = 12.902 |
| | 6* | −13.286 | 0.129 | | | |
| L4 | 7* | −12.003 | 0.375 | 1.5443 | 55.9 | f4 = 79.377 |
| | 8* | −9.497 | 0.206 | | | |
| L5 | 9* | −13.718 | 0.265 | 1.5443 | 55.9 | f5 = −100.330 |
| | 10* | −18.445 | 0.050 | | | |
| L6 | 11* | −15.366 | 0.321 | 1.5443 | 55.9 | f6 = 13.924 |
| | 12* | −5.113 | 0.073 | | | |
| L7 | 13* | −3.881 | 0.265 | 1.6707 | 19.2 | f7 = 100.690 |
| | 14* | −4.231 | 0.196 | | | |
| L8 | 15* | −12.893 | 0.800 | 1.5443 | 55.9 | f8 = −60.884 |
| | 16* | −21.566 | 0.535 | | | |
| L9 | 17* | 62.744 | 0.765 | 1.5443 | 55.9 | f9 = −4.896 |
| | 18* | 2.546 | 0.300 | | | |
| | 19 | ∞ | 0.210 | 1.5168 | 64.2 | |
| (IM) | 20 | ∞ | 0.522 | | | |
| | | ∞ | | | | | f123=5.270 mm
f789=−4.027 mm
f34=11.269 mm
f89=−4.373 mm
T7=0.265 mm
T8=0.800 mm
D34=0.129 mm
D89=0.535 mm
TL=6.887 mm
Hmax=4.70 mm
Dep=2.636 mm

TABLE 16

Aspherical surface data

| i | k | A4 | A6 | A8 | A10 | A12 | A14 | A16 |
|---|---|---|---|---|---|---|---|---|
| 1 | 2.946E−02 | −2.563E−03 | −1.649E−03 | 1.166E−03 | −1.044E−03 | 3.209E−04 | 6.070E−05 | −3.576E−05 |
| 2 | 0.000E+00 | −1.994E−02 | 2.742E−02 | −1.928E−02 | 6.640E−03 | −6.688E−04 | 3.147E−05 | −7.009E−05 |
| 3 | −5.839E+00 | −4.125E−02 | 3.256E−02 | −2.154E−02 | 5.737E−03 | 2.367E−03 | −1.680E−03 | 2.128E−04 |
| 4 | −9.739E+00 | 1.933E−02 | −2.544E−02 | 1.551E−02 | −7.622E−03 | 3.276E−03 | 5.081E−04 | −3.735E−04 |
| 5 | 0.000E+00 | −1.056E−02 | −8.155E−03 | 5.716E−03 | −8.530E−03 | 6.370E−03 | 7.315E−04 | −7.880E−04 |
| 6 | 0.000E+00 | −2.912E−02 | −1.542E−02 | 1.420E−03 | 2.190E−03 | 4.396E−04 | 5.134E−04 | −2.169E−04 |
| 7 | 0.000E+00 | −3.577E−02 | −1.505E−02 | 4.866E−03 | 3.375E−04 | 4.119E−04 | 1.732E−04 | −5.290E−05 |
| 8 | 0.000E+00 | −3.882E−02 | −1.580E−02 | 1.465E−03 | 2.086E−03 | 8.218E−05 | −3.368E−04 | 2.193E−05 |
| 9 | 0.000E+00 | −1.852E−02 | −3.462E−02 | −9.709E−03 | 6.087E−03 | 9.767E−03 | 3.618E−04 | −3.647E−04 |
| 10 | 0.000E+00 | −5.683E−02 | −1.822E−02 | 6.578E−04 | 2.707E−03 | 1.797E−04 | −1.608E−04 | 3.077E−05 |
| 11 | 0.000E+00 | −8.870E−02 | −6.111E−03 | 7.671E−03 | 1.063E−03 | 1.757E−04 | 4.485E−05 | −7.992E−05 |
| 12 | 0.000E+00 | −4.020E−02 | 8.729E−03 | −2.971E−05 | 4.499E−04 | 6.343E−05 | −1.129E−05 | −1.281E−05 |
| 13 | 1.521E+00 | −2.949E−02 | 3.226E−02 | −1.597E−02 | 5.268E−03 | −1.002E−03 | 9.800E−05 | −2.626E−06 |
| 14 | −1.006E+01 | −2.214E−02 | 1.842E−02 | −1.123E−02 | 3.650E−03 | −5.106E−04 | 2.445E−05 | 3.469E−07 |
| 15 | 5.888E−01 | 2.378E−02 | −1.322E−02 | −3.466E−05 | 4.148E−04 | −1.056E−04 | 3.079E−05 | −3.031E−06 |
| 16 | 0.000E+00 | 1.172E−02 | −2.451E−03 | −6.775E−04 | 1.926E−04 | −1.343E−05 | −4.784E−09 | 2.064E−08 |
| 17 | 9.633E+00 | −7.846E−02 | 1.807E−02 | −2.255E−03 | 2.127E−04 | −1.506E−05 | 6.413E−07 | −1.215E−08 |
| 18 | −4.676E+00 | −5.069E−02 | 1.433E−02 | −2.879E−03 | 3.597E−04 | −2.626E−05 | 1.026E−06 | −1.657E−08 |

The values of the respective conditional expressions are as follows:

$f123/f=0.909$ $f3/f2=-1.019$ $D34/f=0.022$ $T8/T7=3.019$ $D89/f=0.092$ $R9r/f=0.439$ $f9/f=-0.844$ $f4/f1=13.686$ $TL/f=1.187$ $TL/H\text{max}=1.465$ $f/\text{Dep}=2.20$ Accordingly, the imaging lens of Numerical Data Example 8 satisfies the above-described conditional expressions.

Figure 23:
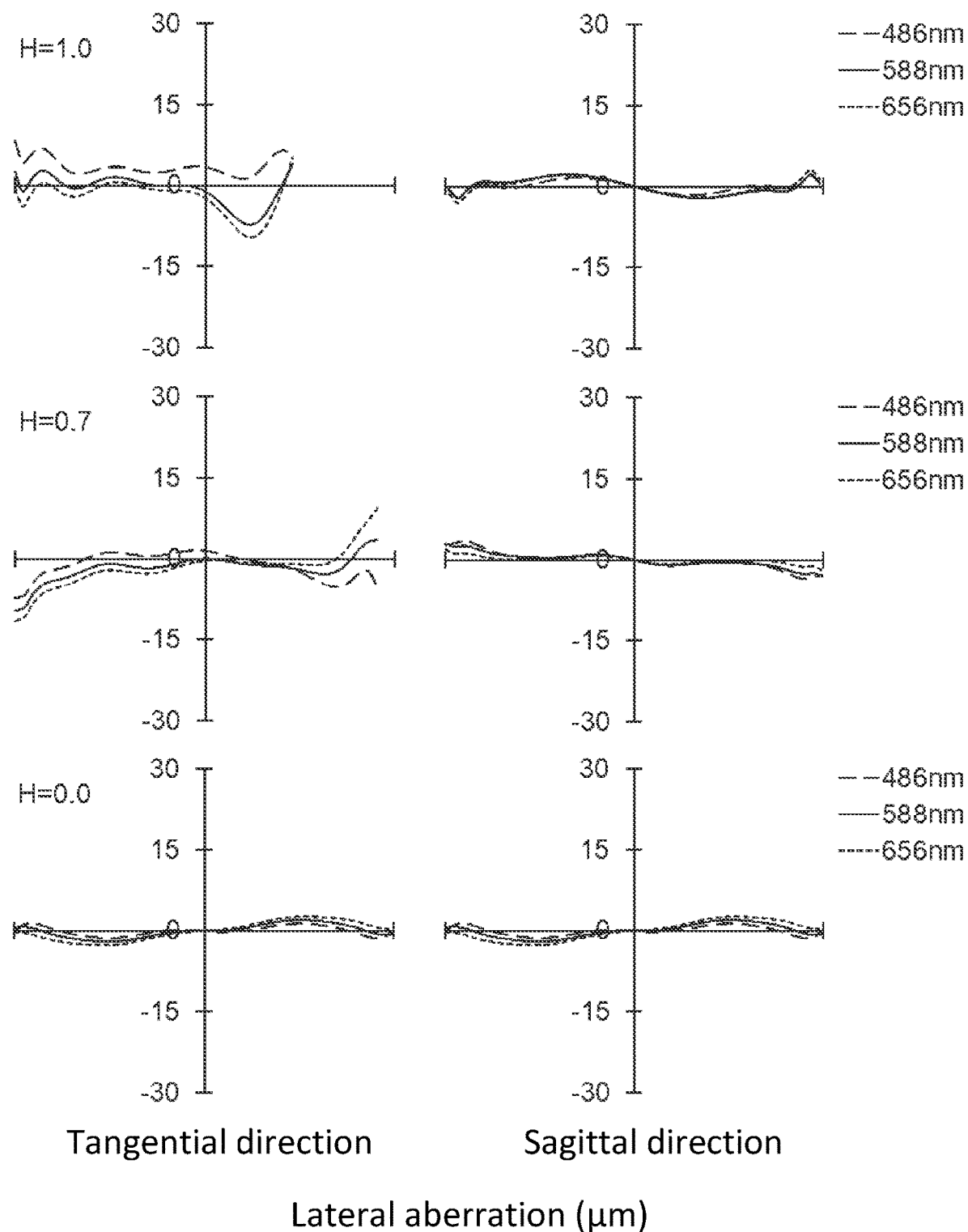
FIG. 23 is an aberration diagram showing a lateral aberration of the imaging lens of FIG. 22.
Figure 24:
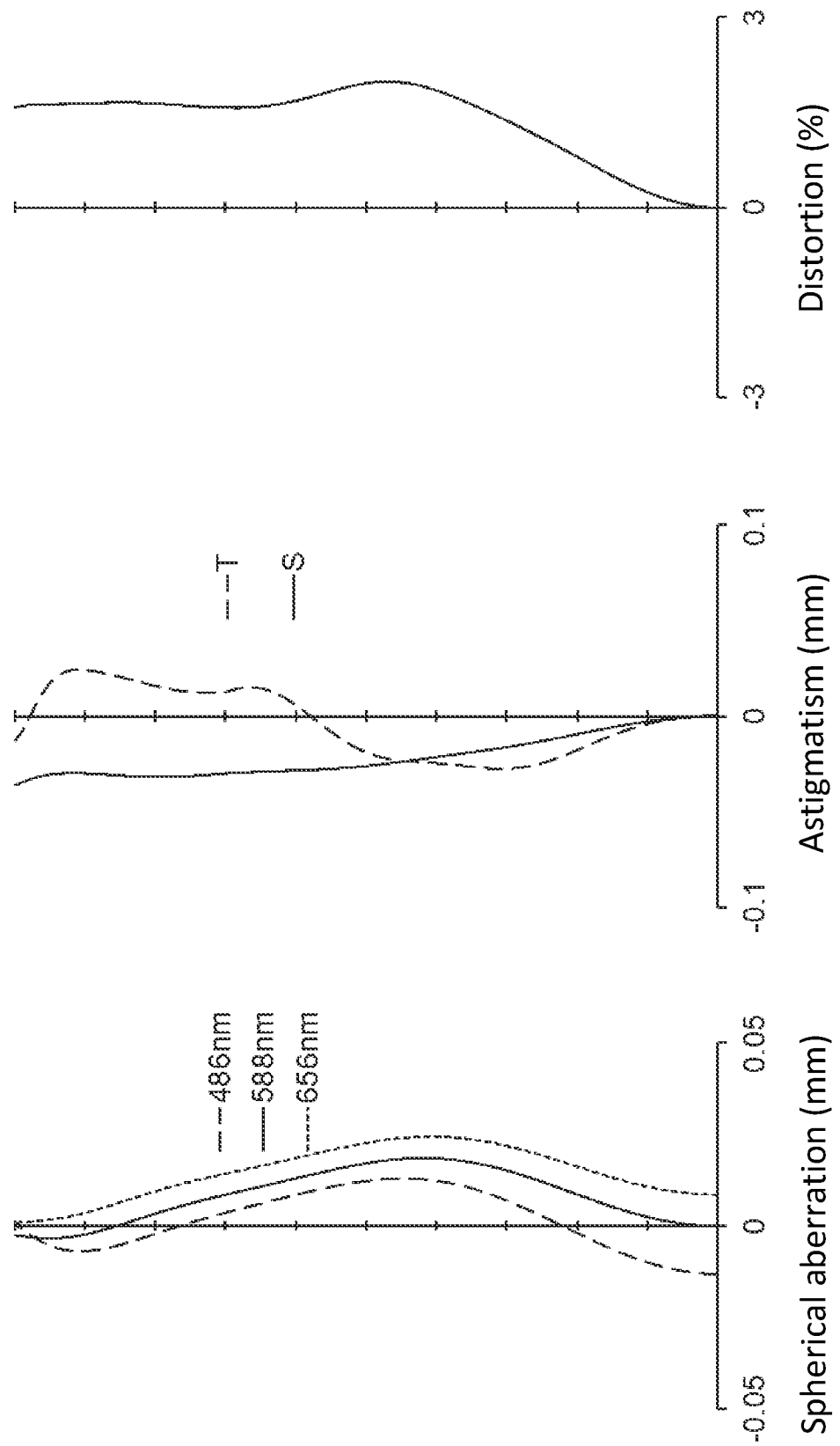
FIG. 24 is an aberration diagram showing a spherical aberration, astigmatism, and a distortion of the imaging lens of FIG. 22.
Figure 25:
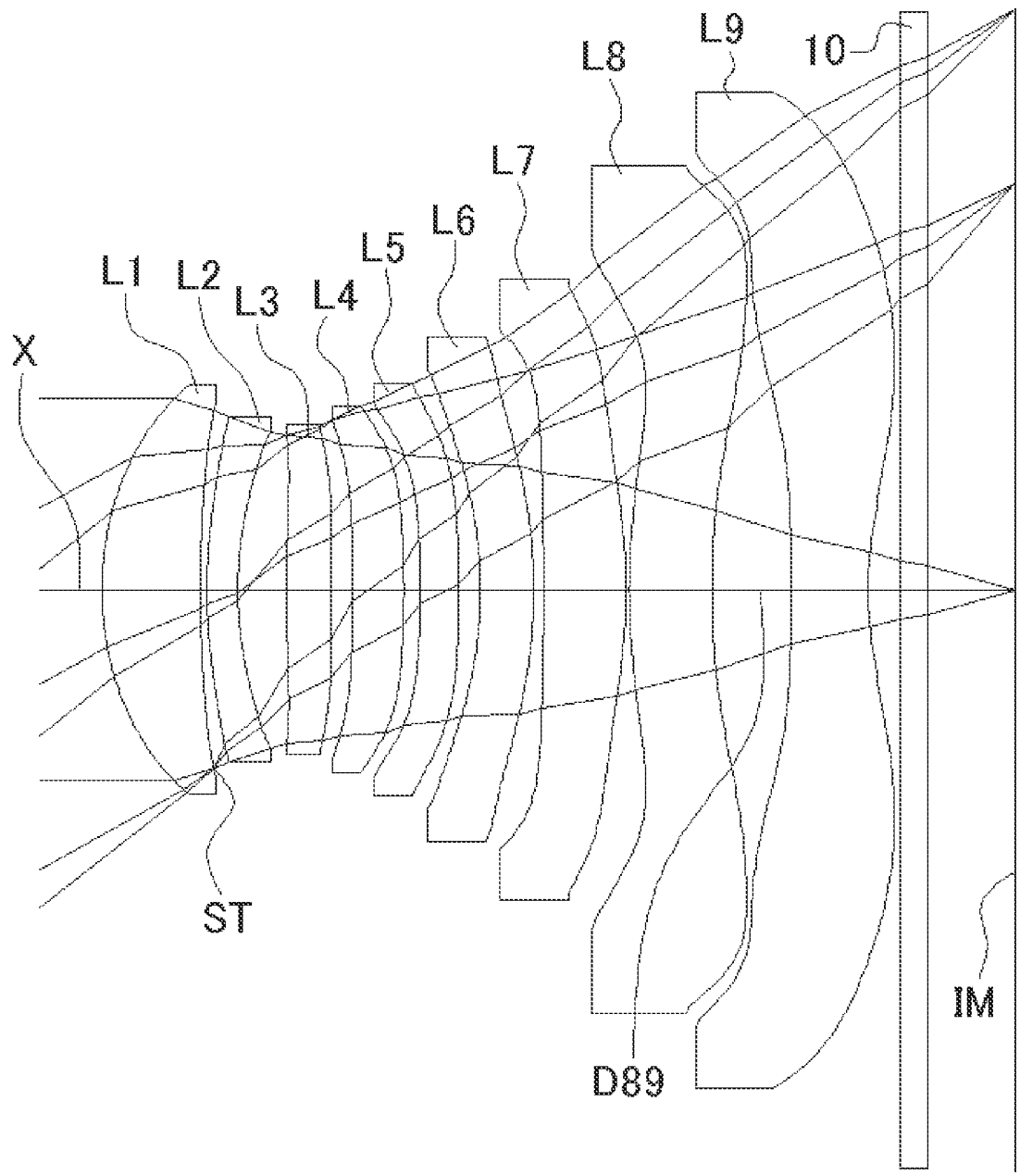
FIG. 25 shows a sectional view of a schematic configuration of an imaging lens in Numerical Data Example 9 of the present invention.

FIG. 23 shows a lateral aberration that corresponds to an image height H and FIG. 24 shows a spherical aberration (mm), astigmatism (mm), and a distortion (%), respectively. As shown in FIGS. 23 and 24, according to the imaging lens of Numerical Data Example 8, the aberrations can be also satisfactorily corrected.

Numerical Data Example 9

Basic Lens Data

TABLE 17

$f = 5.62$ mm Fno = 1.9 ω = 38.8°

| | i | r | d | n d | ν d | [mm] |
|---|---|---|---|---|---|---|
| L1 | 1* | ∞ | ∞ | | | |
| | 2*(ST) | 2.410 | 0.765 | 1.5443 | 55.9 | f1 = 5.705 |
| | | 9.557 | 0.050 | | | |

TABLE 17-continued $f = 5.62$ mm Fno = 1.9 ω = 38.8°

| | i | r | d | n d | ν d | [mm] |
|---|---|---|---|---|---|---|
| L2 | 3* | 3.831 | 0.240 | 1.6707 | 19.2 | f2 = −15.996 |
| | 4* | 2.752 | 0.379 | | | |
| L3 | 5* | 12.093 | 0.352 | 1.5443 | 55.9 | f3 = 21.585 |
| | 6* | −407.953 | 0.161 | | | |
| L4 | 7* | −32.648 | 0.400 | 1.5443 | 55.9 | f4 = 20.671 |
| | 8* | −8.404 | 0.129 | | | |
| L5 | 9* | −7.273 | 0.298 | 1.5443 | 55.9 | f5 = −40.506 |
| | 10* | −11.011 | 0.168 | | | |
| L6 | 11* | −3.433 | 0.412 | 1.6707 | 19.2 | f6 = −20.742 |
| | 12* | −4.777 | 0.080 | | | |
| L7 | 13* | −34.551 | 0.641 | 1.5443 | 55.9 | f7 = 8.678 |
| | 14* | −4.183 | 0.026 | | | |
| L8 | 15* | 5.706 | 0.645 | 1.5443 | 55.9 | f8 = 52.687 |
| | 16* | 6.840 | 0.610 | | | |
| L9 | 17* | 826.452 | 0.601 | 1.5443 | 55.9 | f9 = −4.987 |
| | 18* | 2.705 | 0.250 | | | |
| | 19 | ∞ | 0.210 | 1.5168 | 64.2 | |
| | 20 | ∞ | 0.691 | | | |
| (IM) | | ∞ | | | | | f123=6.145 mm f789=−56.237 mm f34=10.744 mm f89=−5.891 mm

T7=0.641 mm

T8=0.645 mm

D34=0.161 mm

D89=0.610 mm

TL=7.037 mm

Hmax=4.52 mm

Dep=2.972 mm

TABLE 18

Aspherical surface data

| i | k | A4 | A6 | A8 | A10 | A12 | A14 | A16 |
|---|---|---|---|---|---|---|---|---|
| 1 | 2.138E−01 | 2.437E−03 | −4.046E−04 | 1.772E−03 | −8.446E−04 | 2.477E−04 | 1.026E−05 | −8.781E−06 |
| 2 | 0.000E+00 | −2.041E−02 | 2.862E−02 | −1.827E−02 | 7.056E−03 | −1.221E−03 | −9.036E−05 | 4.995E−05 |
| 3 | −3.695E+00 | −4.437E−02 | 3.194E−02 | −1.688E−02 | 6.304E−03 | −7.906E−04 | −2.695E−04 | 1.157E−04 |
| 4 | −8.276E+00 | 1.695E−02 | −1.258E−02 | 1.324E−02 | −1.010E−02 | 9.186E−03 | −5.022E−03 | 1.338E−03 |
| 5 | 0.000E+00 | −1.506E−02 | −9.879E−03 | 5.220E−04 | −3.606E−03 | 2.341E−03 | 1.534E−03 | −1.002E−03 |
| 6 | 0.000E+00 | −2.466E−02 | −2.492E−02 | 1.184E−02 | −2.937E−03 | 1.566E−03 | 1.699E−03 | −9.831E−04 |
| 7 | 0.000E+00 | −2.631E−02 | −2.970E−02 | −9.661E−05 | 1.067E−02 | 1.336E−03 | −3.554E−03 | 9.170E−04 |
| 8 | 0.000E+00 | 8.258E−03 | −5.444E−02 | 4.873E−03 | 3.731E−03 | 2.331E−03 | −2.213E−03 | 5.137E−04 |
| 9 | 0.000E+00 | 7.014E−03 | −5.507E−02 | 8.574E−03 | −1.823E−03 | 1.028E−03 | 1.813E−03 | −6.291E−04 |
| 10 | 0.000E+00 | −2.811E−02 | −1.703E−02 | 1.630E−03 | 1.654E−03 | 1.435E−04 | −7.561E−05 | −4.622E−06 |
| 11 | 2.498E+00 | −1.107E−02 | 2.425E−02 | −9.932E−03 | 4.061E−03 | −1.122E−03 | 1.659E−04 | −8.125E−06 |
| 12 | −5.224E+00 | −4.191E−02 | 3.128E−02 | −1.154E−02 | 3.023E−03 | −6.081E−04 | 1.002E−04 | −1.004E−05 |
| 13 | 0.000E+00 | −8.188E−03 | 1.083E−02 | −6.359E−03 | 1.041E−03 | 1.043E−04 | −8.669E−05 | 1.113E−05 |
| 14 | 0.000E+00 | 3.091E−02 | −3.652E−03 | 4.085E−04 | −1.955E−04 | 9.988E−06 | 1.876E−06 | 8.842E−09 |
| 15 | 1.715E+00 | −8.358E−03 | −5.354E−04 | −2.437E−03 | 7.278E−04 | −9.710E−05 | 7.374E−06 | −2.555E−07 |
| 16 | 0.000E+00 | 1.034E−02 | −4.258E−03 | −2.632E−04 | 1.903E−04 | −1.909E−05 | 2.464E−07 | 2.591E−08 |
| 17 | 0.000E+00 | −5.151E−02 | 1.476E−02 | −2.109E−03 | 2.187E−04 | −1.610E−05 | 5.152E−07 | 2.342E−10 |
| 18 | −5.107E+00 | −4.630E−02 | 1.316E−02 | −2.725E−03 | 3.514E−04 | −2.629E−05 | 1.043E−06 | −1.708E−08 |

The values of the respective conditional expressions are as follows:

$f123/f=1.093$ $f3/f2=-1.349$ $D34/f=0.029$ $T8/T7=1.006$ $D89/f=0.109$ $R9r/f=0.481$ $f9/f=-0.887$ $|f4/f|=3.678$ $TL/f=1.252$ $TL/H\text{max}=1.557$ $f/\text{Dep}=1.89$ Accordingly, the imaging lens of Numerical Data Example 9 satisfies the above-described conditional expressions.

Figure 26:
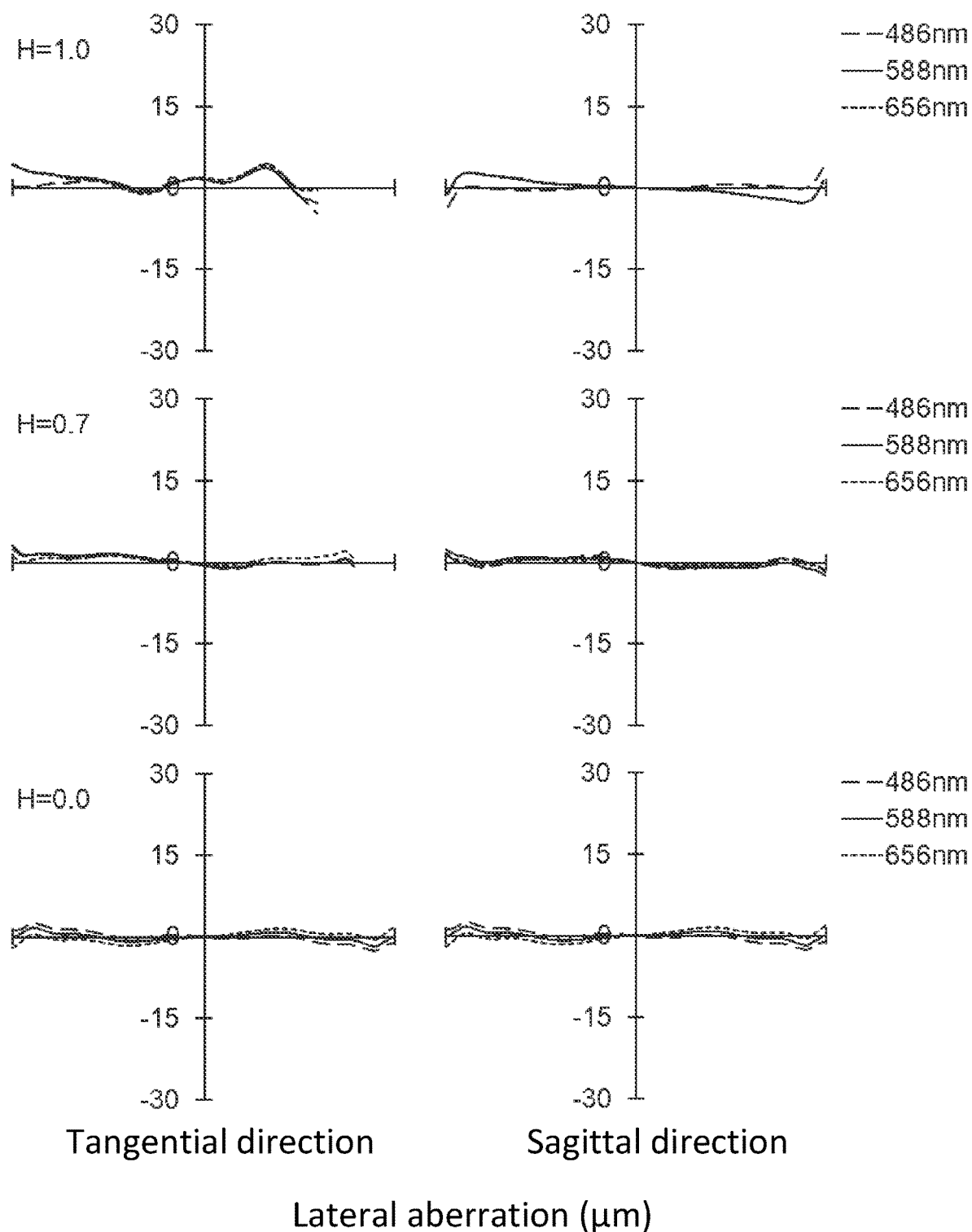
FIG. 26 is an aberration diagram showing a lateral aberration of the imaging lens of FIG. 25.
Figure 27:
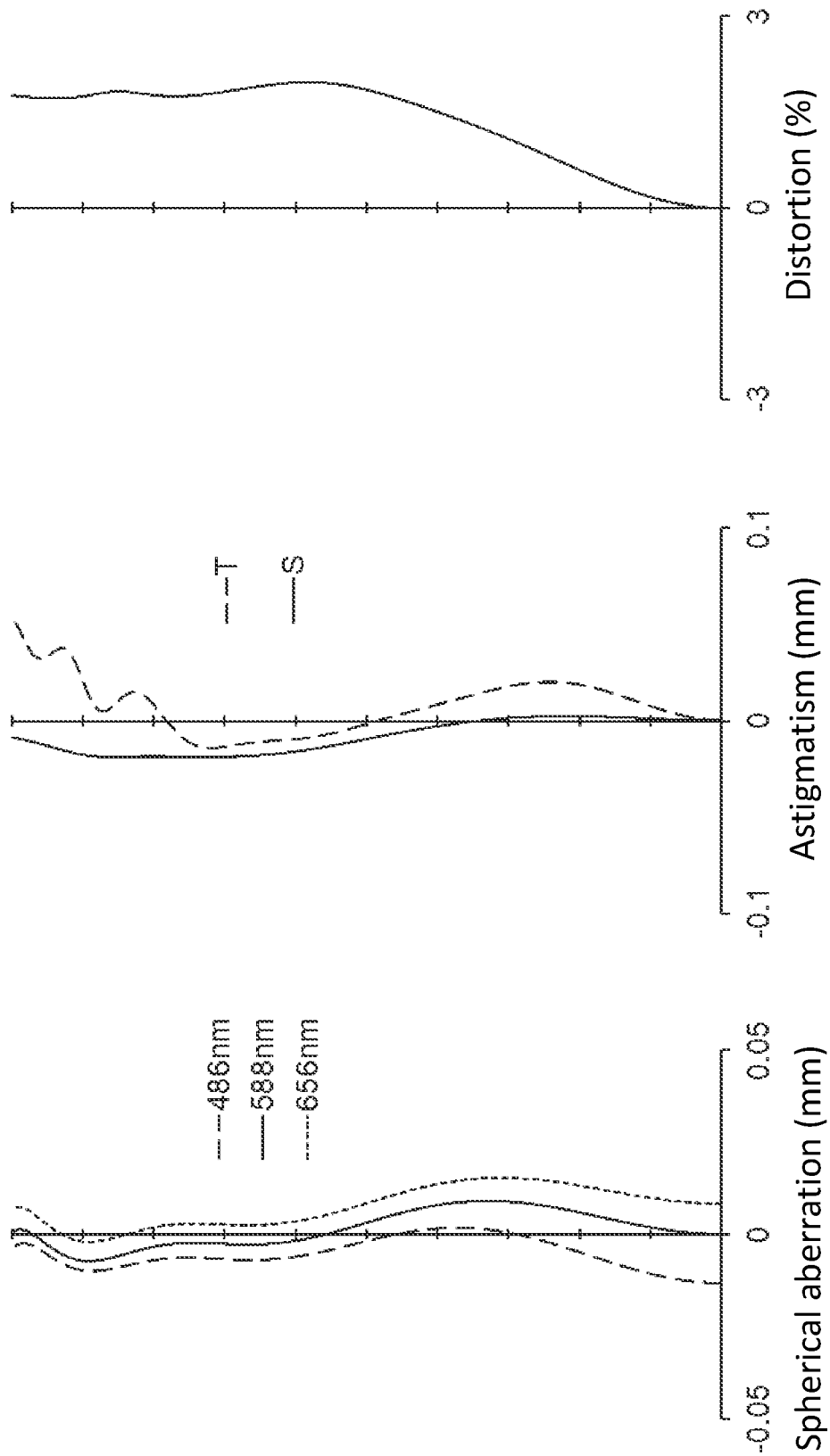
FIG. 27 is an aberration diagram showing a spherical aberration, astigmatism, and a distortion of the imaging lens of FIG. 25.
Figure 28:
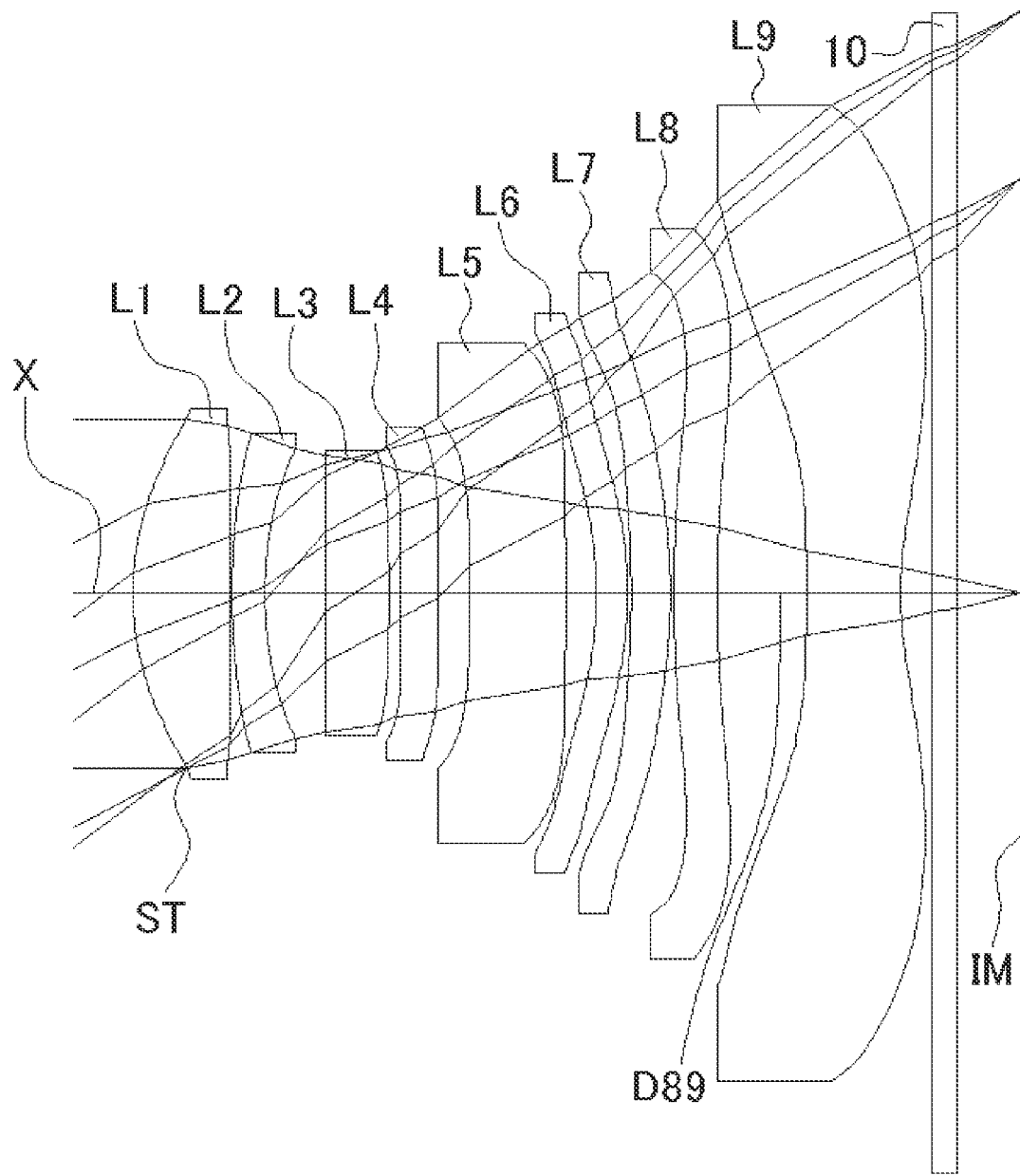
FIG. 28 shows a sectional view of a schematic configuration of an imaging lens in Numerical Data Example 10 of the present invention.

FIG. 26 shows a lateral aberration that corresponds to an image height H and FIG. 27 shows a spherical aberration (mm), astigmatism (mm), and a distortion (%), respectively. As shown in FIGS. 26 and 27, according to the imaging lens of Numerical Data Example 9, the aberrations can be also satisfactorily corrected.

Numerical Data Example 10

Basic Lens Data

TABLE 19 f = 6.22 mm  Fno = 2.2  ω = 36.8°

| | i | r | d | n d | ν d | [mm] |
|---|---|---|---|---|---|---|
| L1 | 1*(ST) | ∞ | ∞ | | | |
| | | 2.288 | 0.784 | 1.5443 | 55.9 | f1 = 4.682 |
| | 2* | 19.734 | 0.017 | | | |

TABLE 19-continued f = 6.22 mm  Fno = 2.2  ω = 36.8°

| | i | r | d | n d | ν d | [mm] |
|---|---|---|---|---|---|---|
| L2 | 3* | 4.992 | 0.268 | 1.6707 | 19.2 | f2 = −13.021 |
| | 4* | 3.108 | 0.488 | | | |
| L3 | 5* | −574.669 | 0.516 | 1.5443 | 55.9 | f3 = 40.146 |
| | 6* | −21.058 | 0.091 | | | |
| L4 | 7* | 40.931 | 0.308 | 1.5443 | 55.9 | f4 = 59.919 |
| | 8* | −160.079 | 0.254 | | | |
| L5 | 9* | −28.959 | 0.777 | 1.5443 | 55.9 | f5 = −99.665 |
| | 10* | −62.709 | 0.252 | | | |
| L6 | 11* | −3.200 | 0.250 | 1.6707 | 19.2 | f6 = −100.368 |
| | 12* | −3.466 | 0.030 | | | |
| L7 | 13* | −9.478 | 0.318 | 1.5443 | 55.9 | f7 = 16.388 |
| | 14* | −4.650 | 0.032 | | | |
| L8 | 15* | 19.516 | 0.350 | 1.5443 | 55.9 | f8 = −95.037 |
| | 16* | 14.080 | 0.718 | | | |
| L9 | 17* | −326.264 | 0.766 | 1.5443 | 55.9 | f9 = −5.589 |
| | 18* | 3.073 | 0.250 | | | |
| | 19 | ∞ | 0.210 | 1.5168 | 64.2 | |
| | 20 | ∞ | 0.509 | | | |
| (IM) | | ∞ | | | | | f123=5.847 mm f789=−8.686 mm f34=24.068 mm f89=−5.247 mm

T7=0.318 mm

T8=0.350 mm

D34=0.091 mm

D89=0.718 mm

TL=7.118 mm

Hmax=4.65 mm

Dep=2.828 mm

TABLE 20

Aspherical surface data

| i | k | A4 | A6 | A8 | A10 | A12 | A14 | A16 |
|---|---|---|---|---|---|---|---|---|
| 1 | 7.617E-01 | -1.117E-02 | -3.100E-03 | -3.298E-03 | 1.153E-03 | -7.086E-04 | 1.133E-04 | -2.825E-05 |
| 2 | 0.000E+00 | -4.732E-02 | 4.539E-02 | -2.827E-02 | 9.365E-03 | -1.440E-03 | -1.986E-04 | 8.128E-05 |
| 3 | -3.214E+00 | -3.582E-02 | 3.254E-02 | -7.542E-03 | -4.806E-04 | 1.416E-03 | -7.776E-04 | 1.513E-04 |
| 4 | -3.351E+00 | 1.851E-02 | -2.229E-02 | 4.911E-02 | -4.604E-02 | 2.921E-02 | -1.053E-02 | 1.644E-03 |
| 5 | 0.000E+00 | -7.044E-04 | -4.908E-03 | -2.532E-03 | 9.444E-03 | -4.396E-03 | 1.225E-03 | -4.012E-05 |
| 6 | 0.000E+00 | 1.574E-02 | -6.266E-02 | 4.182E-03 | 1.669E-02 | -6.175E-03 | -6.454E-06 | 2.911E-04 |
| 7 | 0.000E+00 | 2.514E-02 | -8.054E-02 | 6.674E-03 | 2.243E-03 | 2.323E-03 | 1.185E-03 | -8.064E-04 |
| 8 | 0.000E+00 | 2.149E-03 | -2.464E-02 | -1.504E-02 | 6.377E-03 | 5.560E-03 | -3.124E-03 | 4.913E-04 |
| 9 | 0.000E+00 | -1.090E-02 | -2.732E-02 | 3.262E-03 | 3.334E-03 | -6.024E-03 | 3.770E-03 | -8.069E-04 |
| 10 | 0.000E+00 | 1.357E-02 | -1.628E-02 | 5.691E-03 | -2.382E-03 | 1.288E-03 | -3.032E-04 | 2.645E-05 |
| 11 | -3.141E+00 | -1.167E-02 | 1.282E-02 | -1.474E-03 | -3.892E-04 | 1.780E-04 | -6.133E-05 | 7.719E-06 |
| 12 | -7.659E+00 | -3.136E-02 | 2.026E-02 | -5.680E-03 | 1.577E-03 | -3.746E-04 | 3.827E-05 | -6.966E-07 |
| 13 | 0.000E+00 | 2.264E-03 | 4.503E-03 | -3.788E-03 | 4.540E-04 | 1.700E-05 | 3.824E-06 | -9.779E-07 |
| 14 | 0.000E+00 | 2.490E-02 | -7.476E-03 | 3.145E-04 | 1.473E-03 | -1.108E-05 | -4.413E-07 | 1.509E-08 |
| 15 | 0.000E+00 | 2.502E-02 | -1.237E-02 | 1.332E-03 | 3.179E-04 | -1.145E-04 | 1.372E-05 | -6.601E-07 |
| 16 | 0.000E+00 | 6.130E-03 | -2.313E-03 | -3.997E-04 | 1.846E-04 | -2.136E-05 | 6.259E-07 | 1.702E-08 |
| 17 | 0.000E+00 | -5.661E-02 | 1.374E-02 | -1.512E-03 | 5.397E-05 | 4.960E-06 | -5.278E-07 | 1.271E-08 |
| 18 | -6.607E+00 | -3.655E-02 | 9.603E-03 | -1.771E-03 | 2.129E-04 | -1.584E-05 | 6.542E-07 | 1.140E-08 |

The values of the respective conditional expressions are as follows:

$f123/f = 0.940$ $f3/f2 = -3.083$ $D34/f = 0.015$ $T8/T7 = 1.101$ $D89/f = 0.115$ $R9r/f = 0.494$ $f9/f = -0.899$ $|f4/f| = 9.633$ $TL/f = 1.144$ $TL/H\mathrm{max} = 1.531$ $f/\mathrm{Dep} = 2.20$ Accordingly, the imaging lens of Numerical Data Example 10 satisfies the above-described conditional expressions.

Figure 29:
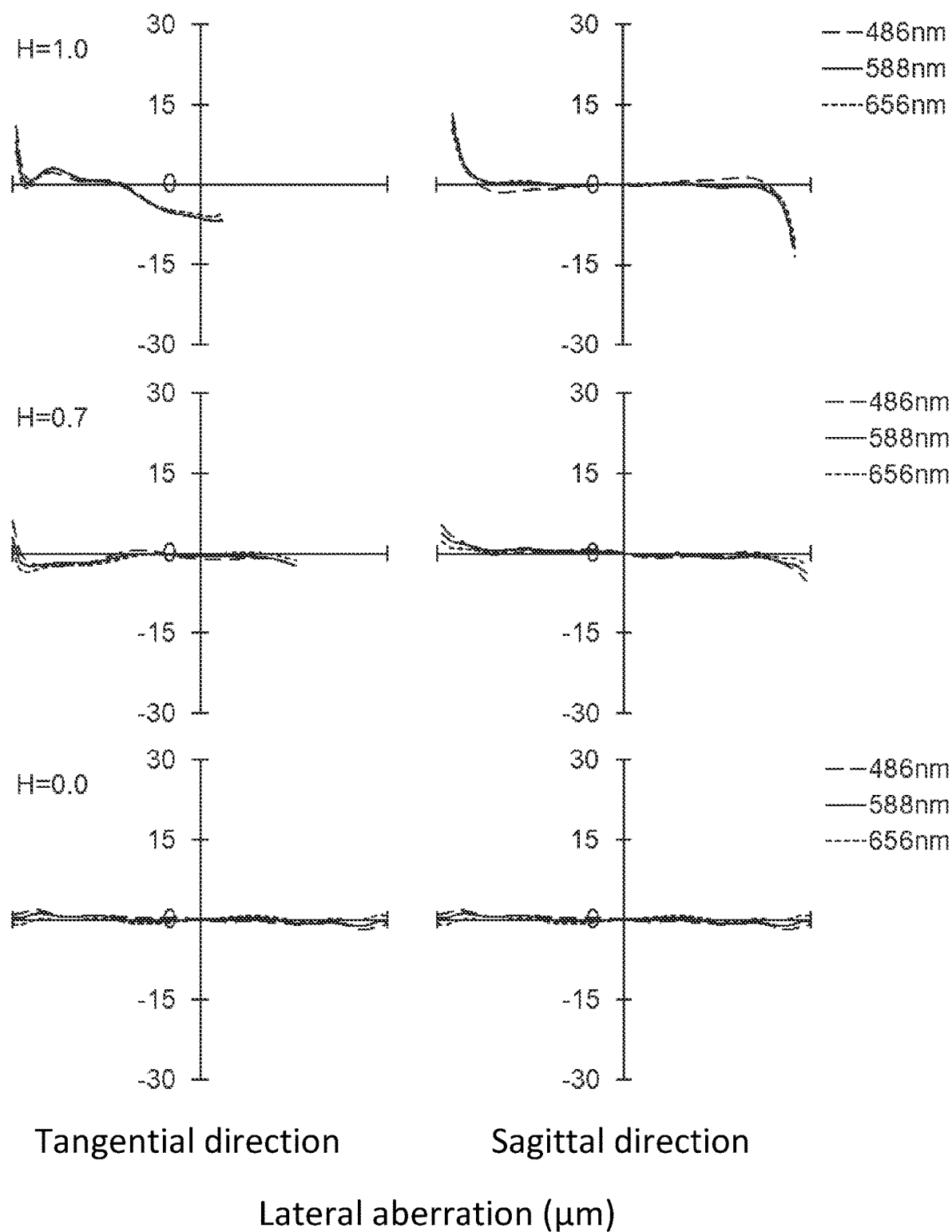
FIG. 29 is an aberration diagram showing a lateral aberration of the imaging lens of FIG. 28.
Figure 30:
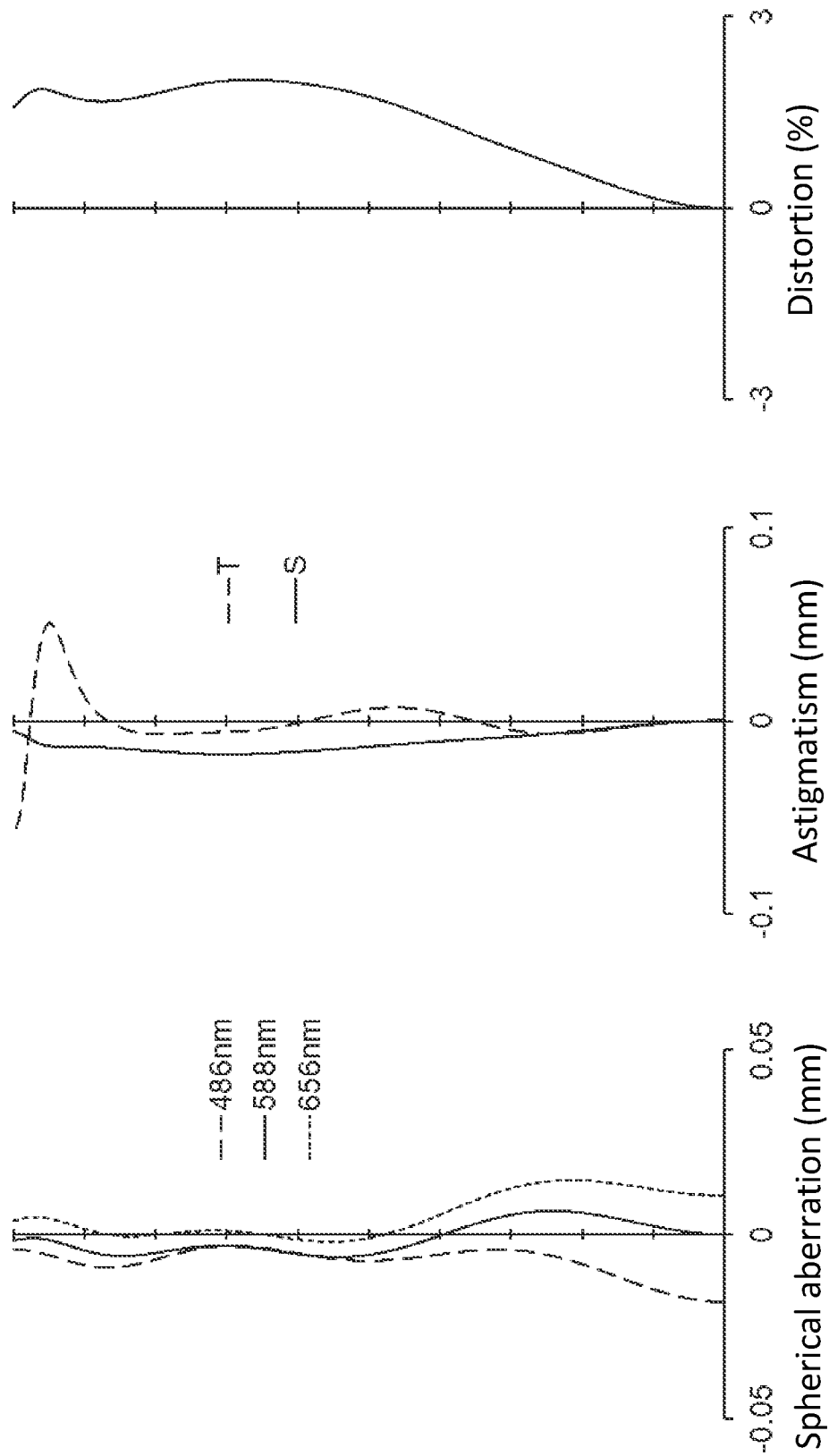
FIG. 30 is an aberration diagram showing a spherical aberration, astigmatism, and a distortion of the imaging lens of FIG. 28.
Figure 31:
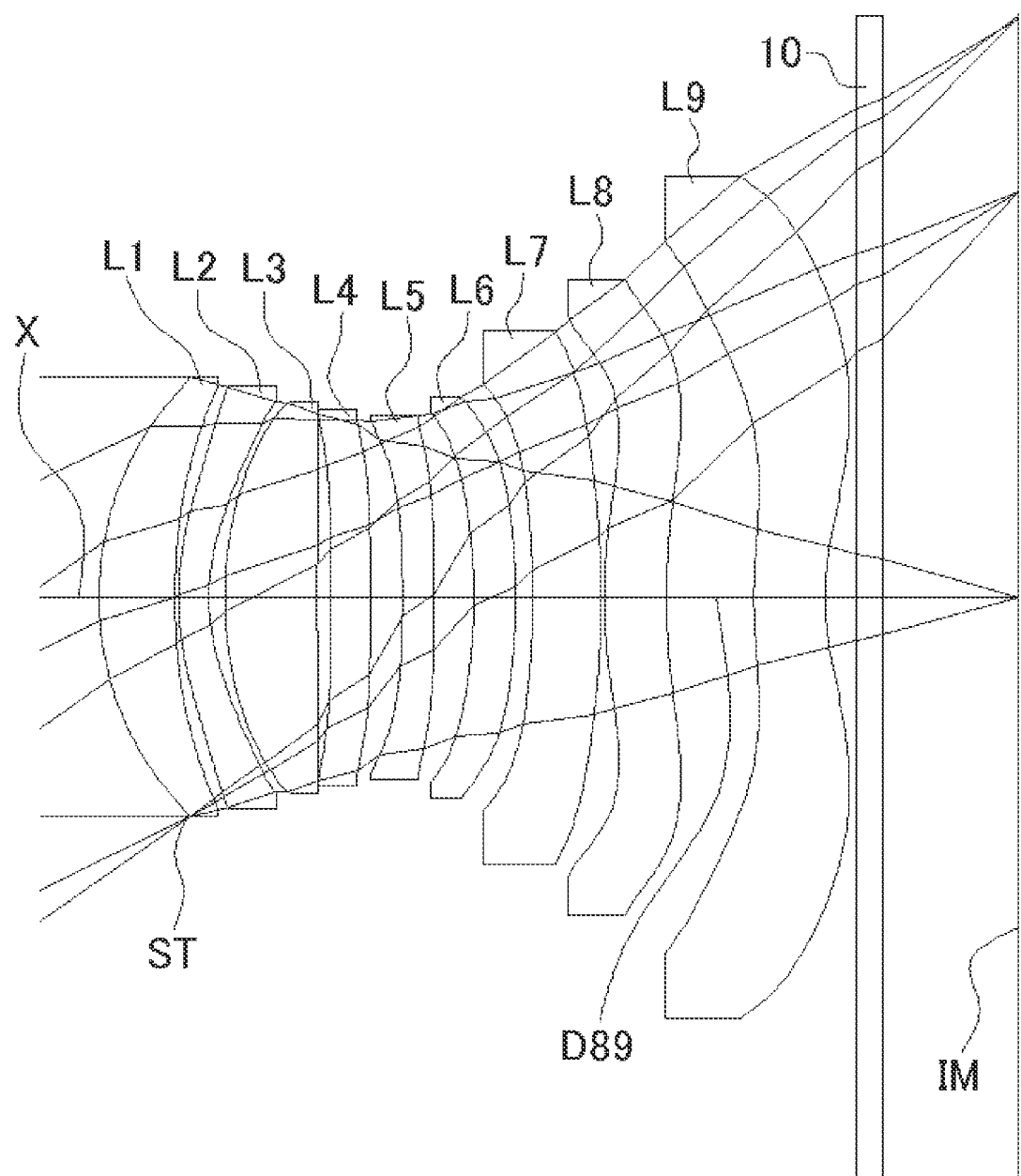
FIG. 31 shows a sectional view of a schematic configuration of an imaging lens in Numerical Data Example 11 of the present invention.

FIG. 29 shows a lateral aberration that corresponds to an image height H and FIG. 30 shows a spherical aberration (mm), astigmatism (mm), and a distortion (%), respectively. As shown in FIGS. 29 and 30, according to the imaging lens of Numerical Data Example 10, the aberrations can be also satisfactorily corrected.

Numerical Data Example 11

Basic Lens Data

TABLE 21 f = 6.44 mm  Fno = 1.8  ω = 35.0°

| | i | r | d | n d | ν d | [mm] |
|---|---|---|---|---|---|---|
| L1 | 1*(ST) | ∞ | ∞ | | | |
| | | 2.542 | 0.601 | 1.5443 | 55.9 | f1 = 7.987 |
| | 2* | 5.610 | 0.028 | | | |

TABLE 21-continued f = 6.44 mm  Fno = 1.8  ω = 35.0°

| | i | r | d | n d | ν d | [mm] |
|---|---|---|---|---|---|---|
| L2 | 3* | 2.214 | 0.240 | 1.6707 | 19.2 | f2 = -9.799 |
| | 4* | 1.584 | 0.126 | | | |
| L3 | 5* | 2.818 | 0.731 | 1.5348 | 55.7 | f3 = 6.315 |
| | 6* | 15.471 | 0.107 | | | |
| L4 | 7* | 80.794 | 0.312 | 1.5348 | 55.7 | f4 = 91.684 |
| | 8* | -124.559 | 0.255 | | | |
| L5 | 9* | -16.542 | 0.255 | 1.5348 | 55.7 | f5 = 104.625 |
| | 10* | -23.612 | 0.312 | | | |
| L6 | 11* | -4.367 | 0.332 | 1.6707 | 19.2 | f6 = -103.407 |
| | 12* | -4.802 | 0.134 | | | |
| L7 | 13* | -6.191 | 0.540 | 1.6707 | 19.2 | f7 = -43.774 |
| | 14* | -8.120 | 0.027 | | | |
| L8 | 15* | 4.184 | 0.492 | 1.5443 | 55.9 | f8 = 25.814 |
| | 16* | 5.711 | 0.691 | | | |
| L9 | 17* | 3.766 | 0.564 | 1.5348 | 55.7 | f9 = -8.932 |
| | 18* | 1.996 | 0.250 | | | |
| | 19 | ∞ | 0.210 | 1.5168 | 64.2 | |
| | 20 | ∞ | 1.065 | | | |
| (IM) | | ∞ | | | | | f123=5.716 mm f789=-10.815 mm f34=5.954 mm f89=-16.190 mm

T7=0.540 mm

T8=0.492 mm

D34=0.107 mm

D89=0.691 mm

TL=7.202 mm

Hmax=4.50 mm

Dep=3.480 mm

TABLE 22

| | Aspherical surface data | | | | |
|---|---|---|---|---|---|
| i | k | A4 | A6 | A8 | A10 |
| 1 | −4.495E−01 | 1.125E−02 | −2.451E−03 | 8.994E−04 | 7.060E−05 |
| 2 | 0.000E+00 | 4.381E−02 | −6.416E−02 | 9.226E−02 | −1.009E−01 |
| 3 | −9.709E+00 | 4.679E−02 | −7.486E−02 | 9.684E−02 | −1.052E−01 |
| 4 | −2.763E+00 | −5.585E−02 | 8.483E−02 | −1.099E−01 | 1.081E−01 |
| 5 | −5.844E+00 | −7.475E−04 | 6.734E−02 | −1.517E−01 | 2.244E−01 |
| 6 | 0.000E+00 | −2.991E−02 | −2.782E−03 | 5.153E−02 | −9.481E−02 |
| 7 | 0.000E+00 | −4.259E−02 | 1.002E−02 | 1.713E−03 | −2.821E−03 |
| 8 | 0.000E+00 | −2.766E−02 | −1.154E−03 | 2.416E−03 | −2.340E−03 |
| 9 | 0.000E+00 | −5.345E−02 | −9.331E−03 | 1.094E−02 | −7.707E−03 |
| 10 | 0.000E+00 | −2.910E−02 | −3.649E−03 | 3.572E−03 | 2.817E−03 |
| 11 | 0.000E+00 | 3.287E−02 | −5.927E−02 | 4.556E−02 | −1.253E−02 |
| 12 | 0.000E+00 | 3.125E−02 | −3.307E−02 | −1.746E−02 | 3.314E−02 |
| 13 | 0.000E+00 | 1.274E−02 | 1.859E−02 | −4.538E−02 | 2.613E−02 |
| 14 | 0.000E+00 | −2.329E−03 | 3.466E−03 | −1.204E−03 | −2.950E−04 |
| 15 | −6.104E−01 | −4.147E−03 | −3.292E−02 | 1.610E−02 | −5.041E−03 |
| 16 | 0.000E+00 | 8.106E−03 | −2.148E−02 | 6.570E−03 | −9.385E−04 |
| 17 | −1.953E−01 | −1.271E−01 | 4.032E−02 | −8.490E−03 | 9.571E−04 |
| 18 | −7.322E+00 | −5.473E−02 | 1.448E−02 | −2.765E−03 | 3.306E−04 |

| i | A12 | A14 | A16 | A18 | A20 |
|---|---|---|---|---|---|
| 1 | −7.962E−05 | 1.656E−06 | 6.815E−06 | 6.414E−07 | −8.765E−07 |
| 2 | 7.450E−02 | −3.520E−02 | 1.018E−02 | −1.642E−03 | 1.129E−04 |
| 3 | 7.839E−02 | −3.723E−02 | 1.078E−02 | −1.731E−03 | 1.181E−04 |
| 4 | −7.482E−02 | 3.392E−02 | −9.291E−03 | 1.373E−03 | −8.048E−05 |
| 5 | −2.011E−01 | 1.102E−01 | −3.618E−02 | 6.551E−03 | −5.039E−04 |
| 6 | 9.906E−02 | −6.245E−02 | 2.299E−02 | −4.510E−03 | 3.644E−04 |
| 7 | 2.566E−04 | 3.655E−04 | −1.014E−05 | −4.271E−05 | 1.149E−05 |
| 8 | 1.569E−04 | 1.099E−03 | 2.520E−05 | −4.553E−04 | 1.339E−04 |
| 9 | 5.104E−03 | −5.208E−04 | −1.516E−03 | 7.450E−04 | −8.816E−05 |
| 10 | −1.542E−03 | −5.433E−04 | 1.410E−04 | 1.851E−04 | −4.908E−05 |
| 11 | −1.833E−02 | 2.224E−02 | −1.202E−02 | 3.600E−03 | −4.788E−04 |
| 12 | −2.148E−02 | 4.576E−03 | 1.700E−03 | −9.902E−04 | 1.299E−04 |
| 13 | −5.156E−03 | −3.024E−03 | 2.798E−03 | −8.723E−04 | 9.654E−05 |
| 14 | 1.644E−04 | 2.114E−05 | −2.002E−05 | 2.776E−06 | −5.947E−08 |
| 15 | 1.182E−03 | −2.130E−04 | 1.419E−05 | 2.444E−06 | −3.221E−07 |
| 16 | −3.725E−06 | 1.559E−05 | −8.526E−07 | −1.058E−07 | 9.849E−09 |
| 17 | −2.546E−05 | −2.973E−06 | −1.238E−07 | 3.810E−08 | −1.074E−09 |
| 18 | −2.301E−05 | 9.220E−07 | −2.442E−08 | 2.937E−10 | 9.142E−12 |

The values of the respective conditional expressions are as follows:

$f123/f=0.888$ $f3/f2=-0.644$ $D34/f=0.017$ $T8/T7=0.911$ $D89/f=0.107$ $R9r/f=0.310$ $f9/f=-1.387$ $|f4/f|=14.237$ $TL/f=1.118$ $TL/H\text{max}=1.600$ $f/\text{Dep}=1.85$ $f8/f=4.008$ Accordingly, the imaging lens of Numerical Data Example 11 satisfies the above-described conditional expressions.

Figure 32:
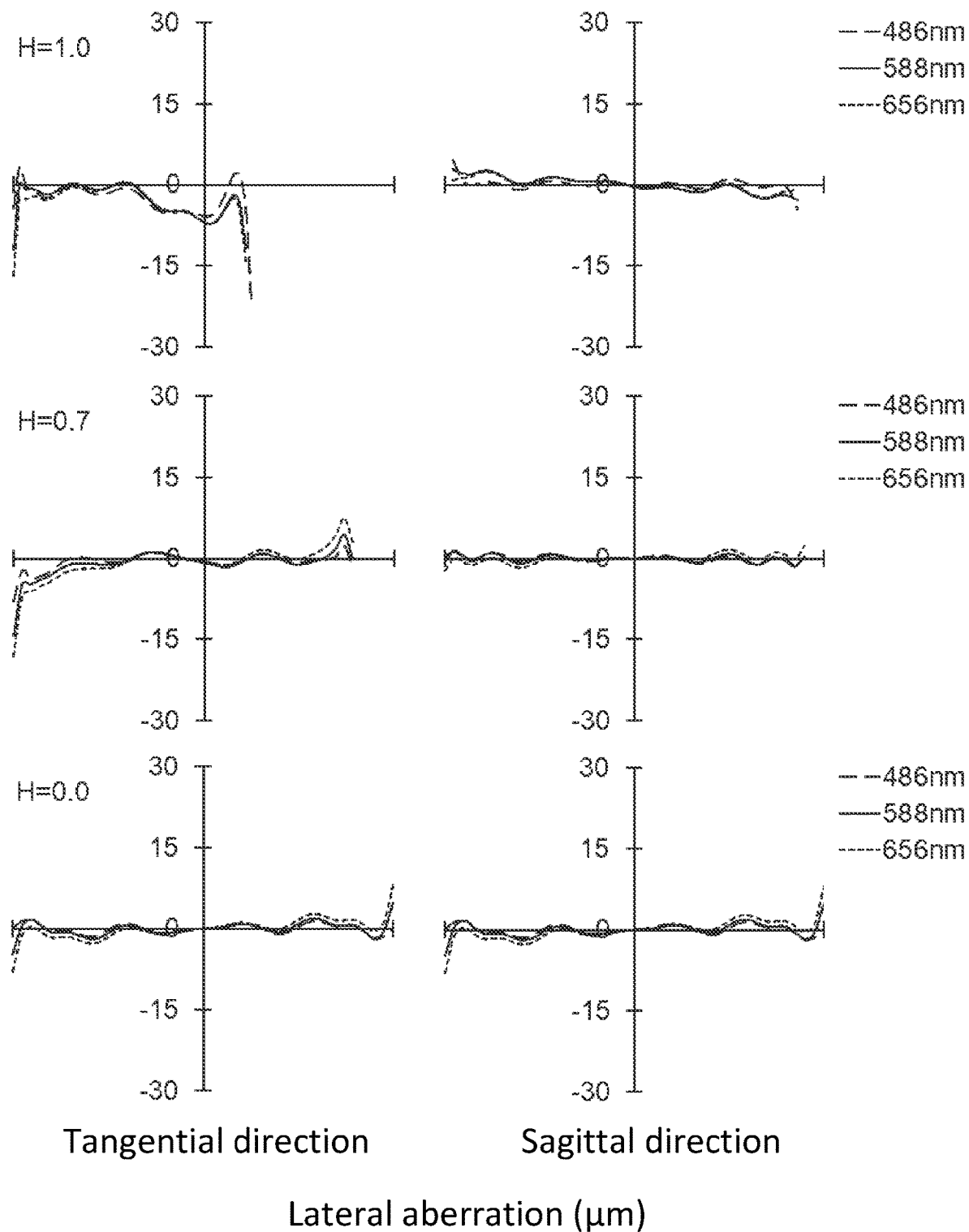
FIG. 32 is an aberration diagram showing a lateral aberration of the imaging lens of FIG. 31.
Figure 33:
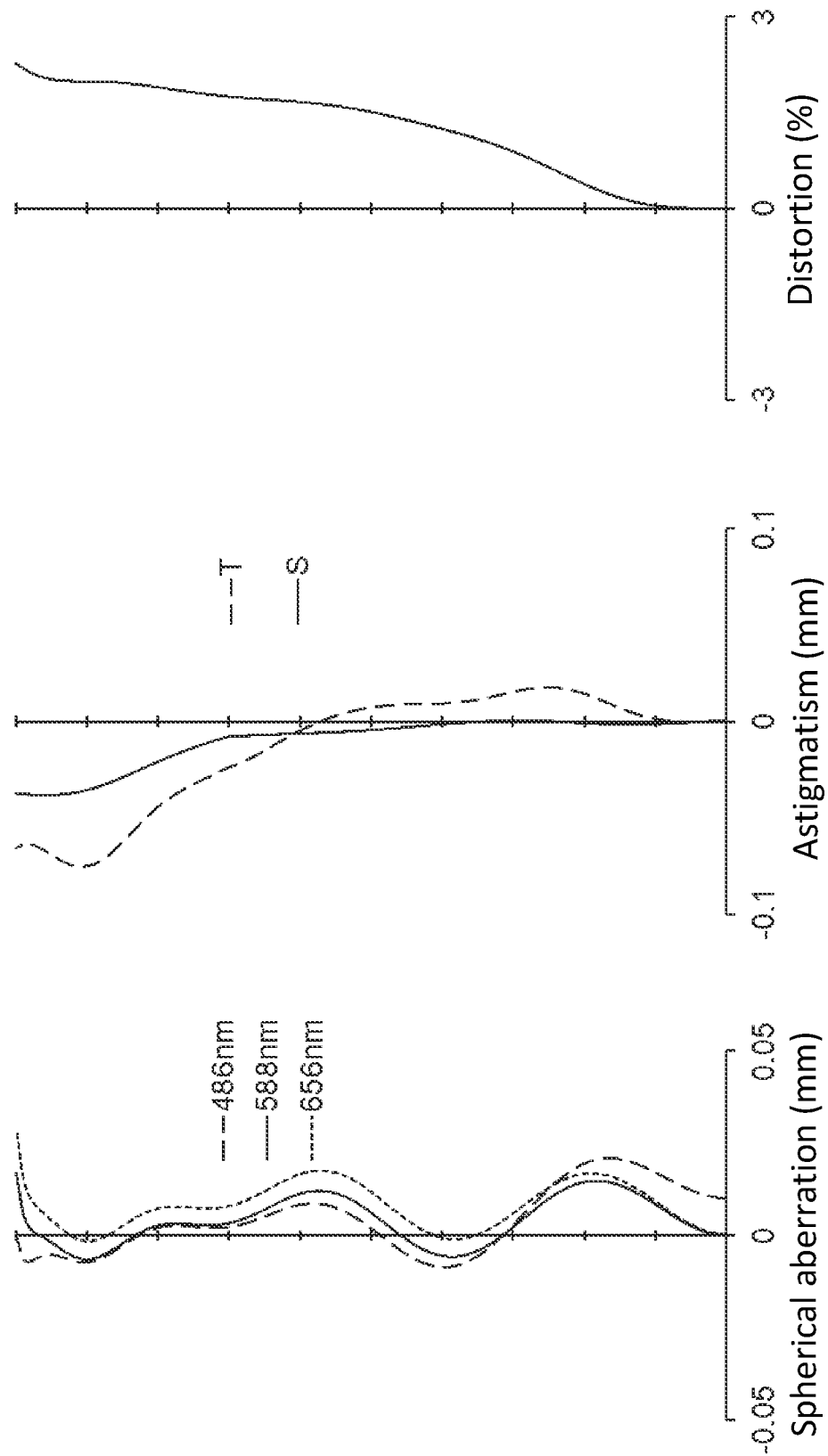
FIG. 33 is an aberration diagram showing a spherical aberration, astigmatism, and a distortion of the imaging lens of FIG. 31.

FIG. 32 shows a lateral aberration that corresponds to an image height H and FIG. 33 shows a spherical aberration (mm), astigmatism (mm), and a distortion (%), respectively. As shown in FIGS. 32 and 33, according to the imaging lens of Numerical Data Example 11, the aberrations can be also satisfactorily corrected.

According to the embodiment of the invention, the imaging lenses have very wide angles of view (2ω) of 65° or greater. According to the imaging lens of the embodiment, it is possible to take an image over a wider range than that taken by a conventional imaging lens.

In recent years, with advancement in digital-zoom technology to enlarge any range of an image obtained through an imaging lens, an imaging element with a higher pixel count has been more frequently applied in combination with an imaging lens of higher resolution. In many cases of such an imaging element with a high pixel count, a light-receiving area per pixel decreases, so that an image tends to be dark. According to the imaging lenses of the embodiment, it is achievable to take a sufficiently bright image even with the above-described imaging element with a higher pixel count.

Accordingly, when the imaging lens of the above-described embodiment is applied in an imaging optical system such as cameras built in mobile devices (e.g., cellular phones, smartphones, and mobile information terminals), digital still cameras, security cameras, onboard cameras, and network cameras, it is possible to attain both high performance and downsizing of the cameras.

Accordingly, the present invention is applicable in an imaging lens that is mounted in a relatively small-sized camera, such as cameras built in mobile devices (e.g., cellular phones, smartphones, and mobile information terminals), digital still cameras, security cameras, onboard cameras, and network cameras, it is possible to attain both high performance and downsizing of the cameras.

The disclosure of Japanese Patent Application No. 2018-248774, filed on Dec. 29, 2019, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens;
a second lens;
a third lens;
a fourth lens;
a fifth lens;
a seventh lens;
an eighth lens; and
a ninth lens having negative refractive power, arranged in this order from an object side to an image plane side,
wherein said imaging lens has a total of nine lenses,
said first lens is formed in a shape so that a surface thereof on the image plane side has an aspherical shape, and
said ninth lens is formed in a shape so that a surface thereof on the image plane side has an aspherical shape.

2. The imaging lens according to claim 1, wherein said first lens, said second lens, and said third lens have a composite focal length f123 so that the following conditional expression is satisfied:

$0.5 < f123/f < 2.5$, where f is a focal length of a whole lens system.

3. The imaging lens according to claim 1, wherein said seventh lens, said eighth lens, and said ninth lens have a composite focal length f789 so that the following conditional expression is satisfied:

$f789 < 0$.

4. The imaging lens according to claim 1, wherein said second lens has a focal length f2, and said third lens has a focal length f3 so that the following conditional expression is satisfied:

$-6 < f3/f2 < -0.2$.

5. The imaging lens according to claim 1, wherein said seventh lens has a thickness T7 near an optical axis thereof, and said eighth lens has a thickness T8 near an optical axis thereof so that the following conditional expression is satisfied:

$0.5 < T8/T7 < 4$.

6. The imaging lens according to claim 1, wherein said ninth lens is formed in the shape so that the surface thereof on the image plane side has a paraxial curvature radius R9r so that the following conditional expression is satisfied:

$0.2 < R9r/f < 0.6$, where f is a focal length of a whole lens system.

7. The imaging lens according to claim 1, wherein said ninth lens has a focal length f9 so that the following conditional expression is satisfied:

$-2 < f9/f < -0.2$, where f is a focal length of a whole lens system.

8. An imaging lens comprising:
a first lens;
a second lens;
a third lens;
a fourth lens;
a fifth lens;
a sixth lens;
a seventh lens;
an eighth lens; and
a ninth lens having negative refractive power, arranged in this order from an object side to an image plane side,
wherein said imaging lens has a total of nine lenses,
said eighth lens has at least one aspheric surface,
said ninth lens is formed in a shape so that a surface thereof on the image plane side has an aspherical shape, and
said seventh lens, said eighth lens, and said ninth lens have a composite focal length f789 so that the following conditional expression is satisfied:

$f789 < 0$.

9. The imaging lens according to claim 8, wherein said first lens, said second lens, and said third lens have a composite focal length f123 so that the following conditional expression is satisfied:

$0.5 < f123/f < 2.5$, where f is a focal length of a whole lens system.

10. The imaging lens according to claim 8, wherein said second lens has a focal length f2, and said third lens has a focal length f3 so that the following conditional expression is satisfied:

$-6 < f3/f2 < -0.2$.

11. The imaging lens according to claim 8, wherein said seventh lens has a thickness T7 near an optical axis thereof, and said eighth lens has a thickness T8 near an optical axis thereof so that the following conditional expression is satisfied:

$0.5 < T8/T7 < 4$.

12. The imaging lens according to claim 8, wherein said ninth lens is formed in the shape so that the surface thereof on the image plane side has a paraxial curvature radius R9r so that the following conditional expression is satisfied:

$0.2 < R9r/f < 0.6$, where f is a focal length of a whole lens system.

13. The imaging lens according to claim 8, wherein said ninth lens has a focal length f9 so that the following conditional expression is satisfied:

$-2 < f9/f < -0.2$, where f is a focal length of a whole lens system.

14. An imaging lens comprising:
a first lens;
a second lens;
a third lens;
a fourth lens;
a fifth lens;
a sixth lens;
a seventh lens;
an eighth lens; and
a ninth lens having negative refractive power, arranged in this order from an object side to an image plane side,
wherein said imaging lens has a total of nine lenses,
said eighth lens has at least one aspheric surface, said ninth lens is formed in a shape so that a surface thereof on the image plane side has an aspherical shape, and said seventh lens has a thickness T7 near an optical axis thereof, and said eighth lens has a thickness T8 near an optical axis thereof so that the following conditional expression is satisfied:

$0.5 < T8/T7 < 4.$

15. The imaging lens according to claim 14, wherein said first lens, said second lens, and said third lens have a composite focal length f123 so that the following conditional expression is satisfied:

$0.5 < f123/f < 2.5,$ where f is a focal length of a whole lens system.

16. The imaging lens according to claim 14, wherein said seventh lens, said eighth lens, and said ninth lens have a composite focal length f789 so that the following conditional expression is satisfied:

$f789 < 0.$

17. The imaging lens according to claim 14, wherein said second lens has a focal length f2, and said third lens has a focal length f3 so that the following conditional expression is satisfied:

$-6 < f3/f2 < -0.2.$

18. The imaging lens according to claim 14, wherein said ninth lens is formed in the shape so that the surface thereof on the image plane side has a paraxial curvature radius R9r so that the following conditional expression is satisfied:

$0.2 < R9r/f < 0.6,$ where f is a focal length of a whole lens system.

19. The imaging lens according to claim 14, wherein said ninth lens has a focal length f9 so that the following conditional expression is satisfied:

$-2 < f9/f < -0.2,$ where f is a focal length of a whole lens system.

20. The imaging lens according to claim 14, wherein said first lens has an Abbe's number vd1 so that the following conditional expression is satisfied:

$35 < vd1 < 80.$

* * * * *